US012684614B2

(12) United States Patent
Elkotby et al.

(10) Patent No.: US 12,684,614 B2
(45) Date of Patent: Jul. 14, 2026

(54) METHOD AND APPARATUS OF RANDOM CHANNEL ACCESS OVER ZERO ENERGY AIR-INTERFACE

(71) Applicant: InterDigital Patent Holdings, Inc., Wilmington, DE (US)

(72) Inventors: Hussain Elkotby, Conshohocken, PA (US); Ravikumar Pragada, Warrington, PA (US); Tanbir Haque, Jackson Heights, NY (US); Patrick Cabrol, Bayshore, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 254 days.

(21) Appl. No.: 18/276,292

(22) PCT Filed: Feb. 1, 2022

(86) PCT No.: PCT/US2022/014671
§ 371 (c)(1),
(2) Date: Aug. 8, 2023

(87) PCT Pub. No.: WO2022/169732
PCT Pub. Date: Aug. 11, 2022

(65) Prior Publication Data
US 2024/0215067 A1     Jun. 27, 2024

Related U.S. Application Data

(60) Provisional application No. 63/234,907, filed on Aug. 19, 2021, provisional application No. 63/147,075, filed on Feb. 8, 2021.

(51) Int. Cl.
*H04W 74/08* (2024.01)
*H04W 24/08* (2009.01)
(Continued)

(52) U.S. Cl.
CPC ........... *H04W 74/08* (2013.01); *H04W 24/08* (2013.01); *H04W 52/146* (2013.01); *H04W 56/001* (2013.01)

(58) Field of Classification Search
CPC ... H04W 74/08; H04W 24/08; H04W 52/146; H04W 52/245; H04W 74/006;
(Continued)

(56) References Cited

U.S. PATENT DOCUMENTS

2011/0274040 A1 * 11/2011 Pani ........................ H04W 4/70
370/328
2017/0280481 A1 * 9/2017 Stern-Berkowitz ..........................
H04W 74/0833
(Continued)

FOREIGN PATENT DOCUMENTS

WO     WO 2018043841 A1     3/2018
WO     2019108940 A1     6/2019
WO     2021155209 A1     8/2021

OTHER PUBLICATIONS

"3rd Generation Partnership Project, Technical Specification Group Radio Access Network; NR; Physical layer procedures for control (Release 16)", 3GPP TS 38.213 V16.0.0, Dec. 2019, 146 pages.
(Continued)

*Primary Examiner* — Oussama Roudani
(74) *Attorney, Agent, or Firm* — Volpe Koenig

(57) ABSTRACT

Methods, apparatuses, systems, etc., directed to random channel access over zero energy (ZE) air-interface(s) are disclosed herein. In an embodiment, a wireless transmit/receive unit (WTRU) may receive a first reference signal. For example, the WTRU may determine that a first signal strength of the received first reference signal may fail to satisfy a strength condition, and responsively the WTRU may: (i) receive a transmission, (ii) determine a sequence and an occasion based on the received transmission, (iii)
(Continued)

1100

Receiving an Interrogation Signal from an Interrogating Network Element — 1110

Determining a PRACH Occasion Configuration based on Any of a WTRU Class, a WTRU Backscattering Capability, a WTRU Battery Level, a Received Signal Strength of the Interrogation Signal, Configured Signal Strength Thresholds, and a First Mapping between PRACH Occasion Configurations and Signal Strength Categories — 1120

Transmitting at least a PRACH Preamble as a Modulated Backscattered Signal of the Interrogation Signal based on the Determined PRACH Occasion Configuration — 1130 transmit using the determined sequence on the determined occasion, and (iv) receive a second reference signal from an interrogating WTRU.

20 Claims, 26 Drawing Sheets

(51) Int. Cl.
    *H04W 52/14* (2009.01)
    *H04W 56/00* (2009.01)

(58) Field of Classification Search
    CPC ............. H04W 56/001; H04W 74/002; H04W 74/0833; H04W 84/12; H04L 5/0048
    See application file for complete search history.

(56) References Cited

U.S. PATENT DOCUMENTS

| | | | |
|---|---|---|---|
| 2018/0110074 A1 | 4/2018 | Akkarakaran et al. | |
| 2020/0314913 A1* | 10/2020 | Rastegardoost .. | H04W 56/0045 |
| 2021/0120535 A1* | 4/2021 | Pan ..................... | H04W 72/044 |
| 2022/0086915 A1* | 3/2022 | Canonne-Velasquez ................... | |
| | | | H04W 74/006 |

OTHER PUBLICATIONS

"3rd Generation Partnership Project, Technical Specification Group Radio Access Network; NR; Medium Access Control (MAC) protocol specification (Release 16)" 3GPP TS 38.321 V16.0.0, Mar. 2020, 141 pages.

Shahab et al., "Grant-free Non-orthogonal Multiple Access for IoT: A Survey", Cornell University Library, Electrical Engineering and Systems Science, Signal Processing, arXiv:1910.06529v1, Oct. 15, 2019, 29 pages.

3rd Generation Partnership Project, Technical Specification Group Radio Access Network; NR; NR and NG-RAN Overall Description; Stage 2, Release 16, 3GPP TS 38.300 v16.1.0, Mar. 2020, 133 pages.

Bradley et al., "Internet of Everything: A $ 4.6 Trillion Public-Sector Opportunity", White Paper by Cisco Systems, Inc., San Jose, 2013, 17 pages.

Mahmood et al., "Uplink Grant-Free Access Solutions for URLLC services in 5G New Radio", Institute of Electrical and Electronics Engineers (IEEE), 2019 16th International Symposium on Wireless Communication Systems (ISWCS), Oulu, Finland, Aug. 27, 2019, 6 pages.

* cited by examiner

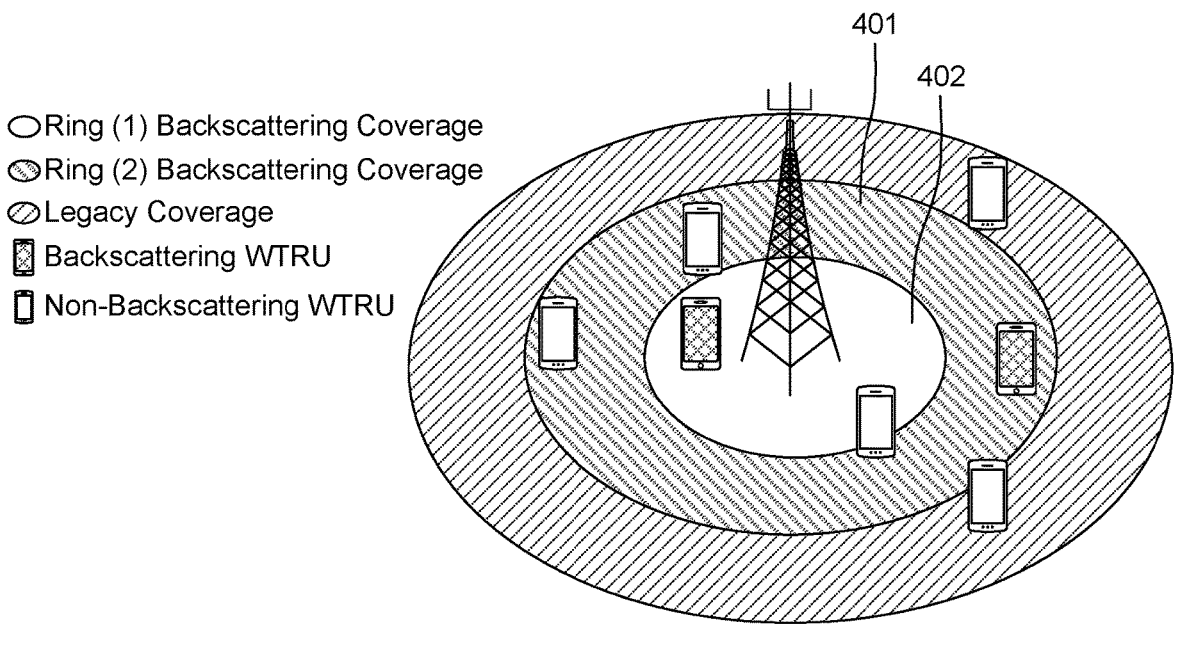
○ Ring (1) Backscattering Coverage
◎ Ring (2) Backscattering Coverage
⊘ Legacy Coverage
▣ Backscattering WTRU
▯ Non-Backscattering WTRU
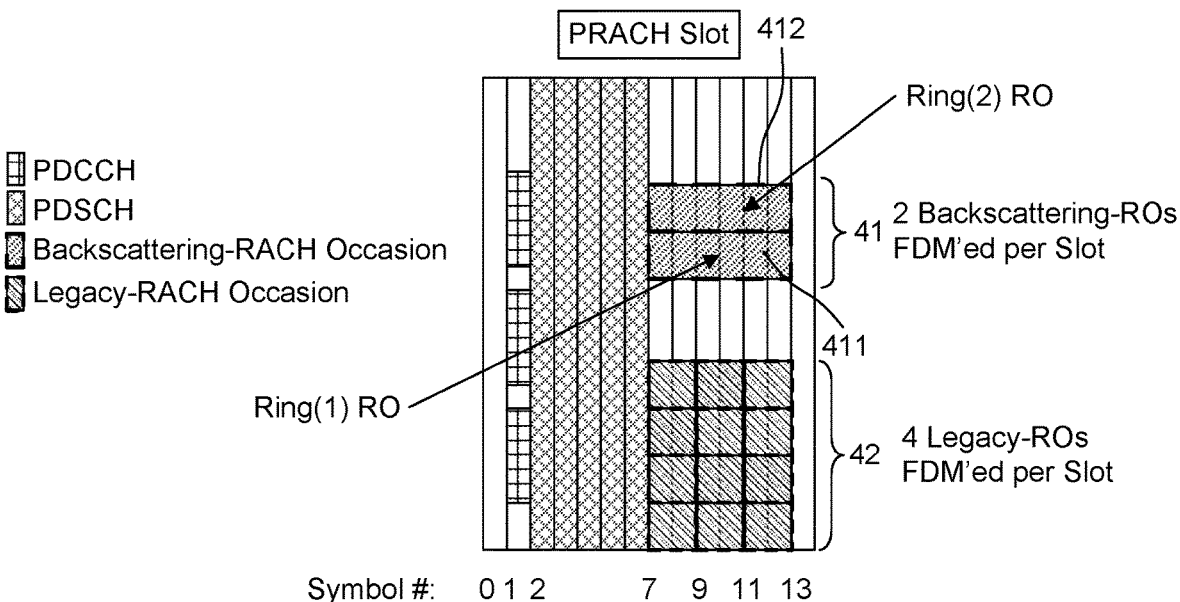
PRACH Slot    412
Ring(2) RO
▣ PDCCH
▣ PDSCH
▨ Backscattering-RACH Occasion
▨ Legacy-RACH Occasion
2 Backscattering-ROs
FDM'ed per Slot
Ring(1) RO
4 Legacy-ROs
FDM'ed per Slot
Symbol #:    0 1 2    7  9  11 13
FIG. 4

(b) 3 Frequency and 3 Time Resources (a) 3 Frequency and 4 Time Resources

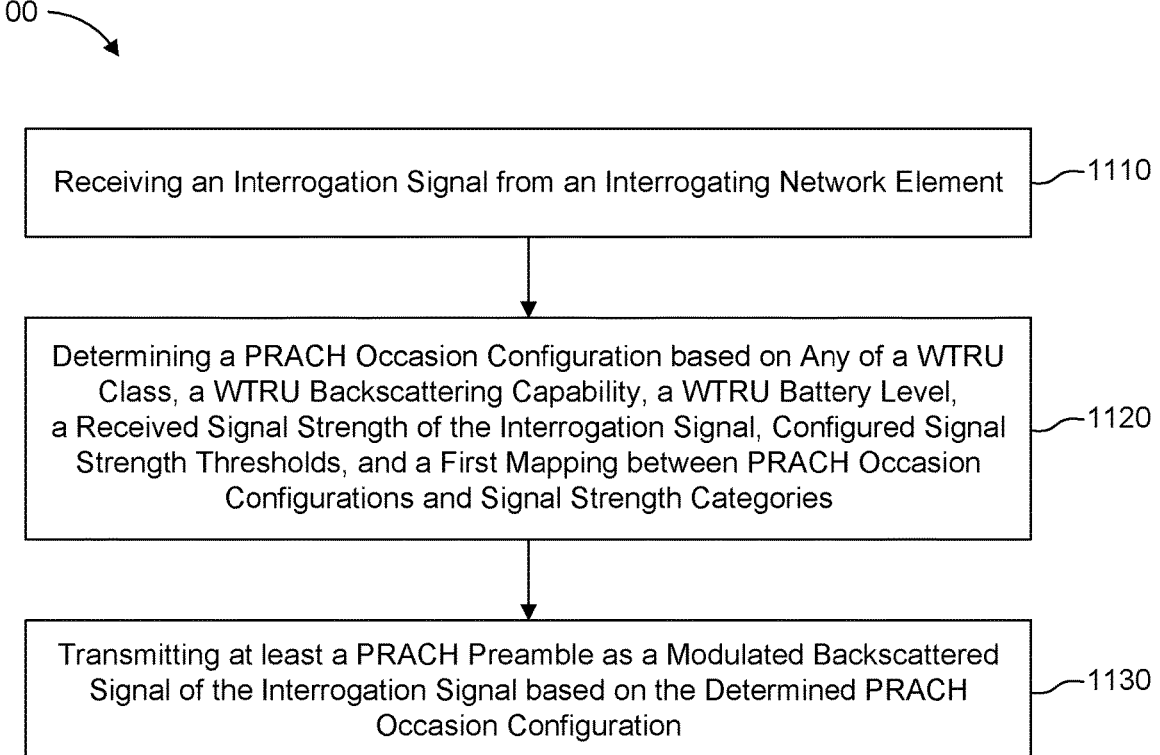

Receiving an Interrogation Signal from an Interrogating Network Element ⌐1110

Determining a PRACH Occasion Configuration based on Any of a WTRU Class, a WTRU Backscattering Capability, a WTRU Battery Level, a Received Signal Strength of the Interrogation Signal, Configured Signal Strength Thresholds, and a First Mapping between PRACH Occasion Configurations and Signal Strength Categories ⌐1120

Transmitting at least a PRACH Preamble as a Modulated Backscattered Signal of the Interrogation Signal based on the Determined PRACH Occasion Configuration ⌐1130

Figure 12:
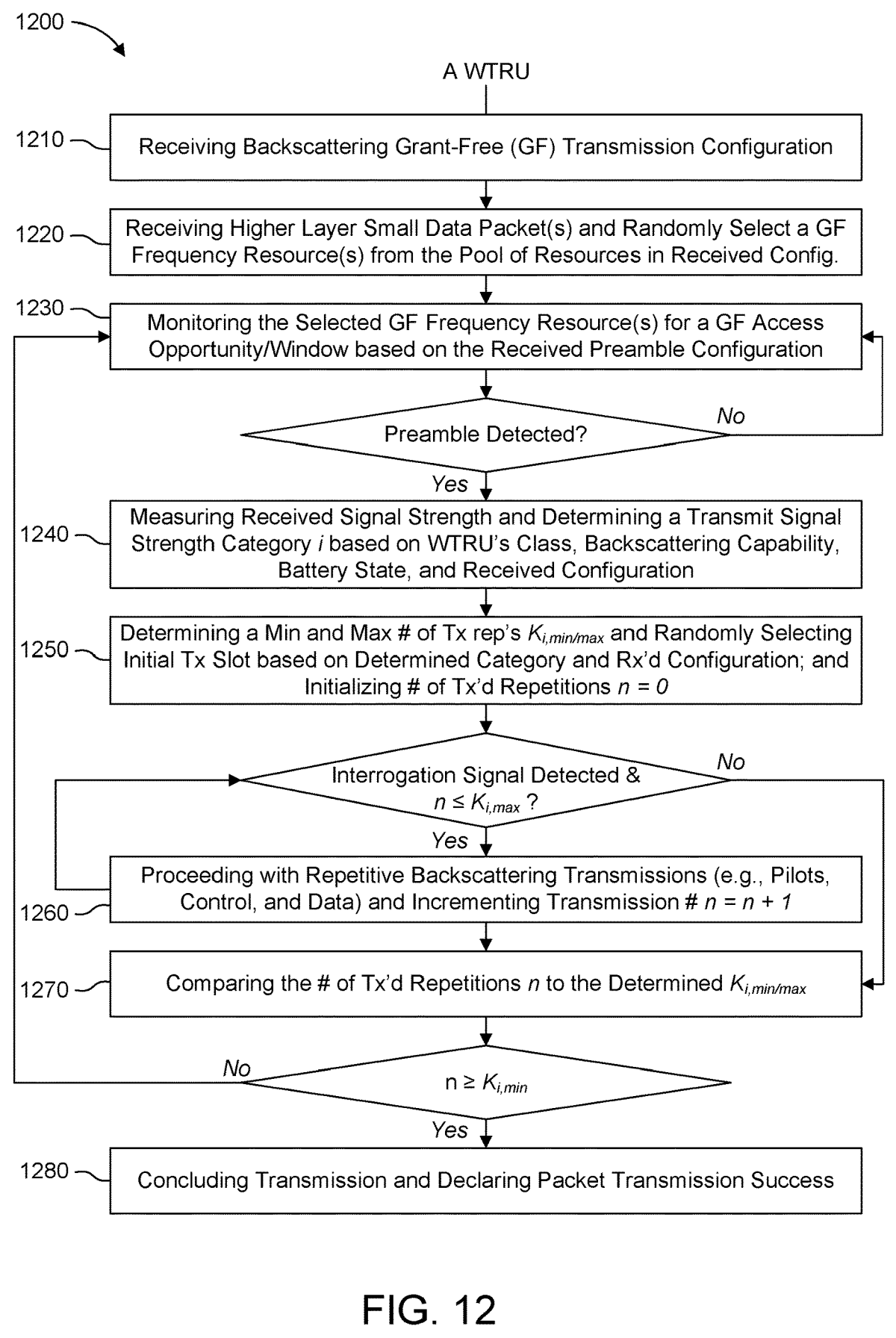

A WTRU

1210 — Receiving Backscattering Grant-Free (GF) Transmission Configuration

1220 — Receiving Higher Layer Small Data Packet(s) and Randomly Select a GF Frequency Resource(s) from the Pool of Resources in Received Config.

1230 — Monitoring the Selected GF Frequency Resource(s) for a GF Access Opportunity/Window based on the Received Preamble Configuration Preamble Detected? — No

*Yes*

1240 — Measuring Received Signal Strength and Determining a Transmit Signal Strength Category $i$ based on WTRU's Class, Backscattering Capability, Battery State, and Received Configuration 1250 — Determining a Min and Max # of Tx rep's $K_{i,min/max}$ and Randomly Selecting Initial Tx Slot based on Determined Category and Rx'd Configuration; and Initializing # of Tx'd Repetitions $n = 0$ Interrogation Signal Detected & $n \leq K_{i,max}$ ? — No

*Yes*

1260 — Proceeding with Repetitive Backscattering Transmissions (e.g., Pilots, Control, and Data) and Incrementing Transmission # $n = n + 1$ 1270 — Comparing the # of Tx'd Repetitions $n$ to the Determined $K_{i,min/max}$ No — $n \geq K_{i,min}$

*Yes*

1280 — Concluding Transmission and Declaring Packet Transmission Success

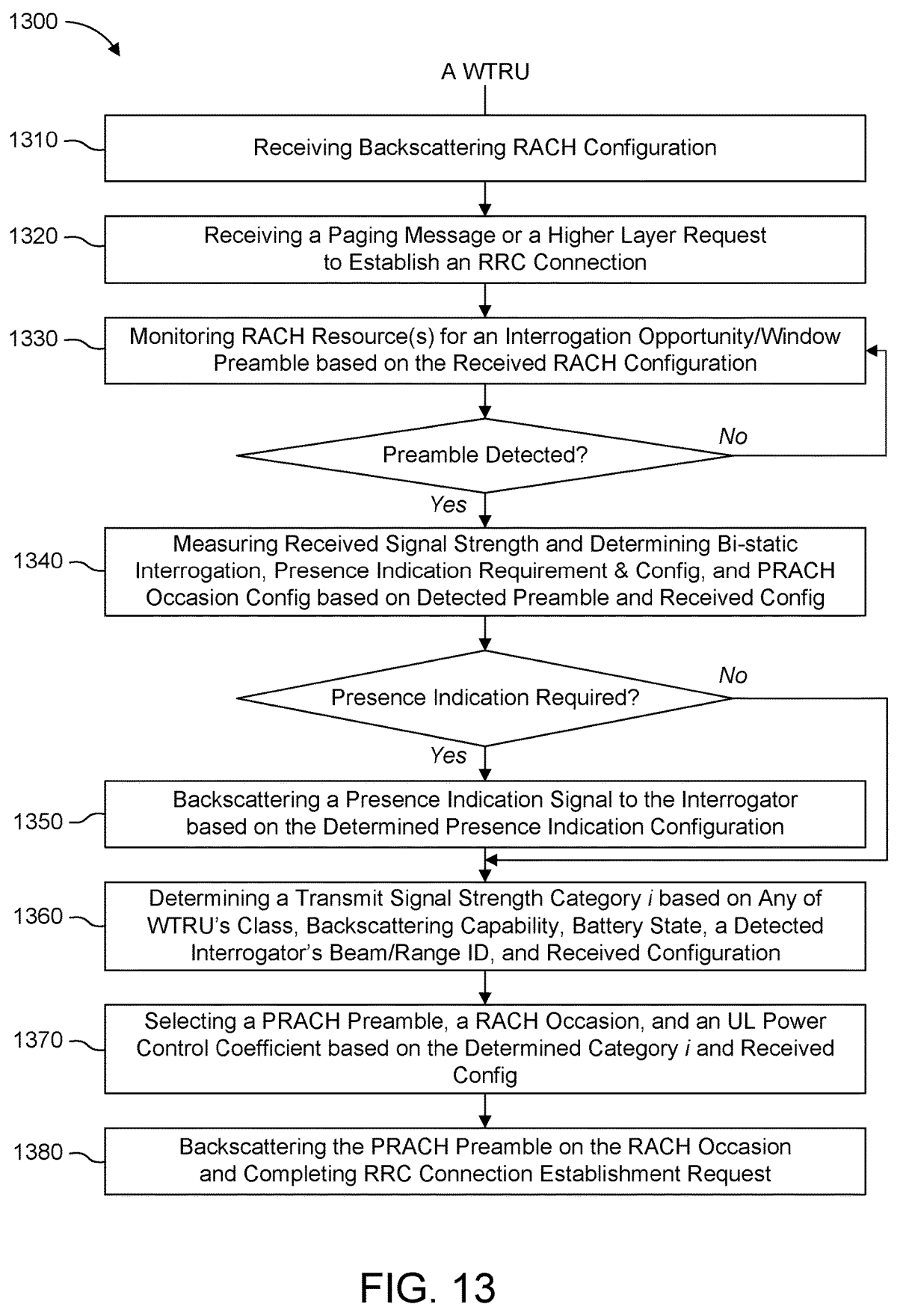

A WTRU

1310 — Receiving Backscattering RACH Configuration

1320 — Receiving a Paging Message or a Higher Layer Request to Establish an RRC Connection 1330 — Monitoring RACH Resource(s) for an Interrogation Opportunity/Window Preamble based on the Received RACH Configuration Preamble Detected?    *No*

*Yes*

1340 — Measuring Received Signal Strength and Determining Bi-static Interrogation, Presence Indication Requirement & Config, and PRACH Occasion Config based on Detected Preamble and Received Config Presence Indication Required?    *No*

*Yes*

1350 — Backscattering a Presence Indication Signal to the Interrogator based on the Determined Presence Indication Configuration 1360 — Determining a Transmit Signal Strength Category *i* based on Any of WTRU's Class, Backscattering Capability, Battery State, a Detected Interrogator's Beam/Range ID, and Received Configuration 1370 — Selecting a PRACH Preamble, a RACH Occasion, and an UL Power Control Coefficient based on the Determined Category *i* and Received Config 1380 — Backscattering the PRACH Preamble on the RACH Occasion and Completing RRC Connection Establishment Request

FIG. 13

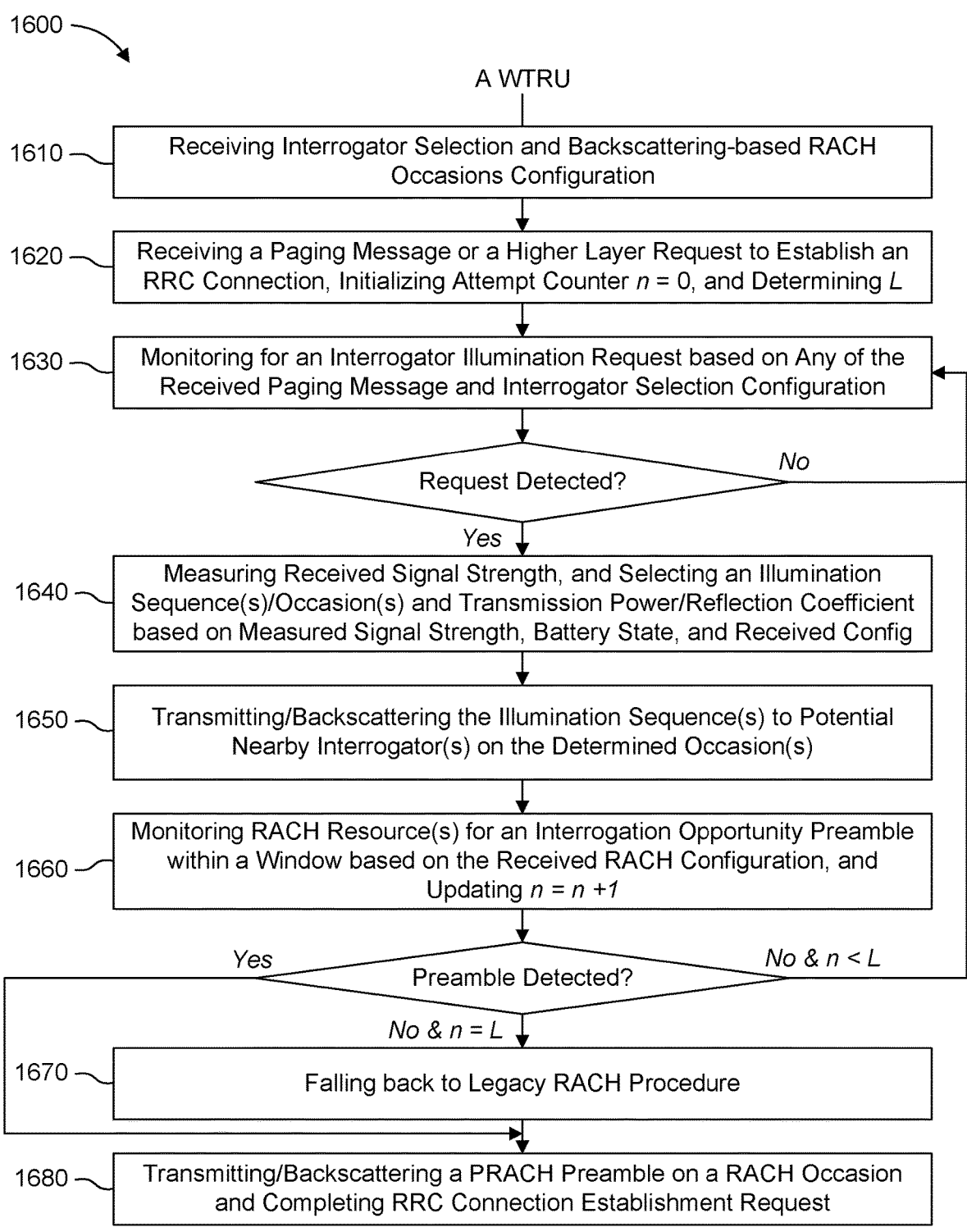

1600

A WTRU

1610 — Receiving Interrogator Selection and Backscattering-based RACH Occasions Configuration 1620 — Receiving a Paging Message or a Higher Layer Request to Establish an RRC Connection, Initializing Attempt Counter $n = 0$, and Determining $L$ 1630 — Monitoring for an Interrogator Illumination Request based on Any of the Received Paging Message and Interrogator Selection Configuration Request Detected?    No Yes 1640 — Measuring Received Signal Strength, and Selecting an Illumination Sequence(s)/Occasion(s) and Transmission Power/Reflection Coefficient based on Measured Signal Strength, Battery State, and Received Config 1650 — Transmitting/Backscattering the Illumination Sequence(s) to Potential Nearby Interrogator(s) on the Determined Occasion(s)

1660 — Monitoring RACH Resource(s) for an Interrogation Opportunity Preamble within a Window based on the Received RACH Configuration, and Updating $n = n + 1$ Yes    Preamble Detected?    No & $n < L$ No & $n = L$ 1670 — Falling back to Legacy RACH Procedure 1680 — Transmitting/Backscattering a PRACH Preamble on a RACH Occasion and Completing RRC Connection Establishment Request

FIG. 16

Full TA w/ DL Synch:                    $T_{full} = 2 \, (D_1)/c$
Differential TA w/ UL Synch:     $T_{diff} = (D_1 + D - D_0)/c$

- - - - - - - -▶     UL Synchronization
                          (Bi-static Backscattering)

- - - - - -▶     DL Synchronization
                          (Mono-static Backscattering

2000

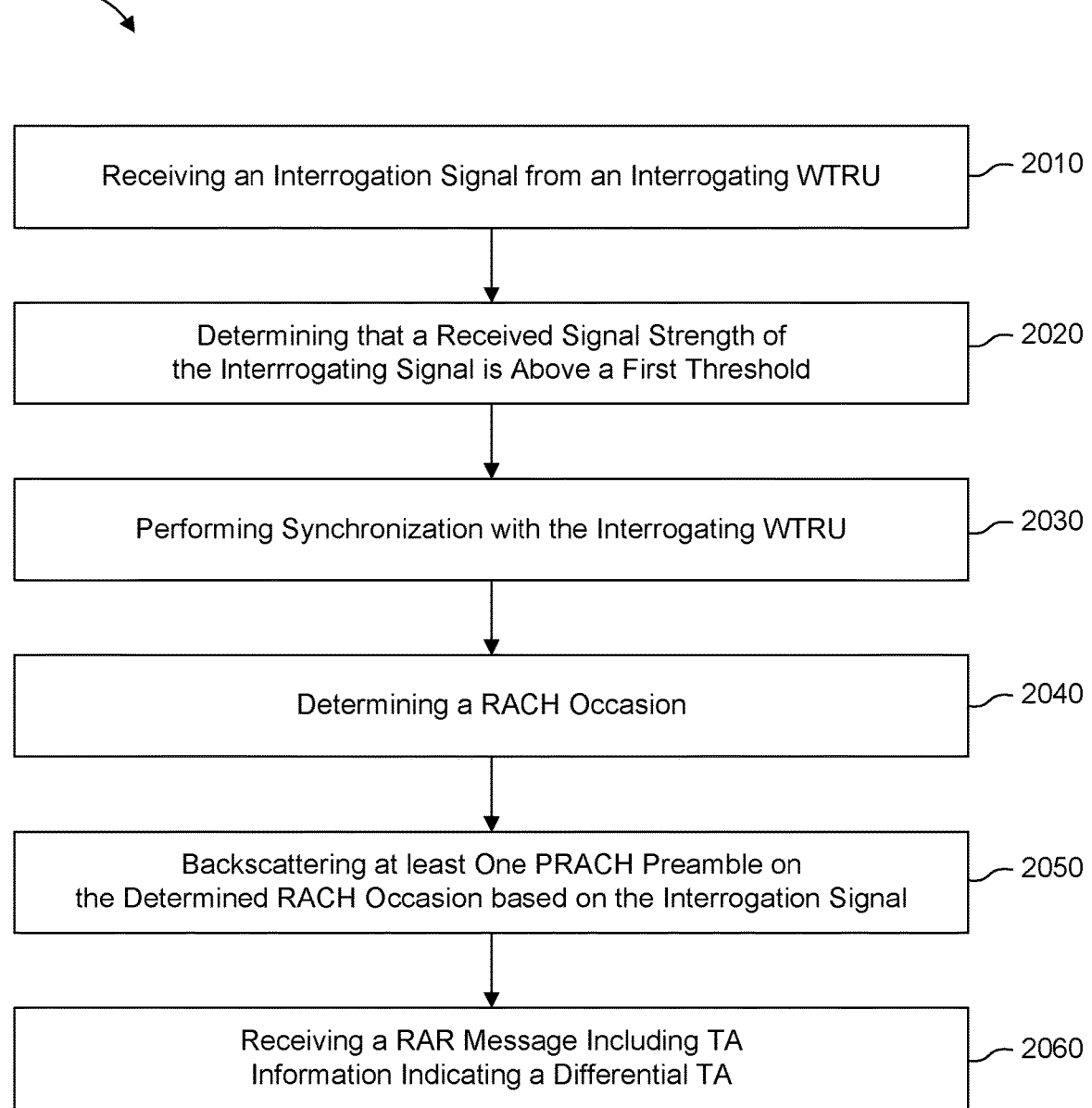

Receiving an Interrogation Signal from an Interrogating WTRU — 2010

Determining that a Received Signal Strength of the Interrrogating Signal is Above a First Threshold — 2020

Performing Synchronization with the Interrogating WTRU — 2030

Determining a RACH Occasion — 2040

Backscattering at least One PRACH Preamble on the Determined RACH Occasion based on the Interrogation Signal — 2050

Receiving a RAR Message Including TA Information Indicating a Differential TA — 2060

FIG. 20

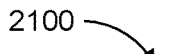

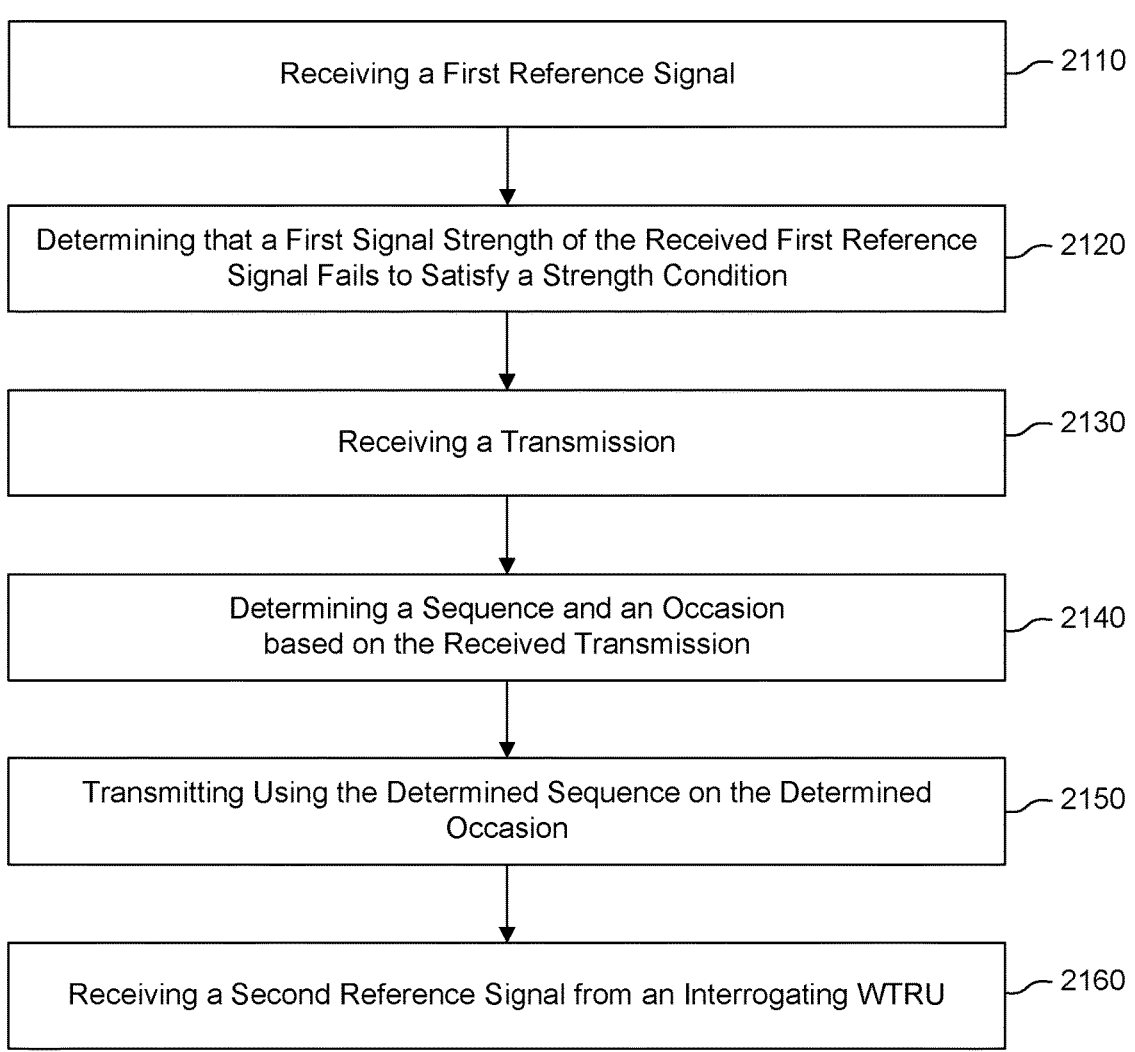

2100

| | |
|---|---|
| Receiving a First Reference Signal | 2110 |
| Determining that a First Signal Strength of the Received First Reference Signal Fails to Satisfy a Strength Condition | 2120 |
| Receiving a Transmission | 2130 |
| Determining a Sequence and an Occasion based on the Received Transmission | 2140 |
| Transmitting Using the Determined Sequence on the Determined Occasion | 2150 |
| Receiving a Second Reference Signal from an Interrogating WTRU | 2160 |

FIG. 21

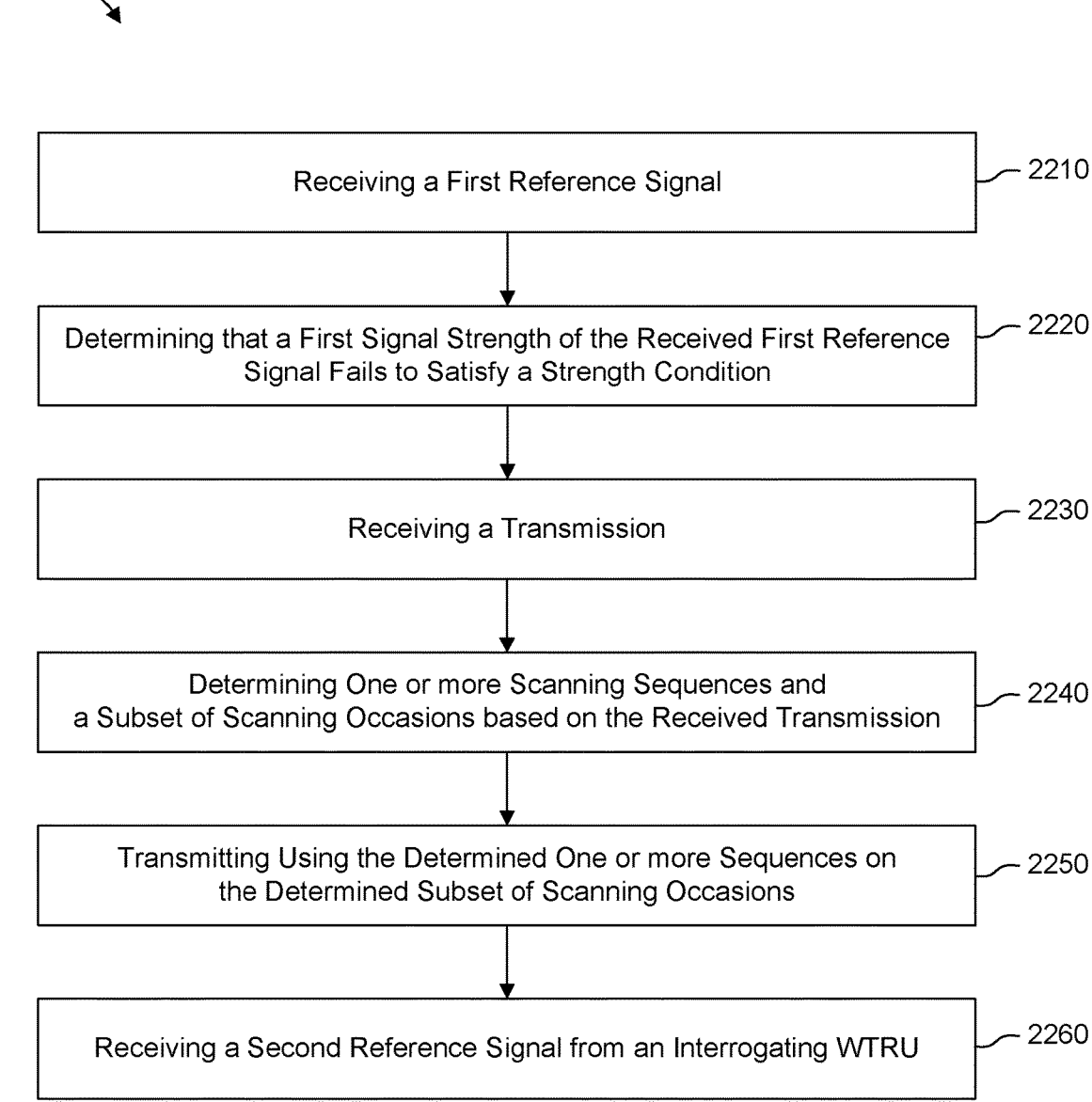

2200

Receiving a First Reference Signal — 2210

Determining that a First Signal Strength of the Received First Reference Signal Fails to Satisfy a Strength Condition — 2220

Receiving a Transmission — 2230

Determining One or more Scanning Sequences and a Subset of Scanning Occasions based on the Received Transmission — 2240

Transmitting Using the Determined One or more Sequences on the Determined Subset of Scanning Occasions — 2250

Receiving a Second Reference Signal from an Interrogating WTRU — 2260

FIG. 22

METHOD AND APPARATUS OF RANDOM CHANNEL ACCESS OVER ZERO ENERGY AIR-INTERFACE

CROSS-REFERENCE TO RELATED APPLICATIONS

This application is a U.S. National Stage Application under 35 U.S.C. § 371 of International Patent Application No. PCT/US2022/014671, filed Feb. 1, 2022, which claims the benefit of U.S. Provisional Patent Application No. 63/147,075, filed Feb. 8, 2021, and U.S. Provisional Patent Application No. 63/234,907, filed Aug. 19, 2021, each of which is incorporated herein by reference.

BACKGROUND

The present disclosure relates to wireless and/or wired communications networks, including, but not exclusively, to methods, apparatuses, systems, etc. directed to random channel access over zero energy (ZE) air-interface(s).

SUMMARY

Methods, apparatuses, systems, etc., directed to random channel access (e.g., via a random-access channel (RACH), and/or a grant-free access) over zero energy (ZE) air-interface(s) are disclosed herein. In an embodiment, a wireless transmit/receive unit (WTRU) may receive a first reference signal. For example, the WTRU may determine that a first signal strength of the received first reference signal may fail to satisfy a strength condition, and responsively the WTRU may: (i) receive a transmission, (ii) determine a sequence and an occasion based on the received transmission, (iii) transmit using the determined sequence on the determined occasion, and (iv) receive a second reference signal from an interrogating WTRU.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 4 is a diagram illustrating an example of backscattering coverage and mapping to backscattering physical random-access channel (PRACH) occasions configuration;

FIG. 6 is a diagram illustrating two examples of hybrid resource allocations for three different WTRUS;

FIG. 11 is a diagram illustrating an example of a method for transmitting a backscattered signal;

FIG. 12 is a diagram illustrating an example of a method for transmitting a backscattered signal by a WTRU under grant-free channel access based on the K-repetition scheme;

FIG. 13 is a diagram illustrating an example of a method for requesting radio resource control (RRC) connection establishment using bi-static backscattering;

FIG. 16 is a diagram illustrating an example of a network-controlled interrogator selection method prior to RRC connection establishment request;

FIG. 20 is a diagram illustrating an example of a method for transmitting a PRACH preamble as a bi-static backscattered signal and receiving a (e.g., differential) timing advance command;

FIG. 21 is a diagram illustrating an example of a network-controlled method for selecting an interrogating WTRU;

FIG. 22 is a diagram illustrating an example of a device-controlled method for selecting an interrogating WTRU.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Communications Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
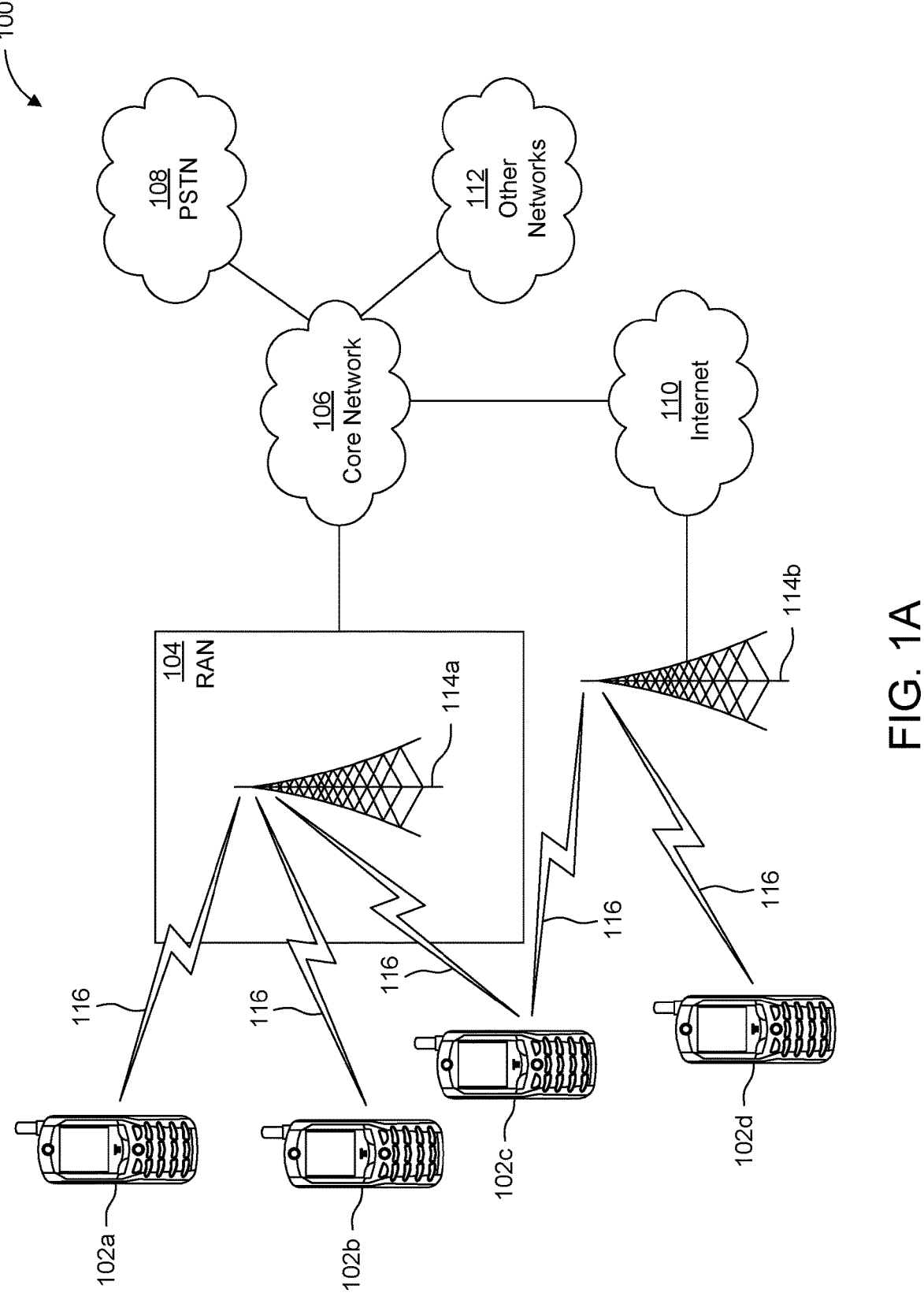
FIG. 1A is a system diagram illustrating an example communications system.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, an NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
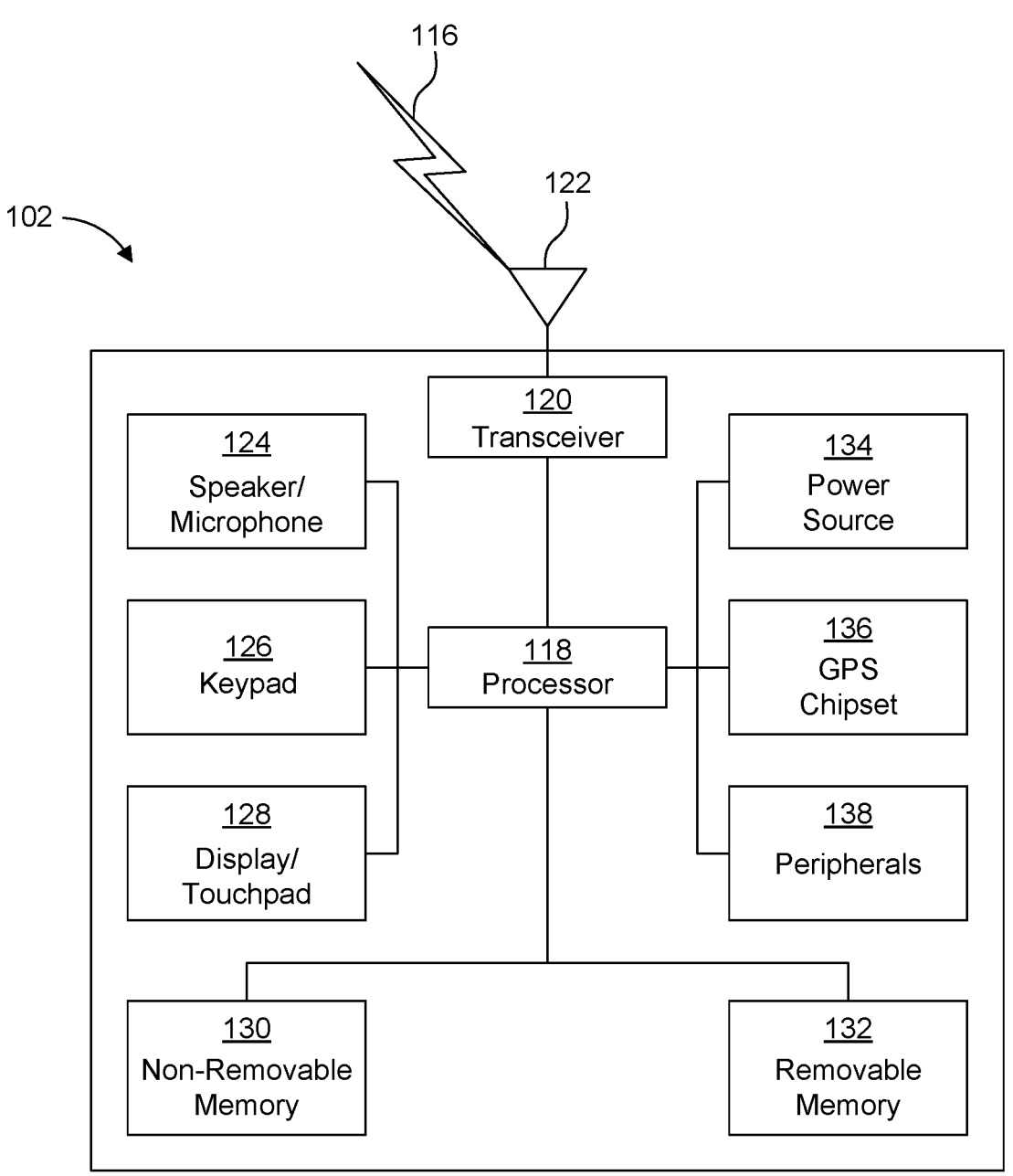
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
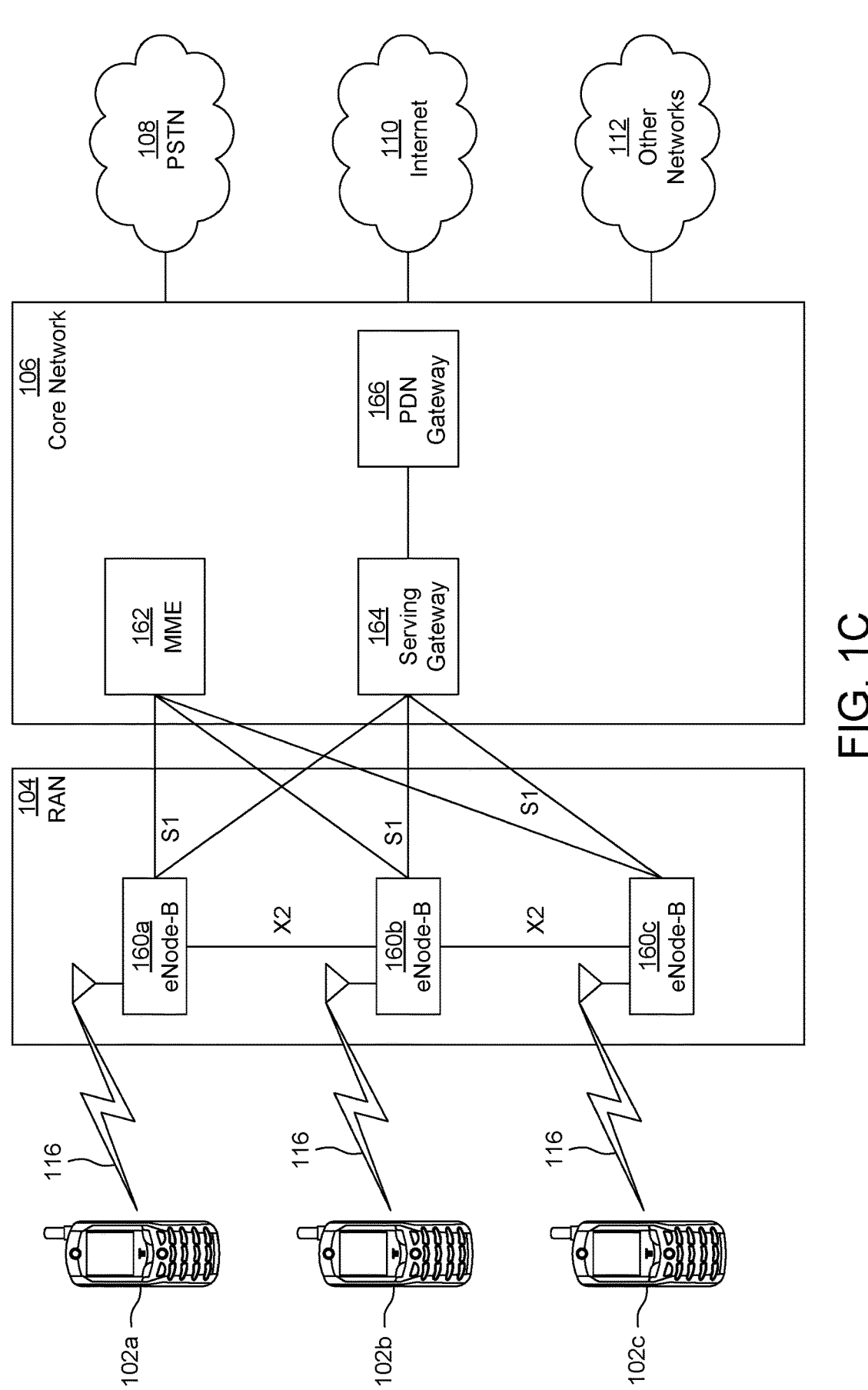
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
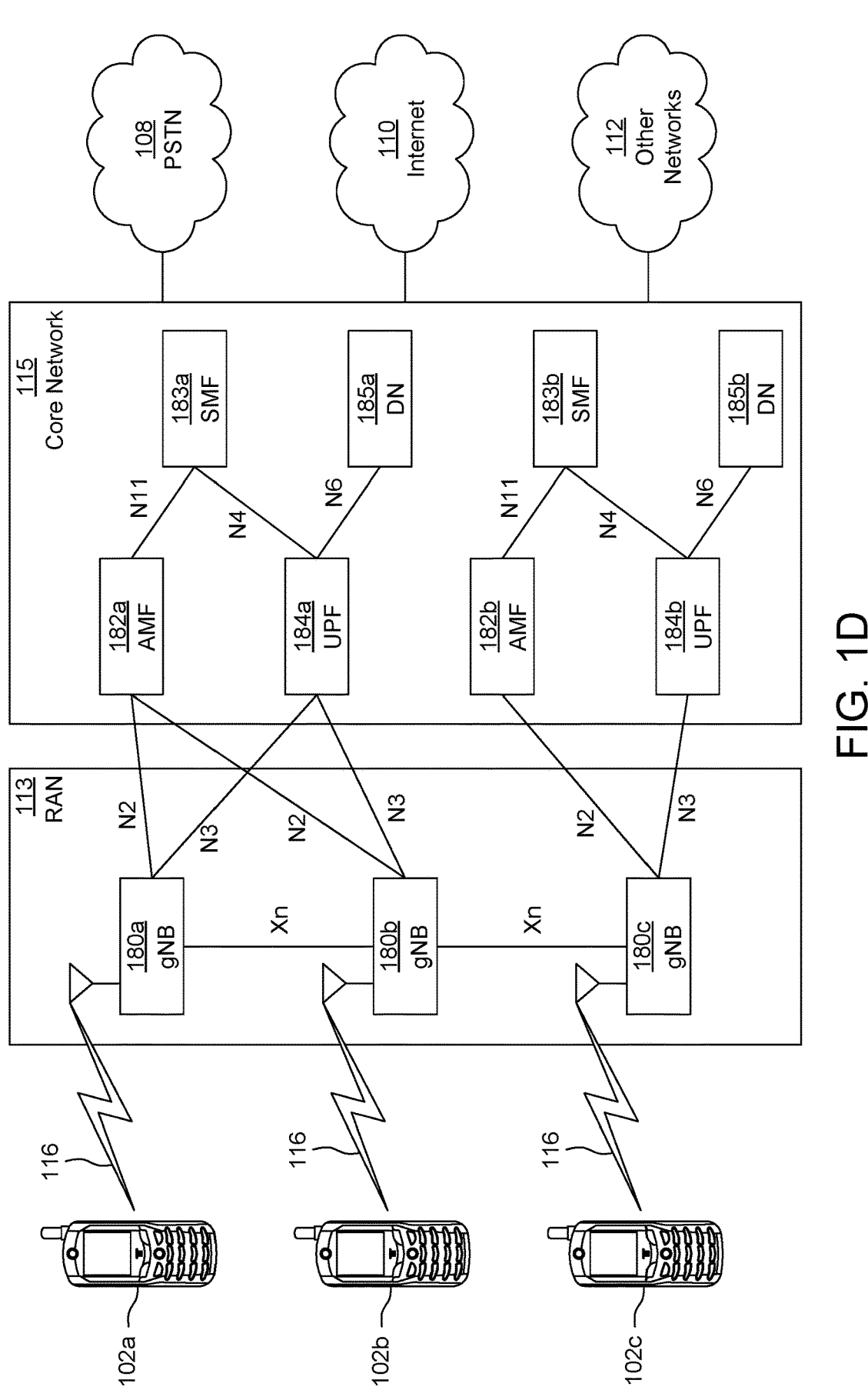
FIG. 1D is a system diagram illustrating a further example RAN and a further example of a CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples of Passive and Semi-Passive Transceivers

In wireless technology such as e.g., cellular and WLAN, RF front ends may include (e.g., a mix of) any of passive and active components (e.g., circuits). For example, passive components may include any of receiving (Rx) antennas, Tx/Rx path switches and filters. Passive components may function (e.g., operate) with any of little and no power. For example, active components may function (e.g., operate) with power. For example, active components may include any of an oscillator e.g., to tune to the carrier frequency, a low noise amplifier and analog to digital (A/D) converters in the Rx path.

There may be RF circuitry that may (e.g., be able to) process received RF waveforms which may be collected through the antenna front-end by the receiving WTRU in absence of an (e.g., active) power supply. For example, a receiving WTRU may harvest energy from the received RF waveform e.g., to run the circuitry to process signals. Such receiving WTRUs (which may be referred to herein as passive receivers) may include (e.g., use) RF components such as any of cascading capacitors, zero-bias Schottky diodes and micro-electromechanical systems (MEMS) to perform (e.g., provide) any functionality for any of voltage multipliers, rectifiers, charge pumps and signal detectors. For example, passive receivers may operate in the antenna far-field and may support (e.g., reasonable) link budgets. In embodiments described herein, the terms passive receiver and zero-energy receiver may be used interchangeably.

For example, a passive receiver may perform (e.g., basic) signal detection such as e.g., a correlation for a (e.g., known) signature. For example, a passive receiver may be put into energy harvesting mode by e.g., obtaining (e.g., accumulating) energy from the RF waveform entering the receiver front-end e.g., through the Rx antenna. Link budget characteristic of any of small and medium area cellular base stations may be supported. For example, passive receivers may be used as any of wake-up radios (e.g., to trigger device internal wake-up) and signal interrupts following the detection of wake-up signaling which may prompt the (e.g., main) modem receiver e.g., using active RF components to start up.

There may be RF circuitry that may be capable of enabling passive signal transmissions in the absence of active power supply. The passive transmitter (which may be referred to herein as backscattering WTRU) may process a received RF waveform (which may be referred to herein as interrogation signal), and modulate a reflected (e.g., backscattered) signal towards a receiving network element. For example, the interrogation signal may be a signal received from (e.g., generated by) an interrogating network element, which may be any of the receiving network element and any other network element. For example, the interrogation signal may be processed (e.g., treated) by, for example, a backscattering WTRU as a power source to generate and transmit a signal. For example, the interrogation signal may be processed (e.g., treated) as an RF carrier to be modulated and backscattered into the wireless channel where the carrier frequency of the backscattered signal may be the same (e.g., or slightly shifted) as the interrogation signal. The backscattering (e.g., architecture) may be referred to herein as mono-static backscattering in a case where the interrogating network element is the same as the receiving network element of the backscattered signal. The backscattering (e.g., architecture) may be referred to herein as bi-static backscattering in a case where the interrogating network element is different from the receiving network element of the backscattered signal.

Passive receivers may allow to reduce the WTRU power consumption. For example, a cellular (any of 3G, 4G, and 5G) modem transceiver may use up to a few hundred milliwatts (mWs) in order to demodulate and/or process received signals during active reception(s), such as, e.g., in connected mode (e.g., a radio resource control connected (RRC_CONNECTED) mode). For example, the power consumption may depend on (e.g., scale with) any of the number of RF front-end chains active on the WTRU, the channel bandwidth used for reception and the received data rate. In a case where the WTRU is in an idle mode (such as e.g., RRC_IDLE) with no data being any of received and transmitted, cellular radio power saving protocols such as, for example, discontinuous reception (e)DRX may allow the receiver to be powered on (e.g., only) a few times per second. For example, the WTRU may perform tasks such as measuring the received signal strength of any of the serving and neighbor cells for the purpose of any of cell (re-) selection procedures and reception of paging channels. For example, the WTRU may perform any of automatic frequency control (AFC) and channel estimation e.g., in support of coherent demodulation. WTRU power consumption in idle mode may be in the order of several mWs. In 3GPP Release 15 enhanced machine type communication (eMTC) and narrow-band internet of things (NB-IoT), sequence detection circuitry for processing of in-band wake-up signals in idle mode (e.g., RRC_IDLE) may be performed by a (e.g., dedicated) wake-up receiver. This may allow to power down any of the A/D converters and other parts of the digital baseband processor. For example, some (e.g., other) active components may (e.g., still) be used in the RF front-end such as e.g., any of low-noise amplifiers and oscillators. WTRU power consumption in idle mode (e.g., RRC_IDLE) may be reduced to about 1 mW.

Semi-passive transceivers, for example, may (e.g., try to) strike a balance between active transceivers with e.g., a high-power budget from an active power supply and passive transceivers e.g., without any active power supply and e.g., any of lower performance and higher resource expectations. The semi-passive transceiver may use an active power supply, with a lower power budget than active transceivers, for example, to improve any of its performance and (e.g., close) link budget towards a receiving device during transmission, e.g., beyond what may be obtained (e.g., achieved) by a passive WTRU.

Random Access Examples

A random access (RA) procedure may be initiated (e.g., triggered) based on any of an initial access from an idle state (e.g., RRC_IDLE), a (e.g., RRC) connection re-establishment procedure, a transition from an inactive state (e.g., RRC_INACTIVE), a request for other system information (SI), and a beam failure recovery.

There may be two types of RA procedures: a 4-step RA type with MSG1, and a 2-step RA type with MSGA. Both types of RA procedures may provide (e.g., support) a contention-based random access (CBRA) and/or a contention-free random access (CFRA).

Figure 2A:
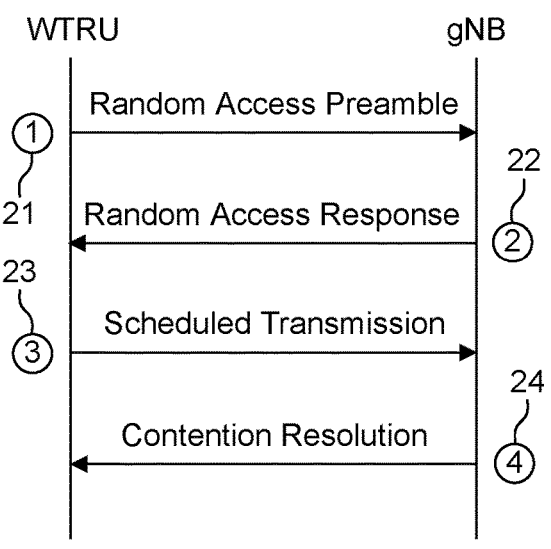
FIG. 2A, FIG. 2B, FIG. 2C and FIG. 2D are four diagrams illustrating four examples of random-access procedures.
Figure 2B:
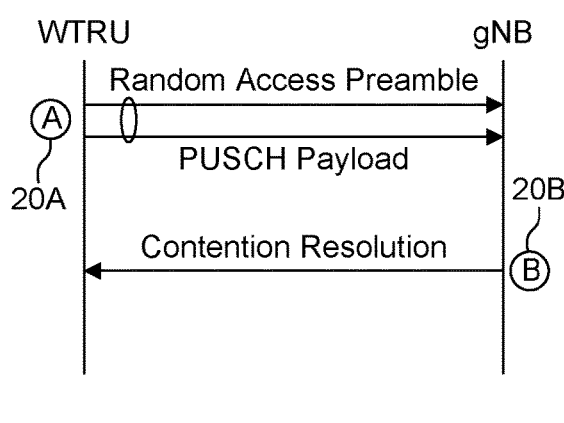
Figure 2C:
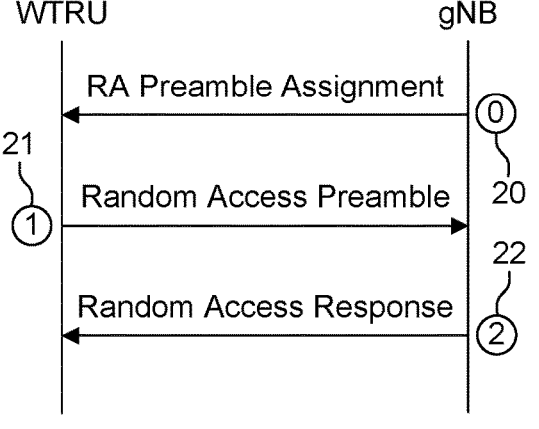
Figure 2D:
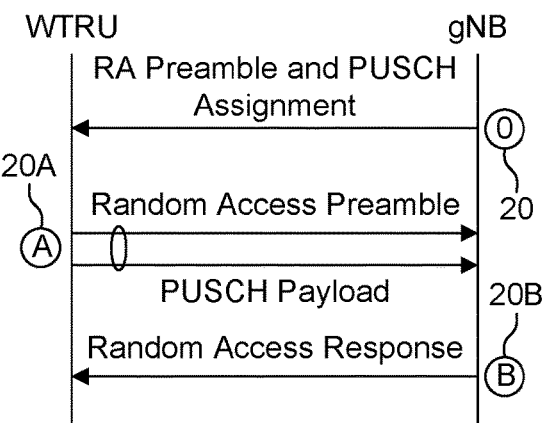

FIG. 2A, FIG. 2B, FIG. 2C and FIG. 2D are four diagrams illustrating four examples of random-access procedure(s). FIG. 2A is a diagram illustrating an example of a CBRA with 4-step RA type. FIG. 2B is a diagram illustrating an example of a CBRA with 2-step RA type. FIG. 2C is a diagram illustrating an example of a CFRA with 4-step RA type. FIG. 2D is a diagram illustrating an example of a CFRA with 2-step RA type.

For example, a WTRU may select the type of random access at initiation of the random-access procedure e.g., based on network configuration. In a case where CFRA resources are not configured, the WTRU may select between 2-step RA type and 4-step RA type based on a reference signal received power (RSRP) value (e.g., threshold). In a case where CFRA resources for 4-step RA type are configured, the WTRU may perform random-access with 4-step RA type. In a case where CFRA resources for 2-step RA type are configured, the WTRU may perform random-access with 2-step RA type.

For example, the network may not configure CFRA resources for 4-step and 2-step RA types (e.g., at the same time) for a Bandwidth Part (BWP). For example, CFRA with 2-step RA type may be used (e.g., only) for handover.

FIG. 2A and FIG. 2C illustrate two examples of 4-step RA type with respectively CBRA and CFRA. The WTRU may transmit a first message 21 (which may be referred to herein as MSG1) of the 4-step RA type. MSG1 may include a preamble (e.g., that may be transmitted) on the physical random-access channel (PRACH). After MSG1 transmission, the WTRU may monitor for a response from the network within, for example, a configured window. For CFRA, a (e.g., dedicated) preamble for MSG1 transmission may be assigned by the network. After the WTRU may have received random access response 22 from the network, the WTRU may terminate (e.g., end) the random-access procedure as illustrated in FIG. 2C. For CBRA, after reception of the random-access response 22, the WTRU may send a third message (which may be referred to as MSG3) using the UL grant that may have been scheduled in the random-access response 22. The WTRU may monitor contention resolution as illustrated in FIG. 2A. In a case where contention resolution is not successful after MSG3 (re)transmission(s), the WTRU may go back to MSG1 21 transmission.

FIG. 2B and FIG. 2D illustrate two examples of 2-step RA type with respectively CBRA and CFRA. The WTRU may transmit a message 20A (which may be referred to herein as MSGA) of the 2-step RA type. MSGA may include a preamble (e.g., that may be transmitted) on the PRACH and a payload (e.g., that may be transmitted) on the physical uplink shared channel (PUSCH). After MSGA transmission, the WTRU may monitor for a response from the network within, for example, a configured window. For CFRA, a (e.g., dedicated) preamble and PUSCH resource may be configured for MSGA transmission. After, the WTRU may have received the network response 20B (which may be referred to herein as MSGB), the WTRU may terminate (e.g., end) the random-access procedure as illustrated in FIG. 2D. For CBRA, in a case where the contention resolution is successful, after receiving the network response 20B (which may be referred to herein as MSGB), the WTRU may terminate (e.g., end) the random-access procedure as illustrated in FIG.2B.

In a case where a fallback indication is received in MSGB, the WTRU may perform MSG3 transmission based on (e.g., using) the UL grant scheduled in the fallback indication and may monitor contention resolution. In a case where the contention resolution is not successful after MSG3 (re)transmission(s), the WTRU may perform a (e.g., go back to) MSGA transmission. For example, the WTRU may be configured to switch to CBRA with 4-step RA type in a case where the random-access procedure with 2-step RA type is not completed after a number of MSGA (re)transmissions.

For example, a cell may be configured with supplementary uplink (SUL). For random-access in such a cell, the network may (e.g., explicitly) signal (e.g., transmit information indicating) which carrier may be used (e.g., any of UL and SUL). For example, the WTRU may select the SUL carrier in a case where the (e.g., measured) quality of the DL fails to satisfy a (e.g., strength) condition, such as e.g., being lower than a (e.g., broadcast threshold) value. The WTRU may perform carrier selection e.g., before selecting between 2-step and 4-step RA type. The RSRP (e.g., strength) condition parameter(s) (e.g., threshold) value that may be used for selecting between 2-step and 4-step RA type may be configured e.g., via configuration information transmission (e.g., separately) for UL and SUL. For the sake of clarity, satisfying, failing to satisfy a (e.g., strength) condition and "configuring (e.g., strength) condition parameter(s) are described throughout embodiments described herein as relative to a threshold (e.g., greater or lower than) a (e.g., threshold) value, configuring the (e.g., threshold) value, etc . . . ). For example, satisfying a (e.g., strength) condition may be described as being above a (e.g., threshold) value, and failing to satisfy a (e.g., strength) condition may be described as being below a (e.g., threshold) value. Embodiments described herein are not limited to threshold-based strength conditions. Any kind of other (e.g., strength) condition and parameter(s) (such as e.g., belonging or not belonging to a range of values) may be applicable to embodiments described herein. After a (e.g., first) UL transmission of the RA procedure on the selected carrier, (e.g., all) other uplink transmissions of the RA procedure may remain on the selected carrier. In a case where carrier aggregation (CA) is configured, random-access procedure with 2-step RA type may (e.g., only) be performed on the primary cell (PCell) and contention resolution may be cross-scheduled by the PCell. In a case where CA is configured, for random-access procedure with 4-step RA type, the first three steps of CBRA may occur (e.g., be transmitted) on the PCell and contention resolution (e.g., step 4) may be cross-scheduled by the PCell. For example, the three steps of a CFRA that may have started on the PCell may remain on the PCell. For example, CFRA may be initiated by the gNB on the secondary cell (SCell) (e.g., only) to establish timing advance for a secondary timing advance group (TAG). For example, the procedure may be performed (e.g., initiated) by the gNB with a physical downlink control channel (PDCCH) order that may be sent on a scheduling cell of an activated SCell of the secondary TAG. The preamble may be transmitted on the indicated SCell, and the random-access response may be transmitted on the PCell. Throughout embodiments described herein, the terms "eNB", "gNB" "base station (BS)" and "serving BS" may be used interchangeably to designate a network element including a base station.

UL Scheduling for Grant-Free Access Example

For example, a grant-free (GF) random access may allow to access resources without undergoing assignment through, e.g., a handshake process.

For example, a GF random access may allow a WTRU with available traffic to transmit data (e.g., along with control information) in the first transmission itself.

For example, GF random access may increase likelihood of collisions that may result from uncontrolled channel access.

For example, reliability enhancement methods may be applicable to a GF random access e.g., for improving transmission performances. Reliability enhancement methods may include any of retransmissions e.g., shared resources and non-orthogonal multiple access (NOMA) with overlapping transmissions that may be resolved through (e.g., advanced) receivers.

For example, the control of GF channel access may be performed by any of a collision free access control and a collision-based access control. For example, transmissions may be pre-allocated over (e.g., dedicated) resources, which may be adapted to e.g., periodic traffic with e.g., fixed pattern. In another example, transmissions may be shared among multiple WTRUs with contention, which may be adapted to e.g., sporadic traffic and may improve the resource utilization efficiency and flexibility.

According to embodiments, in the UL, a GF configured WTRU may be connected and synchronized (e.g., and ready for an ultra-reliable low latency communications (URLLC) transmission).

Examples of Retransmission Schemes

In a first set of examples, retransmission-based reliability enhancement methods may include any of a reactive GF method and a K-repetitions GF method.

For example, in the reactive GF method, a retransmission may be performed in a case where a NACK is received.

For example, in the K-repetitions GF method, a predefined number (which may be referred to herein as K) of repetitions (e.g., any of replicas, and redundancy versions (RVs)) may be transmitted e.g., before receiving a feedback.

In a second set of examples, retransmission-based reliability enhancement methods may include any of proactive GF method, a reactive GF with power boost method, and a repetition with hybrid allocation GF method.

For example, in the proactive GF method, a transmission may be proactively resent (e.g., repeated) until an acknowledge (ACK) message may be received (e.g., repetitions with early termination).

For example, in the reactive GF with power boost method, a retransmission with a power boost may be performed in a case where a NACK is received.

For example, in the repetition with hybrid allocation GF method, a combination of (e.g., dedicated and shared) resources may be any of allocated and configured for (re-)transmissions by the WTRU. In the repetition with hybrid allocation GF method, the BS may, for example, attempt decoding transmissions over (e.g., configured dedicated) resources with high decoding success probability. For example, the BS may store successfully decoded transmissions. For example, the BS may perform successive interference cancellation (SIC) to remove interference in shared resources e.g., to improve decoding (e.g., success probability) of weak links.

Examples of NOMA Schemes

Non-orthogonal multiple access (NOMA) may allow to enhance reliability by enabling the utilization of sparse resource allocation patterns. NOMA may allow the overlapping of multiple WTRUs over a single radio resource, for example, by creating an opportunity to enable more autonomous and grant-free communication where WTRUs may transmit data e.g., at any time (e.g., whenever they may have data to transmit). NOMA may be applicable, for example, to massive machine-type communication (mMTC). The traffic characteristics of mMTC, e.g., uplink communication with small data size per WTRU and autonomous nature, may be different from human type communication (HTC).

According to embodiments, an UL NOMA scheme may include any of a scrambling-based scheme, a spreading-based scheme, an interleaving-based scheme, a compressive sensing-based scheme, and a compute and forward based scheme.

For example, in a scrambling-based scheme, any number of WTRUs may be distinguished (e.g., differentiated) based on different scrambling sequences. For example, multi-user detection (MUD) may be enabled based on any of successive interference cancellation (SIC) and joint consideration of any of a power domain (PD), NOMA, and (e.g., low rate) forward error correction (FEC) channel codes.

For example, the spreading-based scheme (e.g., inspired by code division multiple access (CDMA)) may be based on (non-)low density spreading (LDS) sequences. For example, an LDS scheme receiver may be based on (e.g., perform) iterative algorithms such as e.g., message passing algorithm (MPA) to obtain (e.g., near maximum likelihood) performance of joint data stream detection. For example, a non-LDS scheme receiver may be based on (e.g., perform) any of successive interference cancellation (SIC) and parallel interference cancellation (PIC).

For example, in the interleaving-based scheme, different multiplexed WTRUs (e.g., transmissions) may be distinguished (e.g., differentiated) based on different interleavers. The interleaving-based scheme may be used (e.g., processed) jointly with low rate FEC channel codes.

For example, in the compressive sensing-based scheme, the (e.g., inherent) sparsity of user activities may be used to solve the multi-user detection problem (e.g., the detection of any number of WTRUs (e.g., transmissions). For example, compressive sensing may be used for user activity detection. For example, multi-user detection may be used for (e.g., individual) data decoding.

For example, in the compute and forward based scheme, WTRUs may encode their messages with two (e.g., concatenated) channel codes; one for error correction, and the second for user detection. The sum of distinct second codewords (which may be less than a (e.g., maximum) number (e.g., $\tilde{K}$) associated with the scheme) may be e.g., unique.

Figure 3:
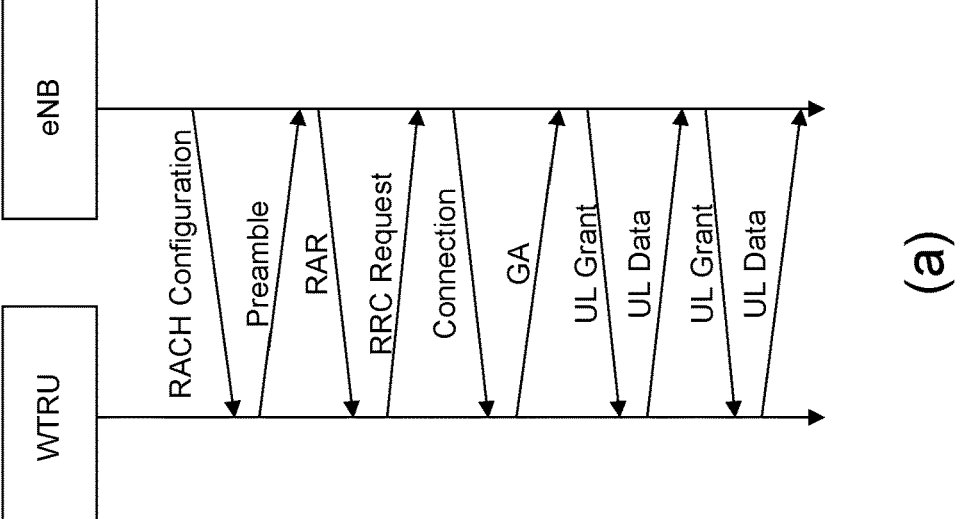
FIG. 3 is a diagram illustrating three examples of non-orthogonal multiple access (NOMA) based transmissions for respectively a random-access channel (RACH) based grant-based procedure (a), a RACH-based grant-free procedure (b) and a RACH-less grant-free procedure (c)

FIG. 3 is a diagram illustrating three examples of NOMA-based transmissions for respectively a RACH-based grant-based procedure (a), a RACH-based grant-free procedure (b) and a RACH-less grant-free procedure (c).

In a first example, a RACH-based grant-based transmission may be based on OMA.

In a second example, a RACH-based grant-based transmission may be based on NOMA.

In a third example, RACH-based (e.g., synchronous UL) grant-free may be based on NOMA.

In a fourth example, RACH-less (e.g., asynchronous UL) grant-free may be based on NOMA.

In grant-free (contention) based UL NOMA, WTRUs may perform transmissions without e.g., any dynamic (e.g., and explicit) scheduling grants from base stations. Any number of WTRUs may share the same time-frequency resources based on (e.g., through) NOMA. For example, a preamble may be transmitted (e.g., even) in RACH-less and grant-free access to e.g., perform UL synchronization to e.g., facilitate detection at the receiver. For example, a preamble may be transmitted (e.g., even) in RACH-less and grant-free access to (e.g., implicitly) indicate some multiple access information, such as e.g., any of a spreading signature, locations of radio resources, and timing of retransmissions.

UL Scheduling Configuration Examples

According to embodiments, resources may be (e.g., dynamically) allocated to a WTRU by e.g., a gNB, via, for example, the cell radio network temporary identifier (C-RNTI) (e.g., of the WTRU) in PDCCH(s). For example, the gNB may transmit a grant for an uplink transmission (which may be referred to herein as UL grant) in the in PDCCH(s). The UL grant may include information indicating the C-RNTI of the WTRU. For example, WTRUs may monitor the PDCCH(s) to obtain (e.g., receive) UL grants.

For example, any of a PUSCH transmission, a repetition of a PUSCH transmission, and a sounding reference signal (SRS) transmission of a WTRU for another WTRU with a latency-sensitive transmission may be cancelled e.g., by the gNB. For example, a WTRU may be configured (e.g., by the gNB) to monitor cancelled transmission indications e.g., using a cancellation indication radio network temporary identifier (CI-RNTI) on a PDCCH. In a case where a WTRU receives the cancelled transmission indication, the WTRU may cancel any of the PUSCH transmission (e.g., from the first symbol that may overlap with the resource) and the SRS transmission (that may overlap with the resource indicated by cancellation).

For example, (e.g., in 3GPP Release 15), configured grant operations may allow to enable a grant-free transmission. The gNB may allocate uplink resources for any of the initial HARQ transmission and HARQ retransmissions to WTRUs using two types of configured uplink grants which may be referred to herein as Type 1 and Type 2.

For example, Type 1 configured uplink grants may be provided by the RRC (e.g., protocol). The periodicity of the Type 1 UL grants may (e.g., also) be configured based on RRC.

For example, for Type 2 configured uplink grants, the periodicity of the uplink grants may be provided (e.g., configured) based on RRC. For example, a PDCCH that may be addressed to a configured scheduling radio network temporary identifier (CS-RNTI) may any of signal, activate, and deactivate a configured uplink grant. E.g., a PDCCH addressed to a CS-RNTI may indicate that the uplink grant may be (e.g., implicitly) reused according to e.g., the periodicity that may be indicated by RRC, e.g., until deactivated.

According to embodiments, a WTRU may be configured with e.g., up to twelve active configured uplink grants for a (e.g., given) bandwidth part (BWP) of a serving cell. In a case where more than one is configured, the network may decide which of these configured uplink grants may be active at a time (e.g., including all of them). A configured uplink grant may be of any of Type 1 and Type 2. For Type 2, activation and deactivation of configured uplink grants may be independent among (e.g., between) the serving cells. In a case where more than one Type 2 configured grant is configured, a configured grant may be (e.g., separately) activated using a DCI command. A Type 2 configured grant deactivation may be performed using a DCI command, which may deactivate any of a single configured grant and any number of configured grant configurations (e.g., jointly).

For any of dynamic grant and configured grant, for a transport block, two or more repetitions may be (e.g., scheduled, transmitted) in any of one slot, and across slot boundary in e.g., consecutive available slots with, for example, a repetition in a slot. For any of dynamic grant and configured grant Type 2, the number of repetitions may be, for example, dynamically indicated in the L1 signaling. The (e.g., dynamically) indicated number of repetitions may override (e.g., replace, substitute) the RRC configured number of repetitions, in a case where both are present.

According to embodiments, a WTRU including a passive transceiver may benefit from near zero power consumption in a case where the WTRU is not actively performing any of a transmission and a high data rate reception e.g., for the purpose of exchanging any of data and (e.g., a large amount of) control signaling with the network. For example, a ZE receiver that may be in any of an idle and an inactive state (e.g., RRC_IDLE, RRC_INACTIVE) may perform any of a cell selection, reselection measurements and criteria evaluation based on energy harvesting. In another example, a ZE receiver may perform any of paging, system information change, and public warning notification messages reception based on energy harvesting in any of idle and inactive state.

According to embodiments, a WTRU may reap the benefits of the near zero power consumption associated with the ZE transceiver. For example, the WTRU may utilize the ZE transceiver with backscattering-based UL to perform any of a random-access and a data transmission procedure, e.g., based on an interrogation signal.

For example, the interrogation signal may be cell-specific and may be received by the WTRU (e.g., directly) from the serving BSs (which may be referred to herein as mono-static backscattering). For example, the interrogation signal may not be WTRU-specific (e.g., the interrogation signal may be received by any number of WTRUs).

In another example, the interrogation signal may not be cell-specific and may be received by the WTRU (e.g., indirectly) from an assisting interrogator (which may be referred to herein as bi-static backscattering).

For example, the WTRU may perform mono-static backscattering of any of MSG1 of a 4-step random access type and of MSGA of a 2-step random access type based on a serving BS's interrogation signal. For example, the WTRU may perform bi-static backscattering of any of the MSG1 and MSGA messages, with e.g., a support of any of other WTRUs and facilitators.

Embodiments described herein may allow to enable a coordination between the network and WTRUs including a ZE transceiver for energy and resource efficient random access and grant-free access operations. Embodiments described herein may allow to improve the network resource utilization efficiency and to decrease the latency, for example, based on a dependency of ZE transceiver transmissions on interrogation signal from any of the serving cell (BS) and other WTRUs/facilitators.

Terminology

Throughout embodiments described herein the term "passive WTRU" may be used to refer to a WTRU that may process downlink signals and may transmit (e.g., backscatter) uplink signals in the absence of active power supply based on passive RF circuitry that may benefit from any of energy harvesting and backscattering technologies.

Throughout embodiments described herein the term "semi-Passive WTRU" may be used to refer to a WTRU that may process downlink signals and may transmit (e.g., back-scatter) uplink signals in the presence of (e.g., active limited) power supply based on passive RF circuitry that may benefit from any of energy harvesting and backscattering technologies. The (e.g., active limited) power supply may be used, for example, to enhance the performance of any of downlink reception and uplink transmission. For example, a semi-passive WTRU may operate as a passive WTRU. Throughout embodiments described herein transmitting any kind of transmission based on harvested energy from a received signal by a WTRU operating as any of a passive WTRU (e.g., in absence of local power supply) and a semi-passive WTRU (in presence of active local power supply for boosting the harvested energy) may be referred to herein as backscattering the transmission.

Throughout embodiments described herein the term "interrogation signal" may be used to refer to an RF waveform that may be transmitted by an interrogating network element that may deliver (e.g., provide) power to any of a passive and a semi-passive WTRU to aid (e.g., assist, enable) its uplink transmission. The interrogation signal may deliver an RF carrier that may be modulated and reflected by any of the passive and semi-passive WTRU as an UL transmission.

Throughout embodiments described herein the term "backscattering WTRU" may be used to refer to any of a passive and semi-passive WTRU that may use an interrogation signal to harvest the energy to power its uplink transmissions. A backscattering WTRU may modulate a reflected (e.g., backscattered) interrogation signal based on e.g., a set of antenna loads.

Throughout embodiments described herein the term "mono-static backscattering" may be used to refer to an architecture where the interrogating network element (that may generate, e.g., transmit the interrogation signal) may be the same as the receiving network element of the reflected (e.g., backscattered) signal.

Throughout embodiments described herein the term "bi-static backscattering" may be used to refer to an architecture where the interrogating network element (that may generate e.g., transmit the interrogation signal) may be different from the receiving network element of the reflected e.g., backscattered signal.

Throughout embodiments described herein the term "presence (e.g., declaration) indication signal" (collectively "presence indication") may be used to refer to a signal that may be transmitted by a backscattering WTRU, for example, with the aid of an interrogator to indicate its presence in the area of any of the interrogator and the receiving network element.

Throughout embodiments described herein the term "passive RACH operation" may be used to refer to a channel's random-access operation that may be performed by any of a passive and semi-passive WTRU.

Throughout embodiments described herein the term "semi-passive RACH operation" may be used to refer to a channel's random-access operation that may be performed by a semi-passive WTRU.

According to embodiments, a WTRU may use backscattering for UL transmissions to perform any of UL synchronization, connection setup, and data transmissions, for example, based on an interrogation signal. For example, the interrogation signal may be received by the WTRU any of (e.g., directly) from the serving BSs (e.g., mono-static backscattering) and (e.g., indirectly) from an assisting interrogator (e.g., bi-static backscattering). Embodiments described herein may allow a WTRU to perform backscattering-based UL transmissions.

Mono-Static Backscattering-Based Examples

Embodiments related to mono-static backscattering for UL synchronization and connection setup in RACH-based and grant-based channel access scheme, and grant-free random channel access scheme are described herein.

UL Synchronization and Connection Setup Examples

According to embodiments, a WTRU may receive (e.g., wait for) an interrogation signal. The WTRU may perform (e.g., initiate) any of an UL synchronization and a connection setup based on backscattering, e.g., after the interrogation signal may have been received. The interrogation signal may allow to enable (e.g., facilitate, improve) any of the UL synchronization and connection setup. For example, the received signal strength at the interrogating transceiver in mono-static backscattering may be (e.g., relatively) low, which may result in low performances of contention resolution amongst multiple WTRUs with different signal strengths. For example, an interrogation signal transmission may be preceded by (e.g., known, predefined, predetermined) preamble(s) that may correspond to any of a common and specific backscattering-PRACH-occasions configuration(s). For example, (e.g., dynamic) backscattering- PRACH-occasions configuration(s) may allow to reduce (e.g., minimize) the contention/collision between backscattering supporting and non-supporting WTRUs. A WTRU not supporting backscattering (e.g., not including any backscattering transceiver) may be referred to herein as any of "legacy WTRU" and "non-backscattering WTRU". A WTRU that may support backscattering (e.g., may include a backscattering transceiver) may be referred to herein as "backscattering WTRU", collectively "WTRU". For example, in a case where the serving BS determines that the number of (e.g., currently served) non-backscattering WTRUs is high (e.g., over a value), it may select a backscattering-PRACH-occasions configuration that may not overlap with the legacy PRACH occasions (e.g., for non-backscattering WTRUs) to reduce (e.g., minimize) collision between backscattering and non-backscattering WTRUs. In a case where the number of (e.g., currently served) non-backscattering WTRUs is (e.g., relatively) low (e.g., below a value), it may select a backscattering-PRACH-occasions configuration that may overlap with the legacy PRACH occasions (e.g., for non-backscattering WTRUs). For example, a mixed (e.g., combination of) overlapping and non-overlapping PRACH occasions configurations may be applicable to embodiments described herein.

According to embodiments, a WTRU may determine its (e.g., approximate) location (e.g., range) to the serving BS based on the interrogation signal preamble. For example, the interrogation signal may be subsequently separated in space. Throughout embodiments described herein the terms "coverage rings", "signal strength categories" and "range categories" may be used interchangeably to represent different categories of e.g., power levels or ranges (e.g., distances to any of the interrogation signal transmitter and the serving BS) that may be associated with an interrogation signal, and from which different backscattering transmission performances may be obtained. For example, any of a coverage ring, a signal strength category and a range (e.g., distance) category may be associated with any of threshold(s) and interval(s) (e.g., sets) of values.

For example, a mapping between coverage rings (e.g., signal strength categories) and backscattering-PRACH-occasions may allow to reduce (e.g., minimize) collisions across different tiers of received signal strengths.

FIG. 4 is a diagram illustrating an example of backscattering coverage and mapping to backscattering PRACH occasions configuration. The backscattering PRACH occasions configuration 41 illustrated in FIG. 4 may be chosen to not overlap with legacy PRACH occasions configuration 42. For example, any number of backscattering RACH occasions (ROs) 411, 412 may be multiplexed in frequency domain. For example, backscattering ROs 411, 412 may be mapped to a (e.g., specific) backscattering coverage ring e.g., signal strength category (e.g., n∈{1,2}). For example, a first backscattering RO 411 may be mapped to (e.g., associated with) a first coverage ring (e.g., signal strength category) 401 and a second backscattering RO 412 may be mapped to (e.g., associated with) a second coverage ring (e.g., signal strength category) 402. Throughout embodiments described herein the terms "A mapped to B", "A associated with B", "mapping of A to B", "mapping between A and B", "association between A and B", may be used interchangeably to refer to any relation between A and B e.g., allowing to obtain A based on B or to obtain B based on A.

According to embodiments, any of the timing and the sequence repetition configurations may be different from one backscattering coverage ring (e.g., signal strength category) to another.

For example, backscattered signal (two-way signal) may experience a path loss (e.g., signal attenuation) that may be equivalent to a signal propagating twice the distance of a (e.g., legacy) non-backscattered signal.

For example, a backscattered signal may experience twice the propagation delay of a (e.g., legacy) non-backscattered signal.

For example, the impact of any of the signal attenuation and propagation delay may be exaggerated from one coverage ring (e.g., signal strength category) to the other. According to embodiments, any of a PRACH preamble and sequence (e.g., format) may be selected based on the received signal strength e.g., of the interrogation signal. A received signal strength of the interrogation signal may be obtained (e.g., measured), for example based on any of a RSRP and a reference signal received quality (RSRQ). Any technique for measuring a received signal strength of an interrogation signal may be applicable to embodiments described herein.

In an embodiment, (e.g., in a first step), a passive WTRU may receive, for example, through system information, (e.g., configuration) information indicating any of the following (e.g., parameters, configuration):

network's (NW) support of mono-static backscattering RACH transmission, any of PRACH occasions configuration(s) and mapping to coverage rings (e.g., signal strength categories), any of (e.g., supported) interrogation signal preamble(s), their transmission characteristics, and mappings to any specific backscattering PRACH occasions configuration(s), interrogation signal strength (e.g., measured via interrogation signal preamble) thresholds that may determine the configured backscattering coverage rings (e.g., signal strength categories). For example, coverage rings (e.g., signal strength categories) may be obtained (e.g., determined, configured) by configuring (e.g., allocating) different signal strength levels (e.g.,) thresholds of the interrogation signal.

For example, (e.g., in a second step), the passive WTRU may receive any of a paging message and a (e.g., higher layer) request to establish an (e.g., RRC) connection. For example, (e.g., in a third step), the passive WTRU may (e.g., detect and) perform any of synchronization (e.g., with the network) and received signal strength measurement (e.g., of the interrogation signal) based on the interrogation signal preamble transmission characteristics/configuration. For example, (e.g., in a fourth step) the passive WTRU may determine in which backscattering coverage ring (e.g., signal strength category) it may belong based on any of the received signal strength measurement, backscattering capability (e.g., any of reflection coefficient and efficiency), and e.g., configured thresholds. For example, (e.g., in a fifth step) the WTRU may determine a backscattering PRACH occasions (e.g., configuration) (e.g., to be used) based on a mapping between coverage rings (e.g., signal strength categories) and PRACH occasions (e.g., configurations). For example, the passive WTRU may utilize (e.g., modulate the reflection of) the interrogation signal for PRACH preamble transmission based on the determined configuration.

In an embodiment, (e.g., in a first step) a semi-passive WTRU may receive e.g., through system information (e.g., configuration) information indicating any of the following (e.g., parameters, configuration):

network's (NW) support of mono-static backscattering RACH transmission, any of PRACH occasion configuration(s) and mapping to coverage rings (e.g., signal strength categories), any of (e.g., supported) interrogation signal preamble(s), their transmission characteristics, and mappings to any specific backscattering PRACH occasions configuration(s), interrogation signal strength (e.g., measured via interrogation signal preamble) thresholds that may determine the configured backscattering coverage rings (e.g., signal strength categories). For example, coverage rings (e.g., signal strength categories) may be obtained (e.g., determined, configured) by configuring (e.g., allocating) different signal strength levels (e.g.,) thresholds of the interrogation signal.

For example, (e.g., in a second step), the semi-passive WTRU may receive any of a paging message and a (e.g., higher layer) request to establish an (e.g., RRC) connection. For example, (e.g., in a third step), the semi-passive WTRU may (e.g., detect the interrogation signal and) perform any of synchronization (e.g., with the network) and received signal strength measurement based on the interrogation signal preamble transmission characteristics/configuration. For example, (e.g., in a fourth step), the semi-passive WTRU may determine in which backscattering coverage ring (signal strength category) it may belong based on any of the received signal strength measurement, backscattering capability (e.g., reflection coefficient/efficiency), (e.g., current) battery level (e.g., state) of the WTRU, (e.g., desired, target) energy expenditure, (e.g., desirable, target) RACH preamble detection probability, and configured thresholds. For example, (e.g., in a fifth step), the WTRU may determine a backscattering PRACH occasion (e.g., configuration) (e.g., to be used) based on a mapping between coverage rings (e.g., signal strength categories) and PRACH occasions (e.g., configuration(s)). For example, the semi-passive WTRU may utilize (e.g., modulate the reflection of) the interrogation signal and its battery for PRACH preamble transmission based on the determined configuration.

In an embodiment, on a WTRU that may perform any of passive and semi-passive RACH operation, the WTRU may receive (e.g., in a first step) e.g., through system information (e.g., configuration) information indicating any of the following (e.g., parameters, configuration):

network's (NW) support of mono-static backscattering RACH transmission, any of PRACH occasion configuration(s) and mapping to coverage rings (e.g., signal strength categories), any of (e.g., supported) interrogation signal preamble(s), their transmission characteristics, and mappings to any specific backscattering PRACH occasions configuration(s), interrogation signal strength (e.g., measured via interrogation signal preamble) thresholds that may determine the configured backscattering coverage rings (e.g., signal strength categories). For example, coverage rings (e.g., signal strength categories) may be obtained (e.g., determined, configured) by configuring (e.g., allocating) different signal strength levels (e.g., thresholds) of the interrogation signal.

For example, (e.g., in a second step), the WTRU may receive any of a paging message and a (e.g., higher layer) request to establish an (e.g., RRC) connection. For example, (e.g., in a third step), the WTRU may (e.g., detect the interrogation signal and) perform any of synchronization (e.g., with the network) and received signal strength measurement based on the interrogation signal preamble transmission characteristics/configuration. For example, (e.g., in a fourth step, the WTRU may determine any of a (e.g., desired) passive and semi-passive operation based on any of its (e.g., current) battery level (e.g., state), received signal strength, and (e.g., desired, target) PRACH preamble detection probability. In a case where passive RACH operation is selected, the WTRU may determine in which backscattering coverage ring (signal strength category) it may belong based on any of the received signal strength measurement, backscattering capability (e.g., reflection coefficient/efficiency), and configured thresholds. In a case where passive RACH operation is not selected, the WTRU may determine in which backscattering coverage ring (signal strength category) it may belong based on any of received signal strength measurement, backscattering capability (e.g., reflection coefficient/efficiency), (e.g., current) battery level (e.g., state) of the WTRU, (e.g., desired, target) energy expenditure, a (e.g., desirable, target) RACH preamble detection probability, and configured thresholds. For example, (e.g., in a sixth step) the WTRU may determine any of a backscattering PRACH occasion (e.g., configuration) (e.g., to be used) and a reflection coefficient based on a mapping between coverage rings (signal strength categories) and PRACH occasions (e.g., configuration(s). For example, the (e.g., determined) reflection coefficient may allow to determine (e.g., control) the reflected (e.g., backscattered) signal's power. For example, the WTRU may utilize (e.g., modulate the reflection of) the interrogation signal (e.g., and its battery in case of semi-passive operation), for PRACH preamble transmission based on the determined configuration.

In an embodiment, on a WTRU that may perform any of passive and semi-passive RACH operation and may have access to a (e.g., frequently updated slowly) changing location information, the WTRU may receive, in a first step, e.g., through system information (e.g., configuration) information indicating any of the following (e.g., parameters, configuration):

network's (NW) support of mono-static backscattering RACH transmission, any of PRACH occasion configuration(s) and mapping to coverage rings (e.g., signal strength categories), any of (e.g., supported) interrogation signal preamble(s), their transmission characteristics, and mappings to any specific backscattering PRACH occasions configuration(s), interrogation signal strength (e.g., measured via interrogation signal preamble) thresholds that may determine the configured backscattering coverage rings (e.g., signal strength categories). For example, coverage rings (e.g., signal strength categories) may be obtained (e.g., determined, configured) by configuring (e.g., allocating) different signal strength levels (e.g., thresholds) of the interrogation signal.

For example, (e.g., in a second step) the WTRU may map received signal thresholds to location contours that may determine (e.g., define) the backscattering coverage rings (e.g., signal strength categories). For example, (e.g., in a third step) the WTRU may receive any of a paging message and a (e.g., higher layer) request to establish an (e.g., RRC) connection. For example, (e.g., in a fourth step) the WTRU may (e.g., detect the interrogation signal and) perform DL synchronization (e.g., without performing received signal strength measurements) based on the interrogation signal preamble transmission characteristics/configuration. For example, (e.g., in a fifth step), the WTRU may determine any of a (e.g., desired) passive and semi-passive operation based on any of its (e.g., current) battery level (e.g., state), (e.g., current) location information, and (e.g., desired, target) PRACH preamble detection probability. In a case where passive RACH operation is selected, the WTRU may determine in which backscattering coverage ring (e.g., signal strength category) it may belong based on any of the (e.g., current) location information, backscattering capability (e.g., reflection coefficient/efficiency), and determined location contours. In a case where passive RACH operation is not selected, the WTRU may determine in which backscattering coverage ring (e.g., signal strength category) it may belong based on any of the (e.g., current) location information, backscattering capability (e.g., reflection coefficient/efficiency), (e.g., current) battery level (state) of the WTRU, (e.g., desired, target) energy expenditure, and determined location contours. For example, (e.g., in a sixth step) the WTRU may determine any of a backscattering PRACH occasion (e.g., configuration) (e.g., to be used), a reflection coefficient and a transmission power boost based on any of a (e.g., desirable, target) RACH preamble detection probability and a mapping between coverage rings (e.g., signal strength categories) and PRACH occasions (e.g., configuration(s)). For example, any of the (e.g., determined) reflection coefficient and transmission power boost may (e.g., allow to) determine (e.g., control) the reflected (e.g., backscattered) signal's (e.g., effective) power. For example, the WTRU may utilize (e.g., modulate the reflection of) the interrogation signal (e.g., and its battery in case of semi-passive operation), for PRACH preamble transmission based on the determined configuration.

In an embodiment, a WTRU may:

receive (e.g., configuration) information indicating any of NW's support of mono-static backscattering RACH transmission, PRACH occasion configuration(s) and mapping to coverage rings (e.g., signal strength categories), interrogation signal preamble, and interrogation signal strength thresholds e.g., through system information;

receive any of a paging message and (e.g., higher layer) request to establish an (e.g., RRC) connection;

receive an interrogation signal and utilize the interrogation signal preamble for any of DL synchronization and received signal strength measurement;

determine a PRACH occasion configuration e.g., any of frequency, time, and preamble format based on any of
a WTRU's status, which may include any of a class (e.g., passive, semi-passive), backscattering capability (e.g., reflection coefficients/efficiency), and (e.g., current) battery level (e.g., current state) of the WTRU;
a channel status and network configuration, which may include any of a (e.g., measured) received signal strength, (e.g., configured) signal strength thresholds, mapping to coverage rings (e.g., signal strength categories), and PRACH occasion (e.g., specific) transmission power configuration;

utilize (e.g., modulate the reflection of) the interrogation signal (e.g., and battery for semi-passive WTRUs) for PRACH preamble transmission based on the determined configuration.

Backscattering-Based Grant-Free Access Example

According to embodiments, mono-static backscattering grant-free channel access may be based on any of a K-repetition scheme and a hybrid resource allocation scheme. Any of Type 1 and Type 2 of configured uplink grants may be enabled. For example, the configured uplink grant (which may include periodicity) may be any of provided by (e.g., received from) RRC and indicated (e.g., any of signaled, activated, deactivated) by the physical layer, e.g., PDCCH that may be addressed to CS-RNTI. For example, (e.g., known, pre-determined) preamble(s) may be transmitted (e.g., before an interrogation signal) to convey (e.g., carry) information about any of configured uplink grants and their activation and deactivation.

According to embodiments, for any of K-repetition and hybrid resource allocation schemes, a GF access opportunity may represent a period of time which may last for a duration that may be any of predefined and dynamically signaled (e.g., indicated). The GF access opportunity may include a number of slots, (e.g., each) of a (e.g., specific) duration that may be any of preconfigured and dynamically signaled (e.g., indicated). For example, the configuration of any of the GF access opportunity, periodicity, number of slots, durations, and the number of available frequency resources may be transmitted (e.g., indicated) through, for example, system information e.g., as common configuration. In another example, the mapping between interrogation signal preambles and (e.g., different) configurations may be conveyed (e.g., transmitted, indicated) to WTRUs through, for example, system information and a (e.g., specific) configuration may be determined by the WTRU based on the detected preamble. For example, the configuration(s) may be specific for a group of WTRUs. The configuration(s) may be provided (e.g., transmitted, indicated) to a (e.g., each) group via, for example, RRC.

Grant-Free Channel Access Based on K-Repetition Example

In a K-repetition scheme example, the WTRU may determine any of a first (e.g., minimum) and a second (e.g., maximum) number of repetitions based on the (e.g., measured) received interrogation signal strength. For example, in a (e.g., each) (re-)transmission, the WTRU may use (e.g., transmit) a specific signature (e.g., any of scrambling and spreading based) to allow the serving BS to identify any of the WTRU and the re-transmission number. The first (e.g., minimum) number of repetitions may be chosen to allow, for example, a first (e.g., minimum) probability (e.g., level) of user identification. The second (e.g., maximum) number of repetitions may be chosen to allow, for example, a second (e.g., minimum) data correct decoding probability (e.g., level). For example, there may be different received signal strength categories, where a received signal strength category may correspond to a (e.g., predetermined, configured) range (e.g., set) of received interrogation signal strength values. For example, there may be a mapping between received signal strength categories and transmission repetition configurations, e.g. the first number of repetitions for $i^{th}$ category (which may be referred to herein as $K_{i,min}$) and second number of repetitions for that category which may be referred to herein as $K_{i,max}$).

According to embodiments, in a mono-static example, an absence of an interrogation signal within a (e.g., determined, detected) GF access opportunity may allow (e.g., be used) to indicate an ACK/NACK for any number of (e.g., detected, identified) WTRUs within the access opportunity. For example, within a GF access opportunity, an (e.g., initial) contention window may be determined. The (e.g., initial) contention window allow to reduce the serving BS search space to simplify the user detection. For example, the (e.g., initial) contention window may be set as $$T_{contention} = T_{window} - T_{slot} \times \max_i K_{i,max},$$

where $T_{contention}$ may be referred to herein as the duration of the (e.g., initial) contention window, $T_{window}$ may be referred to herein as the duration of the GF access opportunity, and $T_{slot}$ may be referred to herein as the duration of any slot within the GF access opportunity. For example, the absence of the interrogation signal to indicate an ACK/NACK may be configured to last for e.g., any of a subset of at least one slot (which may be referred to as $N_{ack/nack}$) of the (e.g., total) number of slots, and a (e.g., certain) duration (which may be referred to as $\tau_{ack/nack}$), within the GF access opportunity. The duration over which the interrogation signal may be absent may not be available for the (e.g., initial) access of any other WTRU. After the duration (e.g., over which the interrogation signal may be absent), the interrogation signal transmission may restart e.g., till the end of the GF access opportunity or until another ACK/NACK may be indicated. A slot (e.g., the last slot) of any GF access opportunity may be configured to be, for example, dedicated (e.g., reserved) for a group ACK/NACK. The serving BS may (e.g., explicitly) signal (e.g., transmit information indicating) individual ACKs/NACKs, for example, in a case where the number of correctly received messages, e.g., from different WTRUs, is (e.g., much) larger than the number of incorrectly received messages, e.g., from different WTRUs. Signaling individual ACKs/NACKs by the serving BS may allow to reduce (e.g., minimize) collisions in subsequent GF access opportunities.

In an embodiment, a WTRU may receive (e.g., in a first step), e.g. through system information, (e.g., configuration) information indicating any of a NW's support of mono-static backscattering GF transmission, configured frequency resources, a preamble format (e.g., schedule) identifying the beginning of GF access opportunity, the access opportunity and slot duration (e.g., number of slots), received signal strength thresholds, and a mapping of received signal strength categories $i \in \{1, 2, \ldots N_{cat}\}$ to any of the first and the second number of repetitions ($K_{i,min/max}$). For example, the mapping may include a mapping between any of the first and the second number of repetitions ($K_{i,min/max}$) and any of a received signal strength, a received signal strength category and a received signal strength set of values. For example, (e.g., in a second step) the WTRU may receive (e.g., higher layer, small) data packets and may determine the GF transmission configuration. For example, (e.g., in a third step), the WTRU may select GF frequency resources e.g., from the set of available resources. The GF frequency resource selection may be any of random and based on a (e.g., predefined, dynamically) signaled configuration. For example, (e.g., in a fourth step) the WTRU may monitor the selected frequency resources. The WTRU may detect a preamble e.g., indicating the beginning of a GF access opportunity. The WTRU may measure the received interrogation signal strength. For example, (e.g., in a fifth step) the WTRU may utilize the measured received signal strength (e.g., and thresholds) to determine a signal strength category i based on e.g., WTRU's class (e.g., any of passive and semi-passive), backscattering capability (e.g., reflection coefficient/efficiency), and (e.g., current) battery level (e.g., state). For example, (e.g., in a sixth step), the WTRU may determine any of the first and the second number of transmission repetitions ($K_{i,min/max}$) based on the determined category and mapping information. (E.g., in a seventh step), the WTRU may select an (e.g., initial) transmission slot within the (e.g., initial) contention window, for example, randomly according to a uniform distribution. In another example, the (e.g., initial) transmission slot may be selected (e.g., within the initial contention window) based on a signal strength-based (within the same category) non-uniform distribution. (E.g., in an eighth step), the WTRU may perform repetitive backscattering transmissions (e.g., any of pilots, control, and data), for example, while monitoring the presence of the interrogation signal. On the condition that interrogation signal is determined to be absent and the number of re-transmissions is determined to be greater than or equal to the first number of retransmissions for that category (e.g., $\geq K_{i,min}$), the WTRU may conclude (e.g., terminate) transmission and may assume (e.g., consider) the transmission as successfully decoded. Otherwise, the GF access procedure may be repeated by e.g., continuing to monitor a (e.g., randomly selected) frequency resource for the detection of (e.g., a beginning of) a new GF access opportunity. For example, in a case where the absence of the interrogation signal is not detected till the end of the GF transmission window and a group NACK is received at the end of the window, a new frequency resource may be selected, and the GF access procedure may be repeated.

Figure 5:
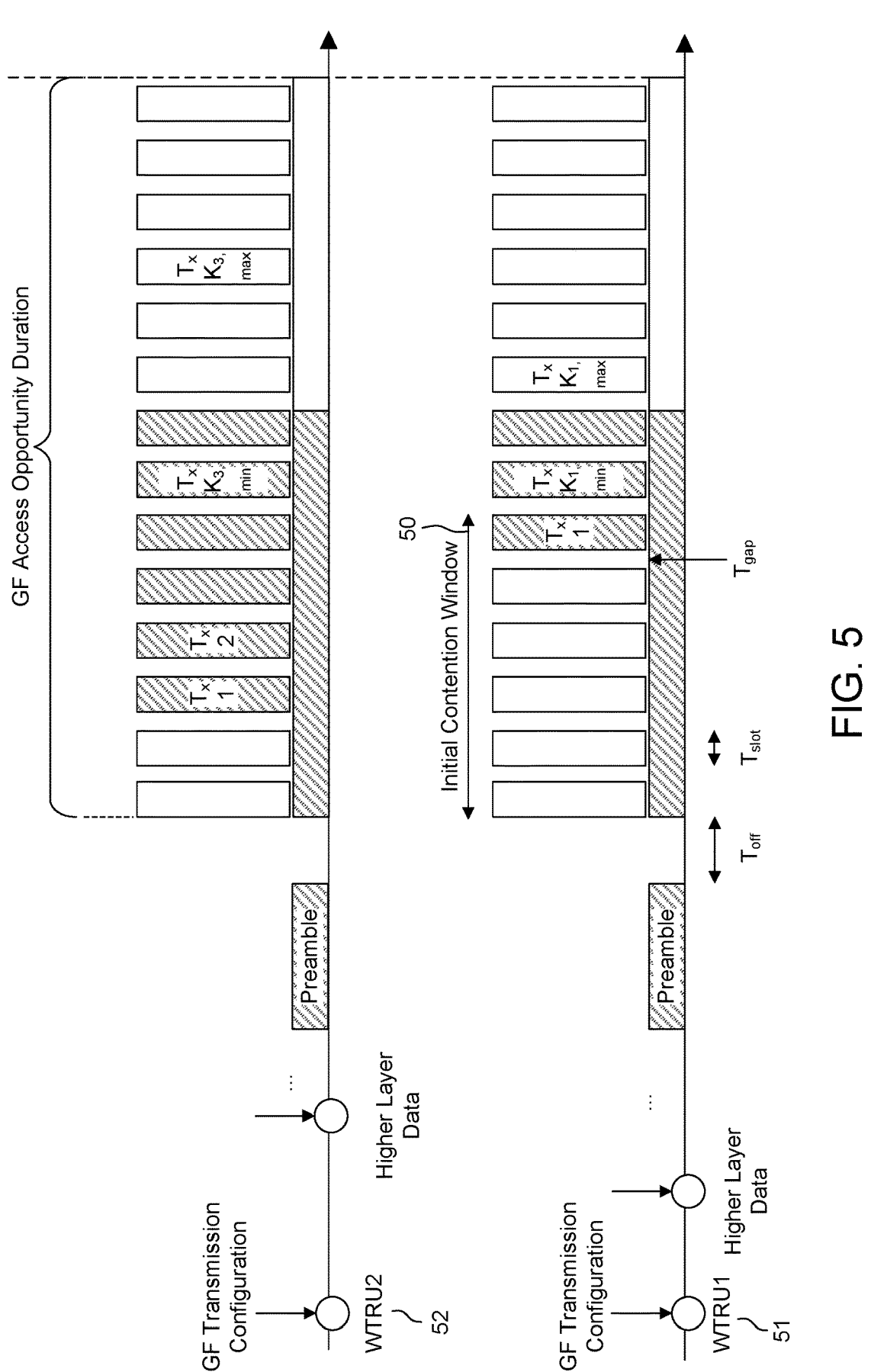
FIG. 5 is a diagram illustrating an example of grant-free access based on the K-repetition scheme.

FIG. 5 is a diagram illustrating an example of grant-free access based on the K-repetition scheme. A first 51 and a second 52 WTRUs may be located in the coverage of a (e.g., specific) BS. For example, the first WTRU 51 may be closer to the serving BS than the second WTRU 52. For example, the first WTRU 51 may determine the first and second number of repetitions to be as $K_{1,min}=0.5 \times K_{1,max}=2$ and $K_{1,max}=4$ for a first strength category. For example, the second WTRU 52 may determine the first and second number of repetitions to be as $K_{3,min}=5/9 \times K_{3,max}=5$ and $K_{3,max}=9$ for a third strength category. Any other examples of values may be applicable to embodiments described herein. In this example, the first 51 and the second 52 WTRUs may chose the initial transmission slot randomly within the initial contention window 50, and the BS may be successful in decoding the first WTRU's message after three transmissions and the second WTRU's message after four transmissions. In this example, the second WTRU 52 may continue (e.g., repeat) transmissions till the fifth repetition (for a total of six transmissions) till an absence of the interrogation signal may be detected. In this example, both WTRUs 51, 52 may determine the success of message decoding at the end of the eighth slot where the interrogation signal may be detected as absent.

A GF access opportunity may be represented as a set of any of time and frequency resources where a WTRU may hop over a different frequency resource for a (e.g., each) re-transmission according to a (e.g., specific) configuration which may be determined, for example, based on a sequence seed from a (e.g., limited) set of seeds. A seed may be any of randomly selected, pre-configured, and signaled by the network. In a case where the seed is randomly selected, the selected seed may be conveyed (e.g., indicated) to the network through any of an explicit transmission and a scrambling with the WTRU's unique identifier, which may be indicated, for example, as part of a preamble (e.g., sequence) transmission.

In an embodiment, a WTRU may receive (e.g., in a first step), e.g. through system information, (e.g., configuration) information indicating any of NW's support of mono-static backscattering GF transmission, configured frequency resources, preamble format and transmission characteristics identifying the beginning of GF access opportunity, the access opportunity and slot duration (e.g., number of slots), received signal strength thresholds, and mapping of received signal strength categories i=∈{1,2, . . . N$_{cat}$} to any of a first and a second number of repetitions K$_{i, min/max}$. For example, the mapping may include a mapping between any of the first and the second number of repetitions (K$_{i,min/max}$) to any of a received signal strength, a received signal strength category and a received signal strength range (e.g., set) of values. For example, (e.g., in a second step) the WTRU may receive (e.g., higher layer small) data packets and may determine the GF transmission configuration. For example, (e.g., in a third step) the WTRU may utilize the GF access opportunity preamble configuration for monitoring e.g., till the detection which may indicate the beginning of the GF access opportunity. For example, the WTRU may obtain (e.g., measure) the received signal strength of the interrogation signal based on the preamble. For example, (e.g., in a fourth step) the WTRU may determine a signal strength category i based on any of the WTRU's class (e.g., any of passive and semi-passive), backscattering capability (e.g., reflection coefficient/efficiency), (e.g., current) battery level (e.g., state), measured received signal strength, and received thresholds. For example, (e.g., in a fifth step) the WTRU may determine any of the first and second number of transmission repetitions K$_{i,min/max}$ based on the determined category and received mapping information. For example, the WTRU may determine an (e.g., initial) transmission slot within the (e.g., initial) contention window any of randomly according to a uniform distribution and based on a signal strength based (e.g., within the same category) non-uniform distribution. For example, the WTRU may determine any of the (e.g., initial) GF frequency resource and a retransmission hopping pattern based on a sequence seed (which may be any of randomly selected and preconfigured). For example, (e.g., in a sixth step) the WTRU may proceed with repetitive backscattering transmissions (e.g., any of pilots, control, and data), for example, while monitoring the presence of the interrogation signal at the respective frequency resource. On the condition that the interrogation signal is determined to be absent and the number of re-transmissions is determined to be greater than or equal to the first number of retransmissions for that category (≥K$_{i,min}$), the WTRU may conclude (e.g., terminate) transmission and may assume (e.g., consider) transmission as successfully decoded. Otherwise, the GF access procedure may be repeated by monitoring the GF access opportunity preamble based on any of the received transmission characteristics and a received schedule.

FIG. 12 is a diagram illustrating an example of a method 1200 for transmitting a backscattered signal by a WTRU under grant-free channel access based on the K-repetition scheme. In an embodiment:

in a step 1210, a WTRU may obtain (e.g., receive configuration) information indicating any of NW's support of mono-static backscattering GF transmission, configured frequency resources, preamble format and transmission characteristics identifying the beginning of GF access opportunity, the access opportunity and slot duration (e.g., number of slots), received signal strength thresholds, and mapping of received signal strength categories i∈{1,2, . . . N$_{cat}$} to any of a first and a second number of repetitions K$_{i,min/max}$ e.g. through system information;

in a step 1220, the WTRU may receive (e.g., higher layer small) data packets and may retrieve GF transmission configuration;

in the step 1220, the WTRU may determine (e.g., select) a GF frequency resource, to be used for transmission, e.g., any of randomly and according to a (e.g., predetermined) configuration;

in a step 1230, the WTRU may monitor the determined (e.g., selected) GF frequency resource to detect the preamble indicating beginning of GF access opportunity;

in a step 1240, the WTRU may measure received interrogation signal strength, and may determine signal strength category i based on WTRU's class (e.g., any of passive and semi-passive), backscattering capability (e.g., reflection coefficient/efficiency), (e.g., current) battery level, and received signal thresholds;

in a step 1250, the WTRU may determine any of the first and second number of transmission repetitions K$_{i,min/max}$ based on any of the determined category and received mapping information, and may determine an (e.g., initial) transmission slot within the (e.g., initial) contention window e.g., any of randomly and based on signal strength;

in a step 1260, the WTRU may proceed with repetitive backscattering transmissions (e.g., any of pilots, control, and data), for example, while monitoring the presence of the interrogation signal at the determined frequency resource;

in a step 1270, the WTRU may compare the number of transmitted repetitions (e.g., retransmissions) to the determined K$_{i,min/max}$;

on the condition that interrogation signal is determined to be absent and the number of re-transmissions is determined to be greater than or equal to the first number of retransmissions for that category (≥K$_{i,min}$), the WTRU may conclude, in a step 1280, (e.g., terminate) transmission and may assume (e.g., consider) transmission as successful;

otherwise, the WTRU may repeat GF access procedure by continuing to monitor in the step 1230, a (e.g., randomly selected) frequency resource for the detection of (e.g., a beginning of) a new GF access opportunity.

Grant-Free Channel Access Based on Hybrid Resource Allocation Example

In a hybrid resource allocation example, a WTRU may be configured with a time and frequency transmission pattern. Within the configured pattern, some of the allocated resources may be dedicated for that WTRU and the remaining set of resources may be, for example, shared amongst other WTRUs. In a time resource, the WTRU may perform any of a re-transmission, a repetition, of the original message and the transmission of another redundancy version. Similarly to the K-repetition example, in a (e.g., each) re-transmission, the WTRU may use (e.g., transmit) a specific signature (any of scrambling and spreading based) to allow the serving BS to identify any of the WTRU and the re-transmission number. For example, the absence of an interrogation signal within a configured time/frequency resource set in a GF access opportunity may be used (e.g., allow) to indicate an ACK/NACK for any number of detected (e.g., identified) WTRUs.

Figure 6:
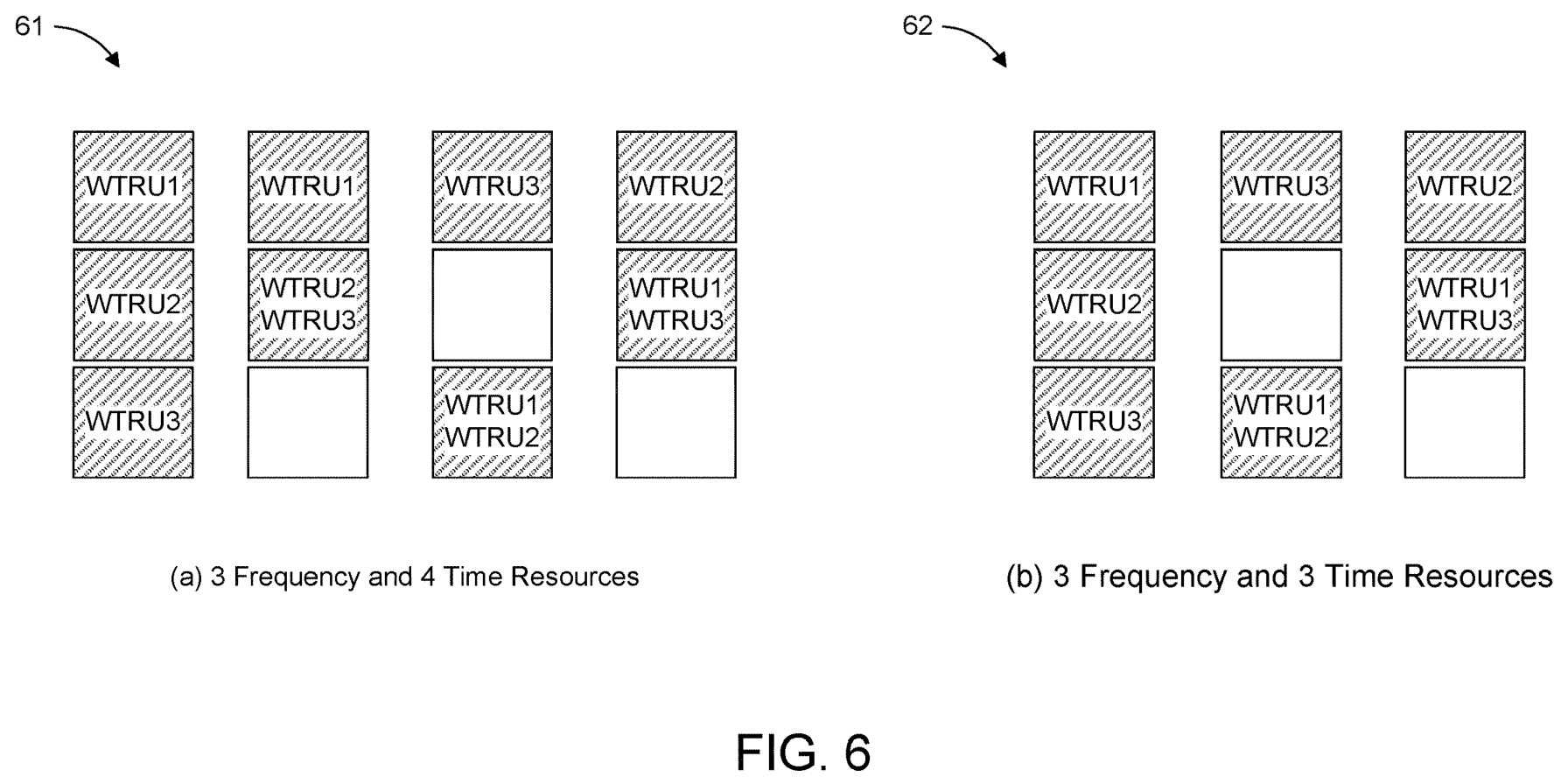

FIG. 6 is a diagram illustrating two examples of hybrid resource allocations for three different WTRUs. In both resource allocation examples 61, 62, three frequency resources may be allocated to the WTRUs. In the first resource allocation 61 example, four time resources may be allocated to the WTRUs. In the second resource allocation 62 example, three time resources may be allocated to the WTRUs.

In an embodiment, a WTRU may receive (e.g., in a first step), e.g., through any of system information and RRC, any of common and dedicated (e.g., GF transmission) control information.

For example, the common control information may include any of NW's support of mono-static backscattering GF transmission, periodicity of GF access opportunities, preamble format identifying the beginning of a GF access opportunity, an access opportunity duration and a slot duration (e.g., number of slots).

For example, the dedicated control information may include any of allocated frequency resources, a transmission window within a GF access opportunity, and a time/frequency transmission pattern configuration.

For example, (e.g., in a second step) the WTRU may receive (e.g., higher layer small) data packets. For example, the WTRU may determine a GF transmission configuration. For example, (e.g., in a third step) the WTRU may determine a GF access opportunity based on a periodic (e.g., repeated) configuration (e.g., schedule). In another example, the WTRU may determine a GF access opportunity based on (e.g., the detection of) a preamble indicating the beginning of a GF access opportunity. For example, the WTRU may obtain (e.g., measure) the interrogation received signal strength based on the (e.g., detected) preamble. For example, (e.g., in a fourth step) the WTRU may determine its capability. The WTRU may adjust its transmission power based on any of the WTRU's class (e.g., any of passive and semi-passive), the (e.g., current) battery level (e.g., state), and the measured (e.g., interrogation signal) received signal strength. Transmission power control may allow to obtain a preconfigured received power level at the serving BS which may allow to improve the multi-user detection (e.g., probability). For example, (e.g., in a fifth step), the WTRU may proceed with (e.g., perform) backscattering transmissions (e.g., any of pilots, control, and data) according to the received configuration, e.g., any of the time and frequency resource allocation and the transmission window configuration, for example, while monitoring the presence of the interrogation signal. On the condition that interrogation signal is determined to be absent within the configured transmission window, the WTRU may conclude (e.g., terminate) the transmission and may assume (e.g., consider) the transmission as successfully decoded. Otherwise, the GF access procedure may be repeated, for example, in a subsequent GF access opportunity. For example, the GF access procedure may be repeated in a case where an absence of the interrogation signal is not detected e.g., till the end of the configured transmission window. For example, the GF access procedure may be repeated in a case where a group NACK is received at the end of the (e.g., transmission, access opportunity) window.

Figure 7:
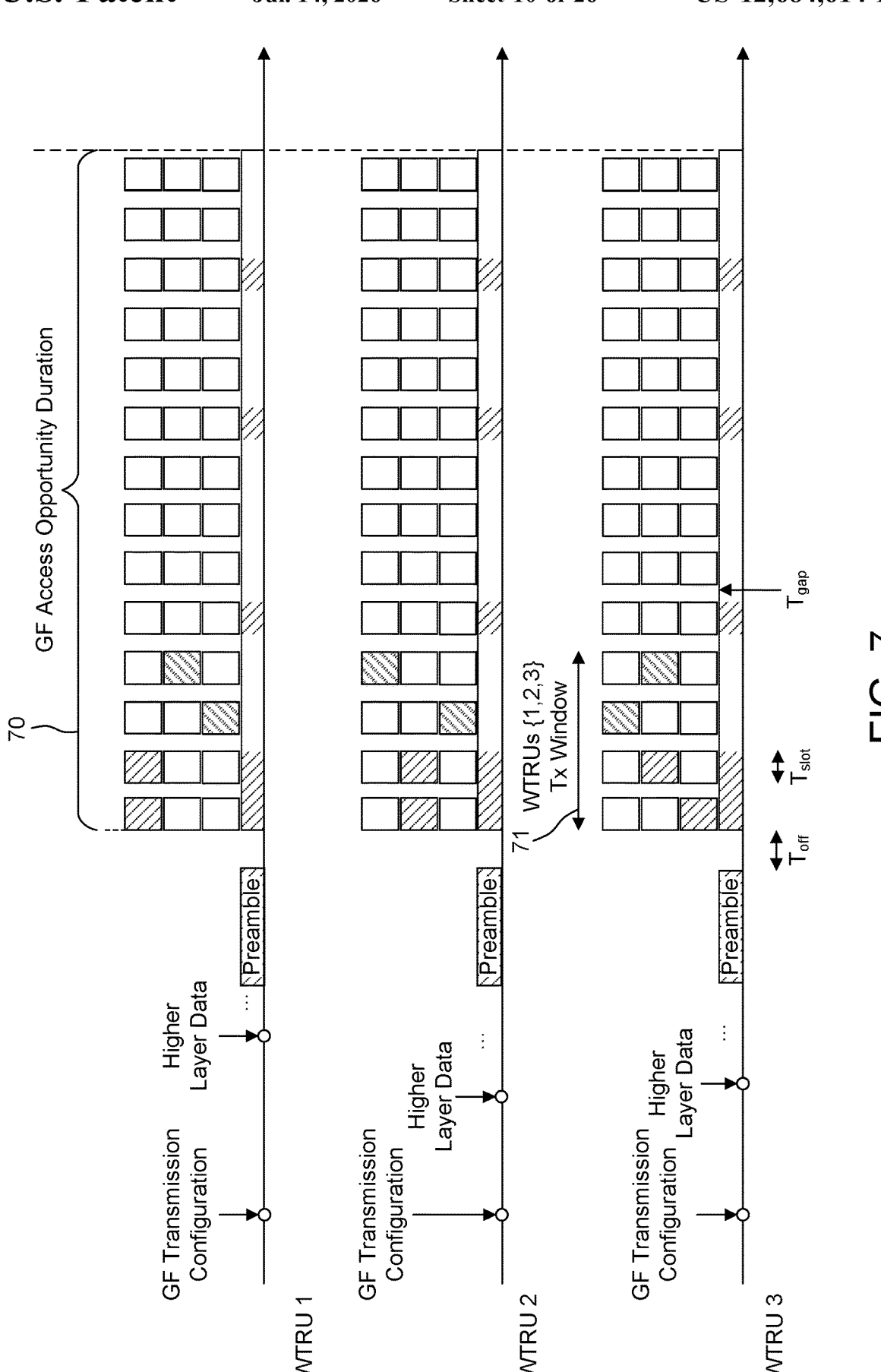
FIG. 7 is a diagram illustrating an example of a grant-free access based on the hybrid resource allocation scheme.

FIG. 7 is a diagram illustrating an example of a grant-free access based on the hybrid resource allocation scheme. For example, three WTRUs may be (e.g., actively) present and may transmit over a shared transmission window within the GF access opportunity 70. The grid assignment of the hybrid resource allocation scheme may be as represented in FIG. 6 (a) 61. In this example, the serving BS may successfully decode messages from all three WTRUs with (the first) two time slots. The serving BS may refrain from the transmission of the interrogation signal at the end of the second time slot. Any of (e.g., all) the three WTRUs may detect an absence of the interrogation signal after two time slots and may declare successful decoding of their transmitted messages. For example, any of the WTRUs may not re-transmit their messages in another GF access opportunity. For example, the BS may transmit (e.g., restart the transmission of) the interrogation signal at the beginning of a (e.g., each) configured transmission window 71. For example, the WTRU(s) may be configured with any number (e.g., more than one) of transmission windows e.g., within an access opportunity. The WTRU(s) may contend for access to any number of transmission windows amongst a group of WTRUs e.g., with the same time/frequency grid assignment. For example, the time/frequency instances that may remain available in the configured resource pattern, e.g., after a successful decoding, may be utilized (e.g., re-allocated) by the serving BS to dynamically schedule other WTRUs.

In an embodiment, a WTRU may receive any of common, e.g., preamble format indicating the beginning of a GF access opportunity, and dedicated, e.g., time/frequency transmission pattern configuration, GF transmission control information;

receive (e.g., higher layer small) data packets and may determine a GF transmission configuration;

determine a GF access opportunity based on any of periodic configuration (e.g., schedule) and on the detection of the (e.g., beginning of a) GF access opportunity;

determine the capability and may adjust its transmission power based on WTRU's class (e.g., any of passive and semi-passive), (e.g., current) battery level (e.g., state), and measured received signal strength;

Utilize any of the allocated frequency resources and the GF transmission window to perform (e.g., proceed with) GF channel access e.g., according to the configured transmission pattern;

on condition that absence of the interrogation signal is determined within configured transmission window, the WTRU may refrain from backscattering (e.g., transmitting) its signal over the remaining instances of the configured pattern. For example, the WTRU may declare (e.g., consider) successful decoding.

Bi-Static Backscattering-Based Examples

Bi-static (e.g., cooperative, coordinated) backscattering may result in a received signal strength (e.g., at the serving BS) that may have a moderate-to-high signal strength (e.g., and subsequently signal-to-noise ratio). To allow such a moderate-to-high signal strength at the serving BS, the interrogation network element may be selected, e.g., to be close to the backscattering WTRU and e.g., so that its signal propagation towards the backscattering WTRU may not experience any of (e.g., significant) blockages and attenuators.

According to embodiments, interrogator selection methods may allow a backscattering WTRU to perform any of a connection establishment (e.g., in an idle state), RACH-less and grant-free channel access.

For example, an interrogator selection method may be any of device-controlled and network-controlled. For example, a network-controlled method may be applicable for RACH transmissions (e.g., procedures) initiated based on a paging message reception. For example, a device-controlled method may be applicable to RACH transmissions (e.g., procedures) that may be performed (e.g., initiated) based on any of a paging message reception and a higher-layers request. For example, a device-controlled method may be applicable to RACH-less grant-free transmissions that may be performed (e.g., initiated) by higher-layers.

For example, an interrogator re-selection procedure may allow the backscattering WTRU to maintain an established connection in a connected state (such as e.g., RRC-CONNECTED), for example, in a case of a mobility of any of interrogating network elements and backscattering WTRUs. In another example, there may be channel variations in presence of any number of interrogating network elements, and a re-selecting an interrogator network element may allow the backscattering WTRU to maintain any established connection (e.g., in a connected state).

For example, an interrogator re-selection procedure may be any of network-controlled (e.g., involving the network and interrogating network elements), and device-controlled (involving the backscattering WTRU). For example, the timing update procedure and the signal design associated with that procedure may be adapted to take into account backscattering transmissions specificities.

Figure 8:
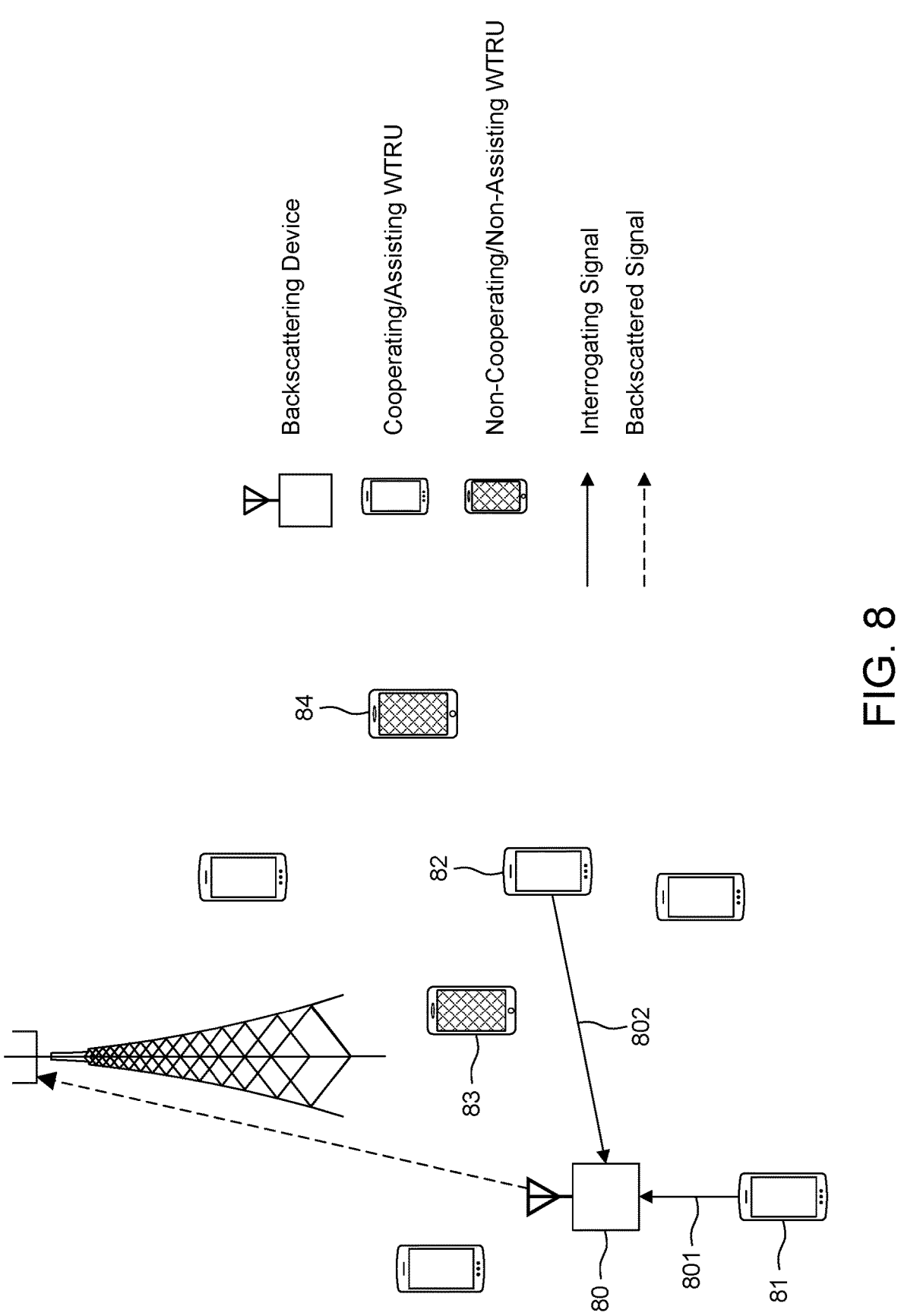
FIG. 8 is a diagram illustrating an example of an architecture of a bi-static backscattering system.

FIG. 8 is a diagram illustrating an example of an architecture of a bi-static backscattering system. A backscattering WTRU 80 may receive an interrogation signal 801, 802 from any number of (e.g., cooperating) WTRUs 81, 82 to aid (e.g., assist, provide energy for) its transmission to the serving BS. There may be a set of WTRUs 83, 84 that may not (e.g., be willing to) cooperate to aid transmissions of backscattering WTRUs.

Methods related to RACH transmissions, interrogator (re-)selection and timing advance (TA) configuration for bi-static backscattering systems are described herein.

Examples of Transmission over PRACH Methods

Two examples are described herein. In a first example, a set of interrogating WTRUs may provide (e.g., transmit) interrogation signals in support of RACH transmissions, independently (e.g., regardless) of the presence of backscattering WTRUs within the coverage area (e.g., no signal indicating a presence of a backscattering WTRU in the coverage area may be transmitted. In a second example, an interrogation signal transmission may be conditioned to the presence of at least one backscattering WTRU, which may be indicated by the transmission of a presence indication e.g., by the backscattering WTRU.

In any of the first and the second examples, an interrogation network element may be selected by the backscattering WTRU. An interrogation network element may be, for example, another WTRU. In any of the first and the second examples, the backscattering WTRU may be provided with (e.g., receive) any of reference signals and preambles for the interrogation signal. For example, the backscattering WTRU may perform DL (e.g., any of timing and frequency) synchronization based on reference signals (e.g., preambles) that may be provided by the available (e.g., selected) interrogation network elements.

In any of mono-static and bi-static backscattering, an interrogation signal transmission may be preceded by (e.g., known, predetermined) preamble(s) that may correspond to any of a common and specific backscattering PRACH occasions configuration(s). For example, the preamble(s) may correspond to a presence indication configuration (e.g., any of time, frequency and sequence(s) resources). A presence indication configuration resource may be dedicated (e.g., specific) to any of single and a group of PRACH occasions, e.g., presence indication resources may be used by different WTRUs. For example, (e.g., dynamic) backscattering-PRACH-occasions configuration(s) may allow to reduce (e.g., minimize) the contention (e.g., collision) between backscattering and non- backscattering (e.g., legacy) WTRUs. According to embodiments, the interrogation signal preamble(s) may allow WTRUs to determine their (e.g., approximate) location (e.g., range) to the serving BS. According to embodiments, the interrogation signal preamble(s) may allow WTRUs to improve the UL power control, for example, in a case where the interrogating WTRU is able to perform beamformed interrogation signal transmission. For example, the (e.g., approximate) range to the serving BS may be determined based on a mapping between the interrogation signal beam identifier (ID) and the angular relationship at the interrogating WTRU with respect to the line connecting the interrogating WTRU and the serving BS. For example, the interrogating WTRU may include an identifier (ID) information in the transmitted interrogation signal preamble. The ID information may include any of the beam ID and the ID of the coverage ring (e.g., any of signal strength category ID and range category ID) where it may belong. For example, the backscattering WTRU may determine the (e.g., approximate) range to the serving BS based on the ID information (that may be included (e.g., embedded) in the interrogation signal preamble) and on the received interrogation signal strength measurement (that may be performed based on the preamble).

In an embodiment, a WTRU, that may be any of a passive and a semi-passive WTRU, may receive (e.g., in a first step), (e.g., configuration) information comprising any of parameters and a configuration, for example, through system information. In another example, the (e.g., parameter, configuration) information may be received from the interrogating network element. For example, (e.g., parameter, configuration) information may include indications of any of the following:

network's (NW) support of bi-static backscattering RACH transmission without a presence indication signal transmission, PRACH occasion configuration(s) and mapping (e.g., of any PRACH occasion configuration) to coverage rings (e.g., signal strength categories, range categories), interrogation signal preamble(s) that may be supported (e.g., transmitted by the interrogating network element), their transmission characteristics, and mappings (e.g., of interrogation signal preamble(s) to any of (e.g., specific) backscattering PRACH occasions configuration(s) and to the configured backscattering coverage rings (e.g., mapping of a preamble to a set of thresholds that may correspond to the coverage rings), range thresholds: a range (e.g., distance to the service BS) may be determined based on e.g., measured interrogation signal strength, and detected beam and coverage ring IDs, via interrogation signal preamble. Range thresholds may determine a selection of one of the configured backscattering coverage rings (e.g., signal strength categories, range categories).

For example, (e.g., in a second step) the WTRU may receive any of a paging message and a higher layer request (e.g., to establish an RRC connection). For example, (e.g., in a third step), the WTRU may perform detection, synchronization and received signal strength measurement based on the interrogation signal preamble transmission characteristics (e.g., configuration). For example, (e.g., in a fourth step) the WTRU may determine a PRACH occasion configuration (e.g., any of frequency, time, and RACH preamble format) based on (e.g., common) signaling that may be received any of (e.g., explicitly) from the interrogating network element and (e.g., implicitly) as part of the interrogation signal preamble. For example, the WTRU's backscattering capability (e.g., reflection coefficient/efficiency flexibility) may allow the WTRU to perform UL power control. For example, in a case where the WTRU may perform UL power control, the WTRU (e.g., in a fifth step) may determine its range (e.g., distance) to the interrogating network element based on e.g., any of received signal strength measurement, phase difference of arrival (PDOA) measurement, . . . etc. For example, the WTRU may determine its backscattering coverage ring with respect to the serving BS (e.g., signal strength category, range category) within the cell coverage based on any of the determined range (e.g., distance to the interrogating network element), detected beam ID and interrogator's coverage ring ID (e.g. which may be determined through detected interrogation signal preamble and mapping information), received range thresholds that may be mapped to range categories, and received signal strength thresholds that may be mapped to signal strength categories.

For example, (e.g., in a sixth step) the WTRU may determine the UL power control coefficient based on any of measured interrogation signal strength, backscattering capability (e.g., efficiency), (e.g., current) battery level (e.g., state), and its determined backscattering coverage ring (e.g., range category, signal strength category). For example, (e.g., in a seventh step) the WTRU may determine a backscattering-PRACH-occasion (e.g., to be used for transmission) based on any of an UL power control coefficient, the mapping between coverage rings (e.g., range categories, signal strength categories) and PRACH occasions. For example, the WTRU may modulate the reflection of the interrogation signal for PRACH preamble transmission based on the determined configuration to perform a transmission.

In an embodiment, a WTRU, that may be any of a passive and a semi-passive WTRU, may not support UL power control. The WTRU may receive (e.g., in a first step), (e.g., configuration) information comprising any of parameters and a configuration, for example, through system information. In another example, the (e.g., parameter, configuration) information may be received from the interrogating network element. For example, (e.g., parameter, configuration) information may include indications of any of the following:

- network's (NW) support of bi-static backscattering RACH transmission with a presence indication signal transmission,
- PRACH occasions configuration(s) and mapping (e.g., of any PRACH occasions configuration(s)) to coverage rings (e.g., signal strength categories, range categories), interrogation signal preamble(s) that may be supported (e.g., transmitted by the interrogating network element), their transmission characteristics, and mappings (e.g., of interrogation signal preamble(s)) to any of (e.g., specific) backscattering PRACH occasions configuration(s), presence indication configuration(s) and the configured backscattering coverage rings. For example, the preambles may be used to synchronize any of the presence indication signal and UL RACH preamble transmissions,
- range thresholds: a range (e.g., distance to the service BS) may be determined based on e.g., measured interrogation signal strength, and detected beam and coverage ring IDs, via interrogation signal preamble. Range thresholds may determine a selection of one of the configured backscattering coverage rings (e.g., signal strength categories, range categories).

For example, (e.g., in a second step) the WTRU may receive any of a paging message and a higher layer request (e.g., to establish an RRC connection). For example, (e.g., in a third step), the WTRU may perform any of detection, synchronization and received signal strength measurement based on the interrogation signal preamble transmission characteristics (e.g., configuration). For example, the WTRU may receive the interrogation signal preamble that may indicate any of a presence indication opportunity and a PRACH occasion. On a condition that a presence indication opportunity is indicated (e.g., detected), the WTRU (e.g., in a fourth step) may determine presence (e.g., declaration) indication configuration(s) (e.g. any of frequency, time, and preamble format) based on (e.g., common) signaling that may be received any of (e.g., explicitly) from the interrogating network element and (e.g., implicitly) as part of the interrogation signal preamble. For example, (e.g., in a fifth step) the WTRU may backscatter (e.g., backscattered-based transmit) a presence indication signal (e.g., including signaling) e.g., to the interrogating network element in a case where full-duplex capability is supported by the interrogating network element. In a case where full-duplex capability is not supported by the interrogating network element, the WTRU may backscatter (e.g., backscattered-based transmit) the presence indication signal to the serving BS. For example, on a condition that a presence indication signal is received (e.g., detected), e.g., by any of the serving BS and the interrogating network element (e.g. from any of the considered WTRU and any other backscattering WTRU), the WTRU (e.g., in a sixth step) may (e.g., detect and) determine a PRACH occasion configuration (e.g. any of frequency, time, and RACH preamble format) based on any of (e.g., common) signaling that may be received any of (e.g., explicitly) from the interrogating network element and (e.g., implicitly) as part of the interrogation signal preamble. For example, (e.g., in a seventh step) the WTRU may utilize (e.g., modulate a reflection of) the interrogator signal for a backscattered-based PRACH preamble transmission based on the determined PRACH occasion configuration.

According to embodiments, the presence indication may be any of group-specific, RACH occasion-specific, and WTRU-specific. For example, a presence indication configuration may indicate whether the presence indication is to be transmitted by (e.g., all) backscattering WTRUs e.g., within a (e.g., determined) coverage, e.g., determined by received interrogation signal strength, or by a subset of the backscattering WTRUs. For example, the subset of backscattering WTRUs may be determined any of randomly and according to a criterion, such as e.g., WTRUs history of presence indication (e.g., within a duration). In another example, the subset of backscattering WTRUs may be determined based on a combination of random selection and (e.g., target) criteria.

In an embodiment, a WTRU, that may be any of a passive and a semi-passive WTRU, may support (e.g., be capable of) UL power control. The WTRU may receive (e.g., in a first step), (e.g., configuration) information comprising any of parameters and a configuration, for example, through system information. In another example, the (e.g., parameter, configuration) information may be received from the interrogating network element. For example, (e.g., parameter, configuration) information may include indications of any of the following:

- network's (NW) support of bi-static backscattering RACH transmission with a presence indication signal transmission,
- PRACH occasions configuration(s) and mapping (e.g., of any PRACH occasions configuration(s)) to coverage rings (e.g., signal strength categories, range categories), interrogation signal preamble(s) that may be supported
(e.g., transmitted by the interrogating network ele-
ment), their transmission characteristics, and mappings
(e.g., of interrogation signal preamble(s)) to any of
(e.g., specific) backscattering PRACH occasions con-
figuration(s), presence indication configuration(s) and
the configured backscattering coverage rings. For
example, the preambles may be used to synchronize
any of the presence indication signal and UL RACH
preamble transmissions, range thresholds: a range (e.g., distance to the service BS)
may be determined based on e.g., measured interroga-
tion signal strength, and detected beam and coverage
ring IDs, via interrogation signal preamble. Range
thresholds may determine a selection of one of the
configured backscattering coverage rings (e.g., signal
strength categories, range categories).

For example, (e.g., in a second step) the WTRU may
receive any of a paging message and a higher layer request
(e.g., to establish an RRC connection). For example, (e.g., in
a third step), the WTRU may perform any of detection,
synchronization and received signal strength measurement
based on the interrogation signal preamble transmission
characteristics (e.g., configuration). For example, the
WTRU may receive the interrogation signal preamble that
may indicate any of a presence indication opportunity and a
PRACH occasion. In a case where a presence indication
opportunity is indicated (e.g., detected), the WTRU (e.g., in
a fourth step) may determine presence (e.g., declaration)
indication configuration(s) (e.g. any of frequency, time, and
preamble format) based on (e.g., common) signaling that
may be received any of (e.g., explicitly) from the interro-
gating network element and (e.g., implicitly) as part of the
interrogation signal preamble. For example, (e.g., in a fifth
step), and e.g., according to declaration criteria, the WTRU
may backscatter (e.g., backscattered-based transmit) a pres-
ence indication signal (e.g., including signaling) e.g., to the
interrogating network element in a case where full-duplex
capability is supported by the interrogating network ele-
ment. In a case where full-duplex capability is not supported
by the interrogating network element, the WTRU may
backscatter (e.g., backscattered-based transmit) the presence
indication signal to the serving BS. For example, on con-
dition that a presence indication signal is received (e.g.,
detected), e.g., by any of the serving BS and the interrogat-
ing network element (e.g. from any of the considered WTRU
and any other backscattering WTRU), the WTRU (e.g., in a
sixth step) may (e.g., detect and) determine a PRACH
occasion configuration (e.g. any of frequency, time, and
RACH preamble format) based on any of (e.g., common)
signaling that may be received any of (e.g., explicitly) from
the interrogating network element and (e.g., implicitly) as
part of the interrogation signal preamble. For example, the
WTRU's backscattering capability (e.g., reflection coeffi-
cient/efficiency flexibility) may allow the WTRU to perform
UL power control. For example, in a case where the WTRU
may perform UL power control, (e.g., in a seventh step) the
WTRU may determine its backscattering coverage ring
(e.g., range category, signal strength category) within the
cell coverage based on range (e.g., estimation) to the inter-
rogating network element (e.g., interrogator), detected beam
ID, and interrogator's coverage ring ID (e.g., which may be
determined through detected interrogation signal preamble
and mapping information), received range thresholds that
may be mapped to coverage rings (e.g., range categories)
and received signal strength thresholds that may be mapped
to signal strength categories. For example, the range (e.g., distance) to the interrogating network element (e.g., inter-
rogator may be determined e.g., through any of received
signal strength measurement, PDOA measurement, . . . etc.

For example, (e.g., in an eighth step) the WTRU may
determine the UL power control coefficient based on any of
(e.g., measured) interrogation signal strength, backscattering
capability (e.g., efficiency), (e.g., current) battery level (e.g.,
state), and its determined backscattering coverage ring (e.g.,
range category, signal strength category). For example, (e.g.,
in a ninth step) the WTRU may determine a backscattering-
PRACH-occasion (e.g., to be used for backscattered-based
transmission) based on any of the UL power control coef-
ficient and the mapping between coverage rings (e.g., range
categories, signal strength categories) and PRACH-occa-
sions. For example, the WTRU may modulate the reflection
of the interrogation signal for PRACH preamble transmis-
sion based on the determined configuration to perform a
transmission.

FIG. 13 is a diagram illustrating an example of a method
1300 for requesting radio RRC connection establishment
using bi-static backscattering. In an embodiment, the WTRU
may be any of a passive and a semi-passive WTRU.

In a step 1310, the WTRU may receive backscattering
(e.g., any of system and control) information such as
e.g., PRACH occasions configuration(s), supported
interrogation signal preamble(s), range thresholds, and
mappings (e.g., of interrogation signal preamble(s)) to
any of (e.g., specific, dedicated)
backscattering PRACH occasion(s), presence indica-
tion configuration(s), and the configured backscattering
coverage rings (e.g., range categories, signal strength
categories).

In a step 1320, the WTRU may receive any of a paging
message and a higher layer request e.g., to establish an
(e.g., RRC) connection.

In a step 1330, the WTRU may monitor RACH
resource(s) to perform any of detection, synchroniza-
tion and received signal strength measurement based on
interrogation signal preamble transmission characteris-
tics (e.g., configuration).

In a step 1340, the WTRU may measure the received
signal strength and may determine (e.g., detect) a
presence indication opportunity and determine pres-
ence indication configuration(s) (e.g., any of frequency,
time, preamble format), and declaration criteria based
on (e.g., common signaling that may be received e.g.,
implicitly as part of) the interrogation signal preamble.

In a step 1350, the WTRU may backscatter (e.g., perform
a backscattered based transmission) a presence indica-
tion (e.g., signaling) to any of the serving BS and the
interrogating network element based on the determined
configuration.

The WTRU may (e.g., detect and) determine a PRACH
occasion configuration (e.g., any of frequency, time,
and RACH preamble format) based on (e.g., common
signaling that may be received e.g., implicitly as part
of) the interrogation signal preamble.

In a step 1360, the WTRU may determine its backscat-
tering coverage ring (e.g., range category, signal
strength category) within the cell coverage based on
any of a range (e.g., estimation) to the interrogating
network element, detected beam ID, interrogator's cov-
erage ring ID, received range thresholds and mapping
to coverage rings (e.g., range categories) (e.g., or
received signal strength thresholds and mapping to
signal strength categories).

In a step 1370, the WTRU may determine an UL power
control coefficient based on any of (e.g., measured)

interrogation signal strength, backscattering efficiency, (e.g., current) battery level, and the determined backscattering coverage ring (e.g., range category, signal strength category).

In the step 1370, the WTRU may determine the backscattering-PRACH-occasion based on UL power control coefficient and mapping between coverage rings (e.g., range categories, signal strength categories) and PRACH occasions.

In a step 1380, the WTRU may perform a backscattered based PRACH preamble transmission based on the interrogation signal according to the determined configuration; for example, the WTRU may use the interrogation signal as a carrier which may be modulated and reflected to transmit the PRACH preamble according to the determined configuration.

Examples of Interrogator (Re-)Selection(s)

Device-controlled and network-controlled interrogator (re-)selection methods are described herein. The term "interrogator" may be used interchangeably with "interrogating network element" to designate the network element (e.g., which may be a WTRU) that may be transmitting the interrogation signal in bi-static backscattering. Backscattering based RACH procedures may be performed (e.g., initiated), for example, after any of a paging message reception and a higher layer request. Device-controlled interrogator (re-) selection procedures may allow to enable RACH-less grant-free transmissions that may be initiated by higher-layers. The term "device-controlled" refers to the fact that the decision of pairing (e.g., the decision of which interrogation network element may be associated with (e.g., may serve which) backscattering WTRU) may be taken by (e.g., under control of) any of the backscattering and the interrogating WTRUs. For example, the network may assist any of the backscattering and the interrogating WTRUs in making the decision.

Examples of Network-Controlled Methods for Interrogator Selection by (e.g., Semi-) Passive WTRU Network-controlled methods are described herein, in which the BSs in the network may make the decision to select interrogators under their coverage with or without assistance of backscattering WTRUs. The behavior of (e.g., methods processed by) the WTRUs that may be interested in any of providing and receiving the interrogation signals are described herein. Throughout embodiments described herein the terms "interrogator selection request" and "interrogator illumination request" may be used interchangeably to refer to a request for selecting of a new interrogator network element.

In an embodiment, a WTRU which may be capable of (e.g., willing to, interested in) operating as an interrogator may receive (e.g., in a first step), for example, through any of RRC signaling, non-access stratum (NAS) signaling and system information, (e.g., configuration) information comprising indications of any of the following parameters (e.g., configuration):

network's (NW) support of any of bi-static backscattering RACH transmission and network-controlled interrogator selection;

configuration of interrogators' contention resources, e.g., any of dedicated and existing RACH resources (e.g., occasions), any of available preambles (e.g., sequences), time and frequency resource configuration, mappings between resources configuration and received signal strengths, and allowed (e.g., maximum) power (e.g., which may be received signal strength dependent).

For example, (e.g., in a second step), the WTRU may measure received signal strength, e.g., based on a reference signal, that may be any of an (e.g., existing) reference signal, a reference signal (e.g., preamble) dedicated for the purpose of (e.g., associated with) the interrogator (e.g., facilitator) selection. For example, the transmission on which the received signal strength may be measured, may be any of (e.g., a transmission comprising information indicating) an interrogator illumination request (such as e.g., a paging message) received from the serving base station, and a transmission, that may be received from the backscattering WTRU, indicating (e.g., using) an illumination preamble (e.g., sequence), e.g., that may have been determined by the backscattering WTRU as described herein. For example, the reference signal on which the received signal strength may be measured by the WTRU may be the illumination preamble (e.g., sequence) transmitted (e.g., backscattered) by the backscattering WTRU.

For example, (e.g., in a third step) the WTRU may utilize the determined received signal strength and received interrogators' contention configuration to determine (e.g., select) any of a RACH occasion (e.g., frequency, and time resources) and a preamble (e.g., sequence) from the pool associated with the RACH occasion. For example, (e.g., in a fourth step) the WTRU may transmit the selected preamble (e.g., sequence) over the determined (e.g., selected) PRACH resources. The selected preamble (e.g., sequence) may be transmitted e.g., any of individually (e.g., as a single transmission) and as part of a request message, indicating an interest to become an interrogator. For example, (e.g., in a fifth step), the WTRU may receive a (e.g., contention resolution) message including information indicating any of a selection confirmation (e.g., approval) and interrogation signal configuration, such as e.g., any of a transmission periodicity, transmission frequency resources, and a preamble transmission configuration preceding the interrogation signal. For example, (e.g., in a sixth step), the WTRU may transmit (e.g., a transmission including) the interrogation signal based on the received configuration.

In another example of the fifth step, the WTRU may receive a (e.g., contention resolution) message including information indicating a selection decline. For example, in a following step, the WTRU may wait for a (e.g., preconfigured) time interval before re-attempting to request becoming an interrogator. In another example of the fifth step, the WTRU may not receive any (e.g., contention resolution) message. For example, in a following step, the WTRU may (e.g., attempt to) send an (e.g., interrogator selection request) message in the following configured RACH occasion, indicating a request for interrogator selection.

In an embodiment, a (e.g., semi-passive) WTRU may receive (e.g., in a first step), e.g., through system information (e.g., configuration) information comprising indications of any of the following parameters (e.g., configuration):

network's (NW) support of any of bi-static backscattering RACH transmission and network-controlled interrogator selection;

monitoring configuration (e.g., information) of interrogator illumination request messages (e.g., transmissions), e.g., including any of monitoring periodicity, modulation and coding scheme, preamble (e.g., sequence) indicative of the request, and frequency resource configuration;

default configuration (e.g., information) for interrogator's illumination, e.g., including (e.g., information indicating) any of a set of available illumination preambles (e.g., sequences), a time offset with respect to the received request, available time instances and frequency resources for illumination (e.g., signal transmission), maximum transmit power, and mapping (e.g., association) information between received signal strength information and the scheduling configuration (which may be referred to herein as a subset of any of (i) the available time instances and frequency resources for illumination (e.g., signal transmission) and (ii) the set of available illumination preambles (e.g., sequences), as indicated in the default configuration (e.g., information); for example, the default configuration information may include mapping (e.g., association) information indicating that one or more received signal strengths (e.g., values, ranges) may be associated with any of a subset of the available illumination preambles (e.g., sequences) and a subset of the available time instances and frequency resources for illumination signal transmission; for example, a subset of the available illumination preambles (e.g., sequences) that may be associated with one or more received signal strength (e.g., values, ranges) may be referred to herein as a signal-strength-specific pool of preambles (e.g., sequences).

PRACH occasion configuration (e.g., information).

For example, (e.g., in a second step), the WTRU may receive (e.g., and detect) any of a higher layer request and a transmission e.g., indicating an interrogator illumination request e.g., from the serving base station according to the monitoring configuration. The (e.g., transmission indicating the) interrogator illumination request may include updated configuration (e.g., information) of the illumination signal transmission, e.g., indicating an updated configuration of the illumination signal transmission. For example, the updated configuration (e.g., information) may include updated information for any information (e.g., indication) of the default configuration information. For example, (e.g., in a third step) the WTRU may determine the received signal strength(s) based on any of the received (e.g., transmission indicating the) interrogator illumination request and another reference signal. For example, the WTRU may determine any of a first received signal strength from a first reference signal and a second received signal strength from the illumination request. For example, the first received signal strength may be such that the WTRU may determine to participate in a network-controlled interrogator selection as described herein. For example, (e.g., in a fourth step) the WTRU may determine any of an (e.g., interrogator illumination) preamble (e.g., sequence), transmission power, and transmission time/frequency resources based on any of the current battery state, the determined (e.g., any of the first and second) received signal strength, and received (e.g., any of default and updated) configuration for interrogator's illumination transmissions. For example, (e.g., in a fifth step) the WTRU may any of (e.g., actively) transmit and backscatter the determined (e.g., interrogator illumination) preamble (e.g., sequence) according to the determined configuration. For example, the determined (e.g., interrogator illumination) preamble (e.g., sequence) may be any of (e.g., actively) transmitted and backscattered to WTRU's nearby interrogators to indicate the presence of the WTRU and its capability (e.g., interest) in backscattering. The interrogator WTRU(s) may use this preamble (e.g., sequence) to measure the received signal strength and compete with other nearby interrogator WTRUs for the service of the backscattering WTRU based on the received signal strength of the illumination sequence.

For example, (e.g., in a sixth step) the WTRU may utilize the configured PRACH occasions and a received interrogating signal to backscatter a selected PRACH preamble in response to any of a received paging message and a higher layer request to establish an RRC connection.

Figure 14:
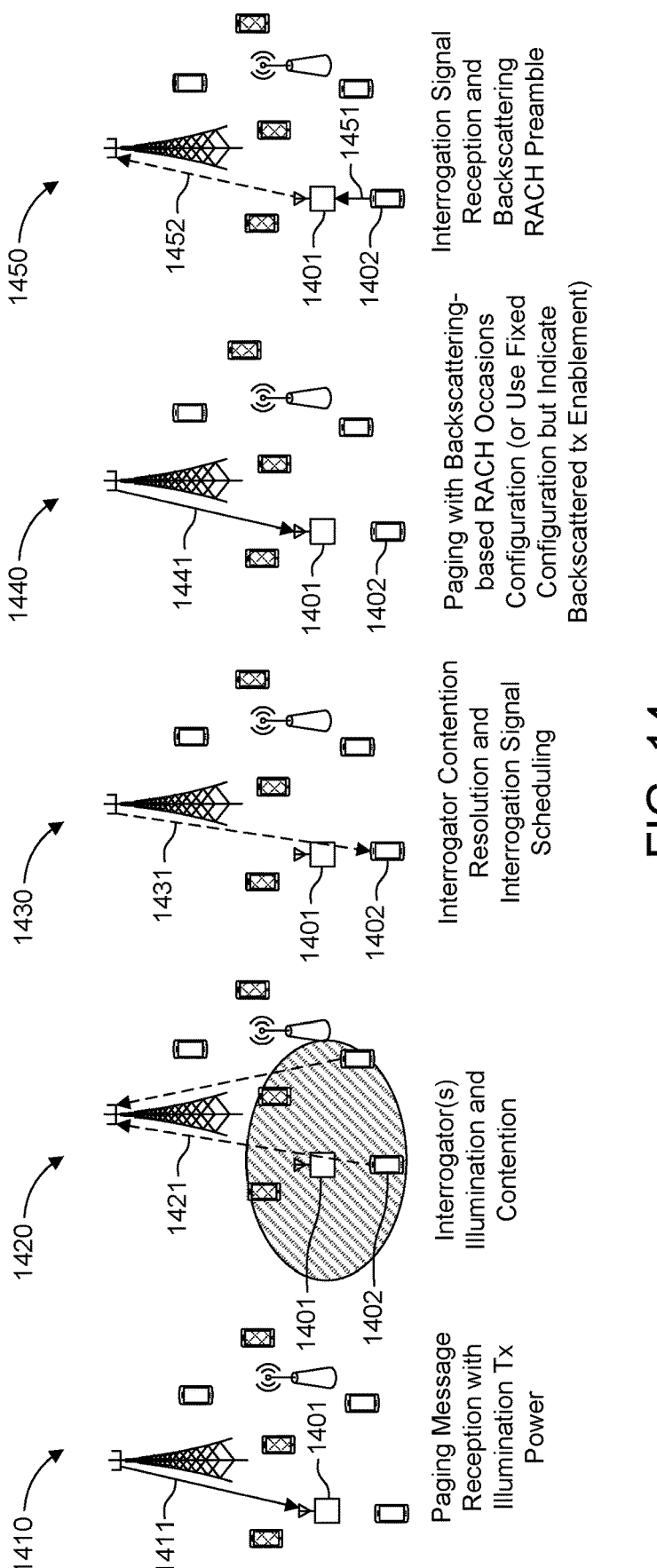
FIG. 14 is a diagram illustrating an example of an interrogator illumination method for bi-static backscattering.

FIG. 14 is a diagram illustrating an example of an interrogator illumination method for bi-static backscattering. For example, as illustrated in the first part 1410 of FIG. 14, a backscattering WTRU 1401 may receive a paging message 1411, that may be transmitted with an illumination Tx power and that may indicate (e.g., comprise information indicating) an interrogator illumination request. For example, as illustrated in the second part 1420 of FIG.14, an interrogator WTRU 1402 may be located in the area illuminated by the illumination signal (that may have been any of (e.g., actively) transmitted and backscattered by the backscattering WTRU 1401, e.g., to indicate its presence to nearby interrogators. For example, the interrogator WTRU 1402 may transmit a transmission 1421 to indicate an interest to become an interrogator. For example, as illustrated in the third part 1430 of FIG. 14, the interrogator WTRU 1402 may receive a contention resolution message 1431 including any of a selection confirmation (e.g., approval) and interrogation signal configuration information. For example, as illustrated in the fourth part 1440 of FIG. 14, the backscattering WTRU 1401 may receive a paging message 1441 associated with backscattering-based RACH occasions configuration information. For example, as illustrated in the fifth part 1450 of FIG. 14, The backscattering WTRU 1401 may receive an interrogation signal 1451 from the selected interrogator WTRU 1402. The backscattering WTRU 1401 may backscatter a PRACH preamble transmission 1452 based on the interrogation signal 1451.

Figure 15:
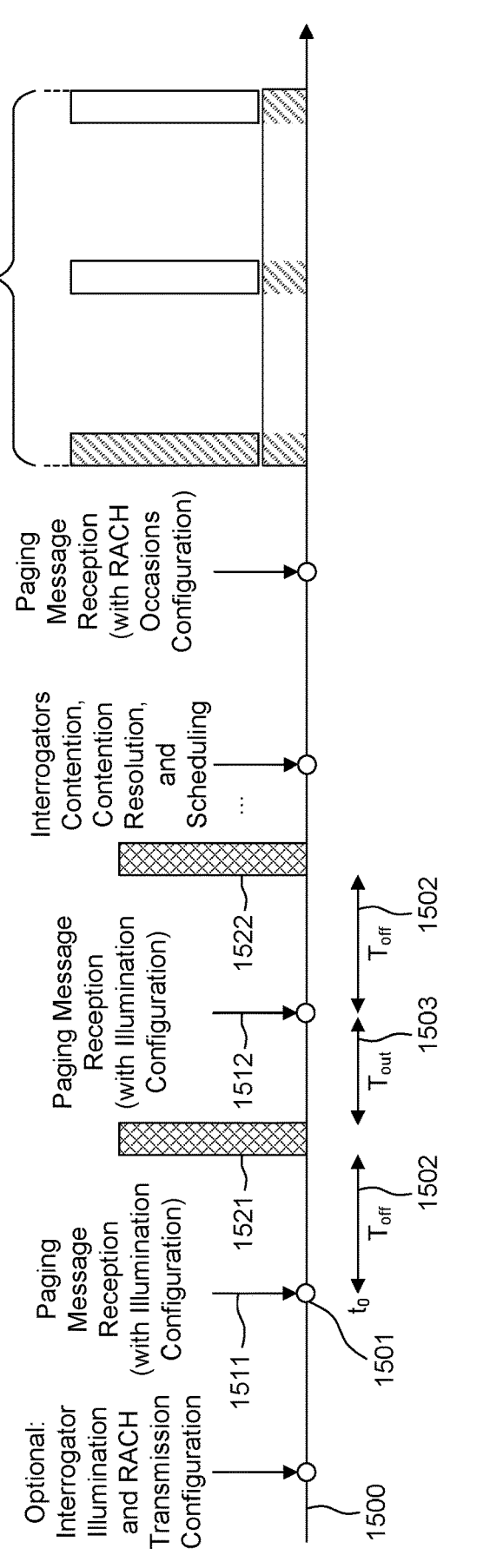
FIG. 15 is a diagram illustrating an example of a timeline of interrogator illumination and PRACH transmission method for bi-static backscattering.

FIG. 15 is a diagram illustrating an example of a timeline 1500 of interrogator illumination and PRACH transmission method for bi-static backscattering. For example, a WTRU may receive an interrogator illumination request 1511, at the time instance 1501 (which may be referred to herein as to) e.g., as part of e.g., a paging message. For example, there may be a time offset 1502 (which may be referred to herein as $T_{off}$) between the time 1501 when the illumination request may be received and the time when the illumination signal (e.g., transmission) 1521 may be any of (e.g., actively) transmitted and backscattered e.g., by the backscattering WTRU. For example, the illumination signal (e.g., transmission) 1521 1522 may indicate the illumination preamble (e.g., sequence) that may have been determined by the backscattering WTRU. For example, there may be an outage time 1503 (which may be referred to herein as $T_{out}$) representing the time at which the network may transmit another interrogator illumination request 1512 (e.g., in a case where the network does not receive any response from potential nearby interrogators).

For example, the monitoring configuration of an interrogator illumination request message may be the same as the paging monitoring configuration. For example, the paging message may include information indicating an interrogator illumination request. For example, the WTRU's (e.g., random) selection of a preamble (e.g., sequence) from a signal-strength-specific pool of preambles (e.g., sequences) may allow to assist the network in resolving interrogators' contention over the service of multiple WTRUs. For example, the WTRU may select the illumination preamble (e.g., sequence) based on its relative distance to the base station. This may allow the interrogator WTRUs to differentiate between multiple WTRUs in different areas of the base station coverage, and to be selected (e.g., by the base station) such that (e.g., all) the WTRUs interested in (e.g., capable of) bi-static backscattering may be served in the coverage area with (e.g., acceptable) quality. In another example, the serving base station may be selected as an interrogator in a mono-static backscattering example in response to an interrogator illumination signal received from the served WTRU.

FIG. 16 is a diagram illustrating an example of a network-controlled interrogator selection method 1600 prior to RRC connection establishment request. In an embodiment, a WTRU may be any of a passive and a semi-passive WTRU.

For example, in a step 1610, the WTRU may receive, e.g., via system information, (e.g., configuration) information indicating any of network's (NW) support of network-controlled interrogator selection, monitoring configuration of interrogator illumination requests, default configuration of interrogator illumination signals, and PRACH occasions configuration.

For example, in a step 1620, the WTRU may receive any of a paging message and a higher layer request to establish a RRC connection.

For example, in a step 1630, the WTRU may monitor for an illumination request based on any of the received paging message and interrogator selection configuration. For example, the WTRU may detect an interrogator illumination request.

For example, in a step 1640, the WTRU may measure (e.g., determine) the received signal strength (e.g., of the transmission indicating (e.g., representing) the interrogator illumination request). For example, the WTRU may determine the illumination sequence(s), transmission power, and transmission resources/occasions based on any of the current battery state, the determined received signal strength, and received configuration (e.g., information) for interrogator's illumination transmissions.

For example, in a step 1650, the WTRU may transmit (e.g., any of actively transmit and backscatter) the determined interrogator illumination sequence(s) according to the determined configuration (e.g., occasions).

For example, in a step 1660, the WTRU may monitor the RACH resources for an interrogation opportunity preamble e.g., within a window based on the received RACH configuration.

On a condition that an interrogation signal is detected during a configured PRACH occasion, the WTRU may backscatter, in a step 1680, a selected PRACH preamble in response to any of a received paging message and a higher layer request to establish an RRC connection. Otherwise, for example, after a (e.g., configured number) L of (e.g., consecutive) PRACH occasions of missed interrogation signal(s), the WTRU may fallback to (e.g., legacy non-backscattered based) PRACH transmission in a step 1670. By "legacy RACH transmission" it is meant throughout embodiments described herein, an active transmission (e.g., non-backscattered based) where any of the RACH preamble and the RACH occasions may be determined independently from the received signal strength of any of the serving base station and an interrogating WTRU.

For example, the WTRU may not be equipped with (e.g., include) a traditional receiver and may not be able to fall back to the legacy RACH transmission. For example, the WTRU may continue attempting to perform PRACH transmission using backscattering techniques as described herein.

In an embodiment, a WTRU may be capable of (e.g., and interested in) operating as an interrogator WTRU.

For example, (e.g., in a first step) the WTRU may receive (e.g., configuration) information indicating any of network's (NW) support of bi-static backscattering RACH and configuration of interrogators' selection and contention resources.

For example, (e.g., in a second step) the WTRU may determine interest in acting (e.g., performing) as an interrogator WTRU and support of network-controlled interrogators selection.

For example, (e.g., in a third step) the WTRU may measure received signal strength (e.g., any of RSRP and RSRQ) e.g., based on (e.g., existing) reference signals.

For example, (e.g., in a fourth step) the WTRU may select any of a RACH occasion and a preamble from the associated pool based on the determined received signal strength and interrogators' contention configuration (e.g., information).

For example, (e.g., in a fifth step) the WTRU may utilize the selected preamble and RACH occasion to transmit (e.g., a transmission indicating) a request to operate as an interrogator WTRU.

For example, (e.g., in a sixth step) the WTRU may receive a contention resolution message indicating a correct reception of the WTRU's request.

On a condition that the contention resolution message includes a selection decline, the WTRU may wait for a (e.g., preconfigured) time interval before re-attempting to (e.g., transmit a transmission indicating a) request to operate as an interrogator WTRU.

Otherwise, any of selection approval and interrogation signal configuration may be determined.

In an embodiment, a (e.g., backscattering) WTRU may detect a network's request to illuminate nearby area (e.g., a network transmission indicating an interrogator illumination request) using any of active and backscattering transmissions to assist in interrogator selection in bi-static interrogation architectures. For example, the (e.g., backscattering) WTRU may assist in interrogator selection by transmitting to nearby interrogators a (e.g., selected) illumination preamble (e.g., sequence).

In an embodiment, a WTRU may fall back to a legacy, (e.g., backscattering-less) RACH transmission method after failure to detect an interrogation signal during a (e.g., preconfigured) RACH occasion after a number L of trials of interrogator illumination in bi-static interrogation architectures.

In an embodiment, a WTRU may utilize interrogator specific pool of preambles (e.g., sequences) to contend with other potential interrogators for interrogation signal transmissions in bi-static architectures.

Examples of Device-Controlled Methods for Interrogator Selection by (e.g., Semi) Passive WTRU Device-controlled methods are described herein, in which WTRUs, e.g., backscattering and potential interrogating WTRUs may coordinate, e.g., without or with assistance from the network, to select the interrogating WTRUs.

In an embodiment, a (e.g., semi-passive) WTRU may receive (e.g., in a first step), for example, through system information (e.g., configuration) information comprising indications of any of the following parameters and configuration:

network's (NW) support of any of bi-static backscattering RACH transmission and device-controlled interrogator selection;

interrogator scanning resource configuration (e.g., any of available preambles/sequences, time and frequency resource), mapping (e.g., association) information between resources configuration(s) and received signal strengths (e.g., information), and allowed maximum power (e.g., which may be received signal strength dependent); for example, the (e.g., configuration) information may include mapping (e.g., association) information indicating that one or more received signal strength (e.g., values, ranges) may be associated with any of a subset of the available preambles (e.g., sequences) and a subset of the available time and frequency resources for scanning sequence transmission;

PRACH occasion configuration.

For example, (e.g., in a second step) the WTRU may receive any of a paging message and a higher layer request e.g., to establish an (e.g., RRC) connection. For example, (e.g., in a third step) the WTRU may determine to (re-)select an interrogator based on e.g., any of an absence of an interrogator's synchronization signal (e.g., for a (e.g., specific) duration of time), and a presence of a received signal strength of a (e.g., any of mono-static and bi-static) reference signal below a threshold. The WTRU may determine any of a configuration and opportunities (e.g., occasions) for interrogator scanning. For example, the scanning opportunities (e.g., occasions) may be periodic (e.g., regular, repeated) and configuration information indicating the interrogator scanning configuration may be received e.g., through system information. In another example, the scanning opportunities (e.g., occasions) may be any of opportunistic and aperiodic, and configuration information indicating the interrogator scanning configuration may be received e.g., any of through system information and as part of an opportunity initialization preamble transmission. For example, the interrogator scanning configuration may indicate presence of any number of (which may be referred to herein as N) occasions that may be available for e.g., ramped-up power scanning with e.g., an allowed maximum scanning power (which may be referred to herein as $P_{scan,max}$). For example, on a condition that the WTRU determines a received signal strength being greater than or equal to a (e.g., preconfigured, signaled) threshold and based on a (e.g., current) battery level (e.g., state), the WTRU may select (e.g., in a fourth step) an initial interrogator scanning transmission power and a preamble sequence (which may be referred to herein as si for the ith scanning occasion). For example, the initial interrogator scanning transmission power may be selected based on any of the WTRU battery level, the configuration information (e.g., configured mapping), signal strength measurement(s) and the size of a subset of scanning occasions to be used for the scanning. The signal strength measurement(s) may be based on e.g., any of a periodically (e.g., repeatedly) transmitted and an opportunistically transmitted synchronization preamble by the serving BS to any of perform (e.g., initialize) an interrogator scanning opportunity and e.g., perform mono-static backscattering. For example, the preamble sequence may be any of randomly selected and selected based on the configured mapping between resources configuration (e.g., any of preamble, time, and/or frequency) and received signal strength(s). For example, (e.g., in a fifth step) the WTRU may (e.g., sequentially) transmit a sequence si at a power (which may be referred to herein as $p_i = f(p_{i-1})$, $i \in \{1,2,3, \ldots, N\}$ where $f(x)$ may be a monotonically increasing function in x and po may be chosen such that $p_N \leq P_{scan,max}$ (e.g., and/or a maximum energy expenditure on the method may be achieved). For example, the sequential transmission may be performed until any of an acknowledgment may be successfully received from a (e.g., candidate) interrogator and (e.g., until) the last occasion N. For example, the acknowledgment signal may be an interrogation signal that may be received in a PRACH occasion between two (e.g., subsequent) interrogator scanning occasions, (e.g., a PRACH occasion that may follow the last interrogator scanning occasion and may be preceding the next one). In a case where a (e.g., nearby) interrogator is detected by receiving an acknowledgment e.g., before or at the last scanning occasion N, the WTRU may backscatter a selected PRACH preamble based on the configured PRACH occasions and the received interrogation signal. Otherwise (e.g., in a case where no (e.g., nearby) interrogator is detected), the WTRU may refrain (e.g., not perform any) PRACH preamble transmission, e.g., in response to a paging message, or the WTRU may use (e.g., full) transmission power according to the (e.g., current) battery level (e.g., state).

Figure 9:
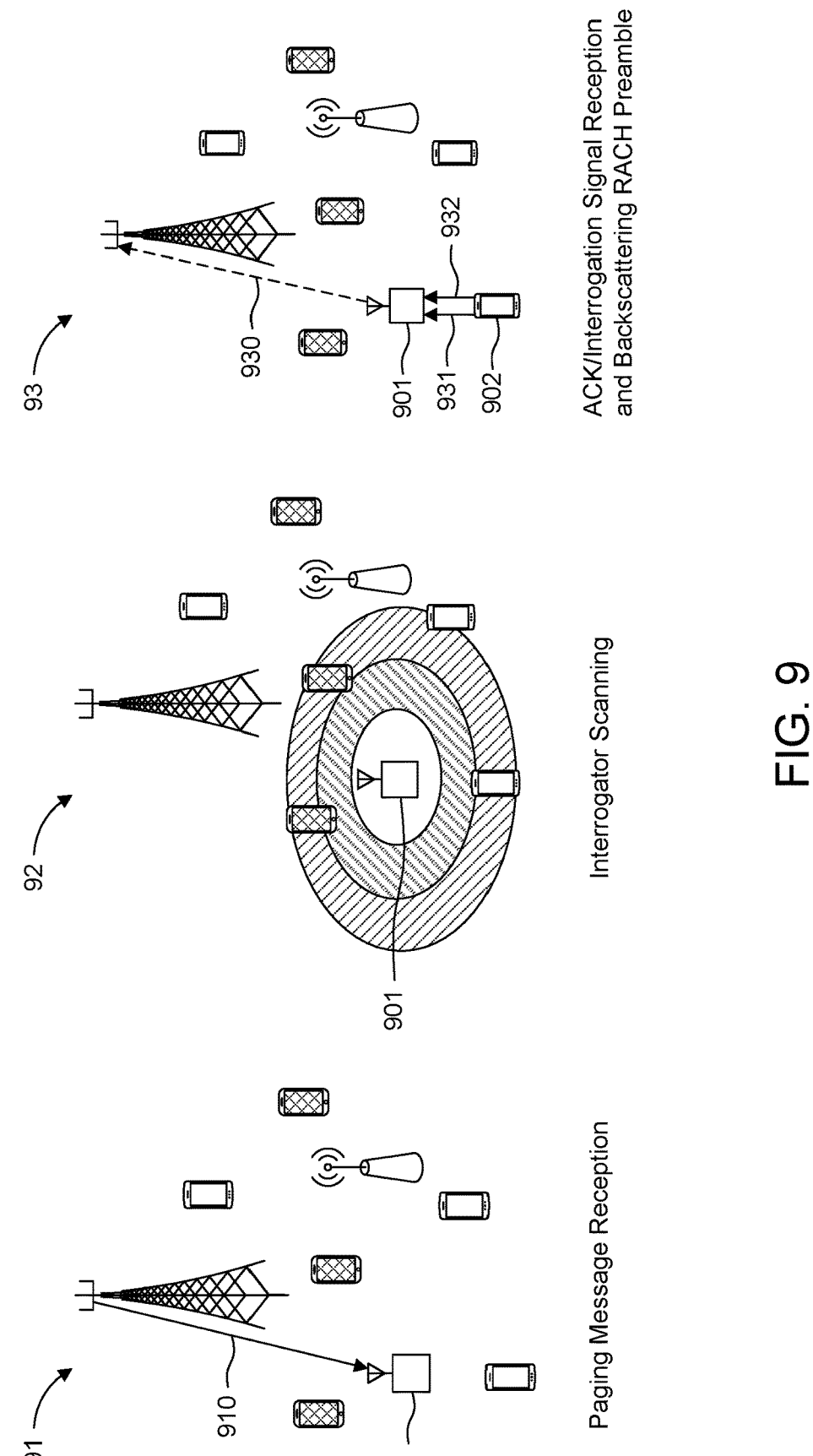
FIG. 9 is a diagram illustrating an example of an interrogator scanning method for bi-static backscattering.

FIG. 9 is a diagram illustrating an example of an interrogator scanning method for bi-static backscattering. For example, as illustrated in the left part 91 of FIG. 9, a backscattering WTRU 901 may receive a paging message 910. As illustrated in the middle part 92 of FIG.9, the backscattering WTRU 901 may perform an interrogator scanning, e.g., listening in any (e.g., configured) scanning opportunities. As illustrated in the right part 93 of FIG.9, the backscattering WTRU 901 may receive an acknowledge signal 931 from a (e.g., candidate) interrogating WTRU 902. The backscattering WTRU 901 may receive an interrogation signal 932 (that may be any of the same signal as and a different signal from the acknowledge signal) 931. The backscattering WTRU 901 may backscatter a PRACH preamble transmission 930 based on the interrogation signal 932.

For example, in a case where multiple (e.g., more than one) candidate interrogator WTRUs detected a scanning sequence, any of the interrogator WTRUs and the backscattering WTRU may obtain (e.g., reach) a resolution (e.g., select one of the candidate interrogator WTRUs for being associated with the backscattering WTRU). One of the candidate interrogator WTRUs may be selected by e.g., using side-links. For example, a (e.g., candidate) interrogator WTRU may be selected by the backscattering WTRU based on the acknowledge signal received in response to any of the scanning sequences which may be any of an interrogator-specific sequence and an energy signature. The backscattering WTRU may measure a received signal strength based on e.g., any of the sequences and energy signatures. For example, the backscattering WTRU may transmit any of a sequence, an energy signature, and a sequence corresponding to an energy signature that may be associated with the selected interrogator WTRU, e.g., in a subsequent configured occasion. For example, the backscattering WTRU may limit the (e.g., maximum) number of scanning sequence transmissions to N−1 to keep the last occasion available for interrogator selection resolution.

In an embodiment, the backscattering WTRU may decide to limit the number of scanning occasions to a number that may be lower than the number of available scanning occasions (e.g., n<N) and may utilize the saved (e.g., corresponding) power for the direct transmission of a PRACH preamble (e.g., in response to any of the paging message and the higher layer request). For example, the backscattering WTRU may receive (e.g., information indicating) a total of N interrogator scanning and PRACH transmission occasions. For example, the backscattering WTRU may use a subset (e.g., $\tilde{n}<N$) of occasions for interrogator scanning transmissions and the remaining occasions (e.g., $M=N-\tilde{n}$) may be used for repetitive PRACH transmissions, e.g., to improve the (e.g., probability of) detection at the serving BS. The number of occasions in the subset (e.g., $\tilde{n}$) may be determined, for example, based on the measured received signal strength. The initial transmission power ($p_0$) may be determined according to the determined number of occasions in the subset (e.g., $\tilde{n}$).

Figure 10:
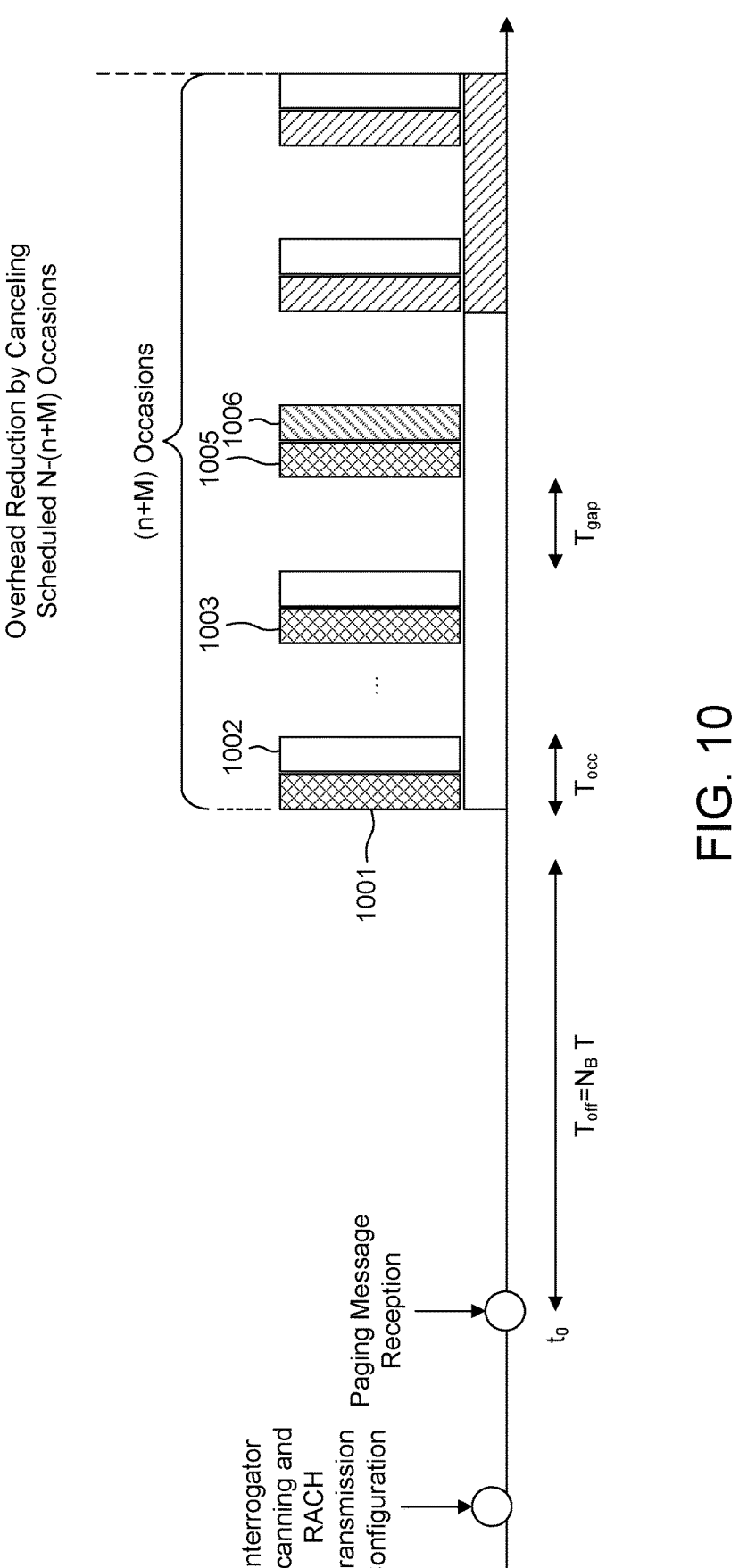
FIG. 10 is a diagram illustrating an example of a timeline of interrogator scanning and PRACH transmission method.

FIG. 10 is a diagram illustrating an example of a timeline of interrogator scanning and PRACH transmission method. For example, the backscattering WTRU may transmit a scanning sequence over a number n of occasions 1001, 1003, 1005 that may be lower than the number of occasions in the subset ($n \le \tilde{n}$) and that may be dependent on the reception of an acknowledgment 1006 from a candidate interrogator. A (e.g., predefined) time unit may be referred to herein as T. A number of time units (which may be referred to herein as $N_B$) may identify a time offset from the reception of a paging message. The time offset (which may be referred to herein as $T_{off}$) may represent the time interval between the reception of the paging message and the beginning of the interrogator scanning opportunity. An occasion duration (which may be referred to herein as $T_{occ}$) may represent the (e.g., total) time of transmission 1001 and reception 1002 windows with a split ratio (which may be referred to herein as $\beta$). The split ratio $\beta$ may be used to represent the transmission window duration as $\beta T_{occ}$ whereas the reception window duration may be represented as $(1-\beta) T_{occ}$. A time gap duration (which may be referred to herein as $T_{gap}$), may represent the time between two consecutive occasions (e.g., to allow receiver processing). For example, no interrogation signal may be transmitted during the time gap.

In an embodiment, the backscattering WTRU may be a passive WTRU. For example, the serving BS may enable (e.g., support, aid) the backscattering WTRU to perform the interrogator scanning (e.g., selection) method by transmitting an interrogation signal. A power ramp-up may entail the backscattering WTRU to dampen the backscattered signal, e.g., consider lower reflection coefficients, at early scanning occasions till it may obtain (e.g., reach) maximum backscattered reflection at the last scanning occasion. The power ramp-up, (e.g., reflection-coefficient ramp-up) may allow to reduce (e.g., minimize) potential interference to other WTRUs which may not support the backscattered signal interference cancellation, for example, in a case where the interrogation signal is a wideband signal bearing information to any of the other WTRUs. According to embodiments, candidate interrogator WTRUs may be capable of detecting (e.g., differentiating) the scanning sequence by cancelling out the interrogation signal.

Figure 17:
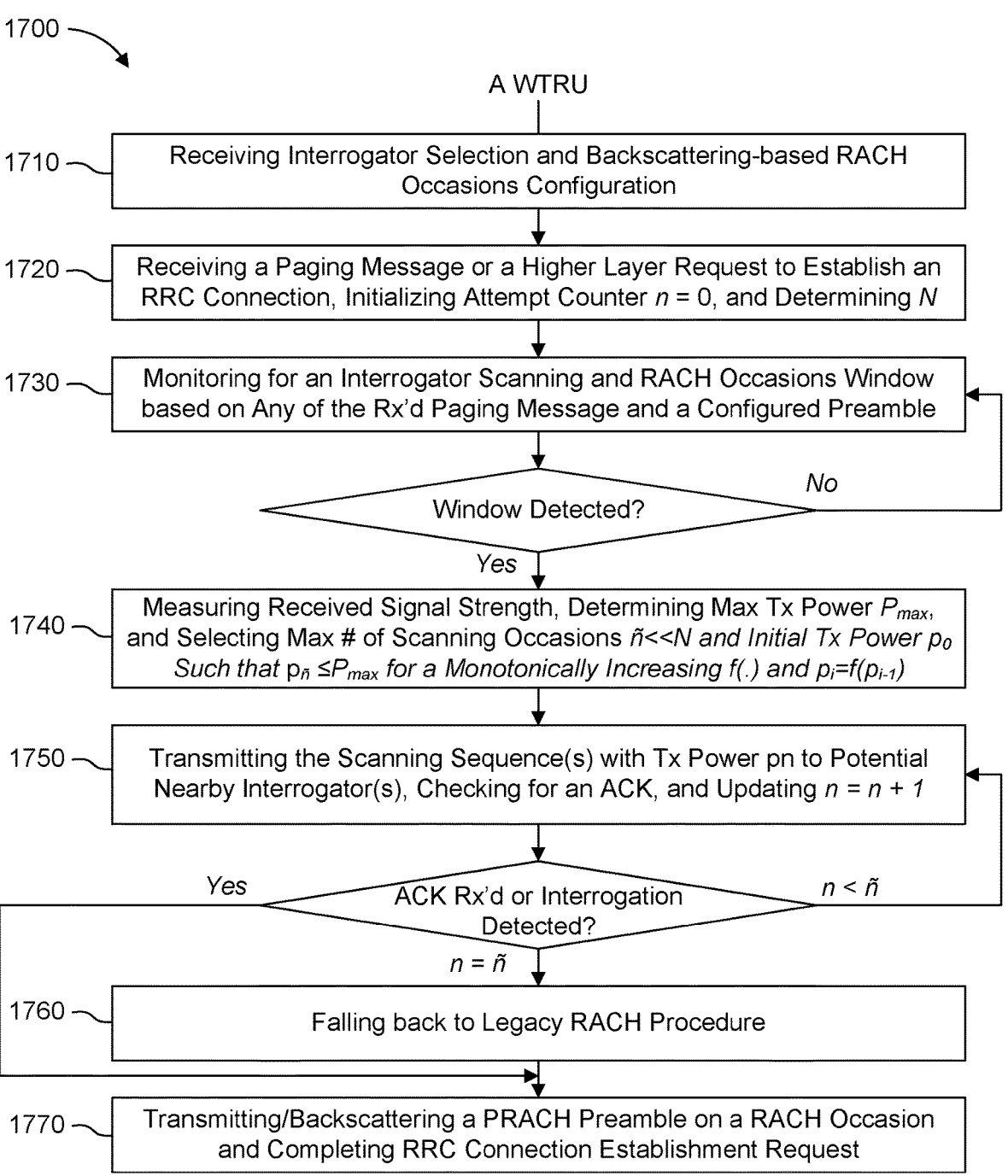
FIG. 17 is a diagram illustrating an example of a device-controlled interrogator selection method prior to RRC connection establishment request.

FIG. 17 is a diagram illustrating an example of a device-controlled interrogator selection method 1700 prior to RRC connection establishment request. In an embodiment, a WTRU may be a semi-passive WTRU.

For example, in a step 1710, the WTRU may receive (e.g., configuration) information indicating any of NW's support of device-controlled interrogator selection, interrogator scanning resource configuration, preamble (e.g., sequence) format, and allowed maximum power $P_{scan,max}$.

For example, in a step 1720, the WTRU may receive a paging message from the serving BS at time $t_0$.

For example, in a step 1730, the WTRU may monitor for an interrogator scanning and RACH occasions window based on any the received paging message and a configured preamble.

For example, in a step 1740, the WTRU may measure received signal strength $R_s$.

For example, in the step 1740, the WTRU may determine a number N of occasions that may be available for any of scanning and PRACH transmission based on any of a pre-configuration and a received paging message.

For example, in the step 1740, the WTRU may determine a (e.g., maximum) number of scanning occasion $\tilde{n}$, an initial transmission power $p_0$, and corresponding number of consecutive PRACH transmissions $M=N-\tilde{n}$ based on any of measured received signal strength and (e.g., current) battery level.

For example, in the step 1740, the WTRU may select any of an interrogator scanning sequence $s_i$ and a transmission power $p_i=f(p_{i-1})$ based on a monotonically increasing function $f(\bullet)$ of the power at occasion $i \in \{1, 2,3, \ldots, n\}$ such that e.g., $p_{\tilde{n}} \le P_{scan,max}$.

For example, in a step 1750, the WTRU may transmit the scanning sequence with the transmission power to nearby interrogator(s) and may monitor for an acknowledgement.

on condition that a nearby interrogator is detected at an occasion (e.g., n) before the determined a (e.g., maximum) number of scanning occasions (e.g., $n \le \tilde{n}$) by receiving any of an acknowledgment and an interrogation signal, the WTRU may perform, for example, in a step 1770, a backscattered based PRACH preamble(s) transmission for (e.g., M) consecutive times at following (e.g., subsequent) occasions j such that $j \in \{n+1, n+2, \ldots, n+M\}$, based on the interrogation signal.

Otherwise, for example, in a step 1760, the WTRU may fall back to the (legacy, standard) RACH method, e.g., the WTRU may perform a RACH transmission.

According to embodiments, in a case where the backscattering WTRU is close to the serving BS, the BS may respond to an interrogator scanning signal using a random-access response (RAR) message or may assist the WTRU in performing mono-static backscattering. For example, the semi-passive WTRU may assist (e.g., allow) to limit (e.g., reduce) the number of interrogating WTRUs, and to reduce overall power consumption, by e.g., performing a 3-hand-shake procedure. For example, the semi-passive WTRU may send a message indicating an interrogator selection complete and indicating (e.g., including) the selected interrogator identifier. For example, the interrogator identifier may be included in (indicated by) the received acknowledgment. In another example, the number of interrogating WTRUs may be limited (e.g., reduced) in a case where the (e.g., potential) interrogating WTRUs support full duplex (FD) transmission and reception, and (e.g., each of) the (e.g., potential) interrogating WTRU may decode the acknowledgments transmitted by the rest of the (e.g., potential) interrogating WTRUs to determine a scanning and signal strength identifiers. For example, the scanning identifier may be determined by a (e.g., potential) interrogator based on the received scanning sequences and the signal strength identifier may be determined based on any of the received signal strength of the scanning sequence and some mapping between signal strength values and (e.g., a set of) identifiers. For example, the mapping between received signal strengths and the (e.g., set of) identifiers may be any of signaled by the network (e.g., received from the network via any of signaling and configuration information) and predefined (e.g., pre-configured) at the interrogating WTRUs.

Examples of Mobility Support of (e.g., Semi) Passive WTRUs

Interrogators (re-)selection methods for supporting mobility of backscattering WTRUs, e.g., while they are in connected mode, are described herein.

In an embodiment, e.g., in a first step, a (e.g., semi) passive WTRU may report (e.g., transmit information indicating backscattering) capability and may receive monitoring configuration information indicating a monitoring configuration of the interrogation signal strength. For example, (e.g., in a second step) the WTRU may measure the received signal strength of the interrogation signal (e.g., concurrently) during backscattering transmissions based on the received monitoring configuration and reported capability. In another example, the WTRU may measure the received signal strength during measurement gaps (e.g., between backscattering transmissions) that may be determined based on the received monitoring configuration. For example, (e.g., in a third step) the WTRU may determine that a received signal strength may be below a (e.g., any of pre-configured and signaled) threshold which may be dependent on any of the WTRU's class (e.g., passive or semi-passive), and current battery state (e.g., level). For example, (e.g., in a fourth step) the WTRU may any of report (e.g., transmit a message including information indicating) measurements to the serving base station and request (e.g., transmit a message including information requesting) interrogator re-selection procedure initiation. For example, (e.g., in a fifth step) the WTRU may receive (e.g., information indicating) interrogator scanning and selection configuration (e.g., device-controlled procedure). In another example, the WTRU may receive (e.g., information indicating) new backscattering transmission configuration based on network's selection of a new interrogator (e.g., network-controlled procedure). For example, (e.g., in a sixth step) the WTRU may continue RRC connection operation with UL backscattering based on the newly received (e.g., determined) configuration.

In an embodiment, a base station serving a (e.g., semi) passive WTRU may perform interrogator (re-)selection in a WTRU-transparent method. For example, (e.g., in a first step) the serving base station may receive capability information indicating the WTRU's capability and may configure (e.g., transmit configuration information to) the WTRU and interrogating WTRUs. For example, (e.g., in a second step) the serving base station may monitor the received signal strength of the backscattered signal (e.g., concurrently) while decoding. In another example, the serving base station may measure the received backscattered signal strength during measurement gaps configured at any of the backscattering WTRU and interrogating WTRUs. For example, (e.g., in a third step) the serving base station may determine that a received backscattered signal strength may be below a (e.g., any of pre-configured and signaled) threshold which may be dependent on any of the WTRU's class, e.g., passive or semi-passive, and a configured transmission power that may be based on reported battery state (e.g., level). For example, (e.g., in a fourth step) the serving base station may initiate (e.g., perform) an interrogator re-selection method and may send received signal strength measurement configuration (e.g., information) to interrogating WTRUs within an area near the backscattering WTRU. For example, (e.g., in a fifth step) the serving base station may receive information indicating measurement reports from targeted interrogating WTRUs and may select one of them (e.g., satisfying a criterion). For example, (e.g., in a sixth step) the serving base station may (e.g., transmit configuration information to) configure the selected interrogating WTRU to support UL transmissions of the served WTRU, and may terminate the previous interrogating WTRU's support.

Examples of (e.g., Semi) Passive WTRU Timing Advance Configuration

Methods for timing advance (TA) configuration for (e.g., semi) passive WTRUs, are described herein. TA may be useful in the context of backscattering because the BS's receiver may be using the OFDM architecture and backscattering WTRUs may occupy (e.g., only) a portion of the whole system bandwidth. For example, configuring TA for UL transmissions synchronization for backscattering and non-backscattering WTRUs may allow to improve carrier orthogonality and to limit inter-carrier-interference (ICI) e.g., for semi-passive WTRUs which may not (e.g., only) reflect an incoming interrogation signal but may boost, e.g., effectively transmitting active power (e.g., even in absence of the interrogation signal). For example, the TA command may be used by the interrogators, in any of mono-static and bi-static, to adjust their interrogation signal transmission in support of the backscattering WTRUs.

In an embodiment, a (e.g., semi) passive WTRU may select bi-static backscattering (e.g., operation) and may utilize corresponding bi-static RACH resources to transmit a PRACH preamble and receive a (e.g., differential) timing advance command. For example, the WTRU may receive e.g., in a first step, (e.g., configuration) information e.g., through any of RRC signaling, NAS signaling and system information. For example, the (e.g., configuration) information may indicate any of the following parameters (e.g., configuration):

- network's (NW) support of any of mono-static and bi-static backscattering RACH transmission,
- interrogator-based synchronization configuration, including e.g., any of reference signal format(s) and search space(s),
- PRACH preamble and occasion configuration, including e.g., mapping from interrogator's reference signal's configuration.

For example, (e.g., in a second step) the WTRU may monitor the reference signal(s) search space(s) for synchronization based on the interrogator-based synchronization configuration. For example, (e.g., in a third step) the WTRU may detect an interrogator-based reference signal and may determine bi-static backscattering support based on the detected reference signal configuration. For example, (e.g., in a fourth step) the WTRU may receive any of a paging message and a higher layer request to establish an RRC connection. For example, (e.g., in a fifth step) the WTRU may determine any of a PRACH preamble, a RACH occasion, and interrogation signal configuration based on any of the detected synchronization reference signal and the determined bi-static backscattering support. For example, (e.g., in a sixth step) the WTRU may utilize the determined configuration to backscatter the selected PRACH preamble at the determined RACH occasion. For example, (e.g., in a seventh step) the WTRU may receive a RACH response message from the serving base station comprising contention resolution and a (e.g., differential) timing advance command. For example, (e.g., in an eighth step) the WTRU may utilize the (e.g., differential) TA command to adjust the timing of subsequent UL backscattering transmissions.

For example, a (e.g., differential) TA command may indicate a timing advance to be used by the backscattering WTRU for timing adjustment, prior to (e.g., for subsequent) uplink transmissions, with respect to the synchronization that may have been performed by the backscattering WTRU with the interrogator based on a received (e.g., bi-static) interrogation signal. The (e.g., differential) TA command may be any of an indication (e.g., information element) that may be included in a random-access response (RAR), and a specific message (e.g., command). A TA command indicating a time difference with respect to a full TA of an interrogating WTRU (e.g., a timing advance to be used for timing adjustment, prior to uplink transmissions, with respect to the synchronization performed with an interrogating WTRU) may be referred to herein as a differential TA (e.g., command).

For example, the differential TA may allow to reduce the size of the RAR message that may be transmitted using signal characteristics that may be specific for an ultra-low power receiver, e.g., over a ZE air interface. This may allow to reduce any of the resource utilization and energy consumption of ultra-low power WTRUs.

In an embodiment, a (e.g., semi) passive WTRU may select mono-static backscattering and may utilize corresponding mono-static RACH resources to transmit a PRACH preamble and receive (e.g., full) timing advance command. For example, (e.g., in a first step) the WTRU may receive (e.g., configuration) information e.g., through any of RRC signaling, NAS signaling and system information, the (e.g., configuration) information indicating any of NW's support of backscattering RACH transmission, interrogator-based synchronization configuration, and PRACH preamble and occasion configuration. For example, (e.g., in a second step) the WTRU may monitor the reference signal(s) search space(s) based on any of a default and the signaled (e.g., received) interrogator-based synchronization configuration, where the reference signal(s) (e.g., indicated in the interrogator-based synchronization configuration) may be used for synchronization and signal strength measurements. For example, (e.g., in a third step) the WTRU may detect an interrogator-based reference signal and may determine mono-static backscattering support based on the detected reference signal configuration. For example, (e.g., in a fourth step) the WTRU may receive any of a paging message and a higher layer request to establish an RRC connection. For example, (e.g., in a fifth step) the WTRU may determine any of a PRACH preamble, a RACH occasion, and an interrogation signal configuration based on any of the detected synchronization reference signal and the determined mono-static backscattering support. For example, (e.g., in a sixth step) the WTRU may utilize the determined configuration to backscatter the selected PRACH preamble at the determined RACH occasion. For example, (e.g., in a seventh step) the WTRU may receive a RACH response message from the serving base station comprising contention resolution and a full timing advance command. For example, (e.g., in an eighth step) the WTRU may utilize the full TA command to adjust timing of subsequent UL backscattering transmissions.

For example, in the two previously described embodiments, the WTRU may receive (e.g., configuration) information indicating any number of (e.g., one or more) reference signal configurations, such as e.g., any of orthogonal sequences and orthogonal frequency resources, and where a reference signal (e.g., configuration) may be associated with any of mono-static support and bi-static support. For example, the WTRU may (e.g., try to) blindly detect reference signals of any of the received reference signal configurations. For example, in a case where a reference signal is detected with a received signal strength above a (e.g., any of preconfigured and signaled) threshold, and in a case where the detected reference signal is associated with respectively mono-static or bi-static operation, the WTRU may determine (e.g., select) respectively mono-static or bi-static mode of operation. For example, after any of mono-static and bi-static backscattering mode of operation may have been determined, the WTRU may determine any of the corresponding RACH configuration, (e.g., RACH occasions/resources (e.g., time and frequency)) and the set of preambles (e.g., sequences) that may be used.

For example, the interrogation signal configuration may include information indicating any of the following elements:

supported interrogator signal preamble(s), their transmission characteristics, and mappings to any specific backscattering-PRACH-occasions configurations, interrogator signal strength (measured via interrogator signal preamble) thresholds that may determine configured backscattering signal strength categories, PRACH occasion configurations and mapping to signal strength categories, In embodiments described herein the following terminologies may be used interchangeably: reference signal(s), interrogator-based reference signal(s), and synchronization reference signal(s).

Figure 18:
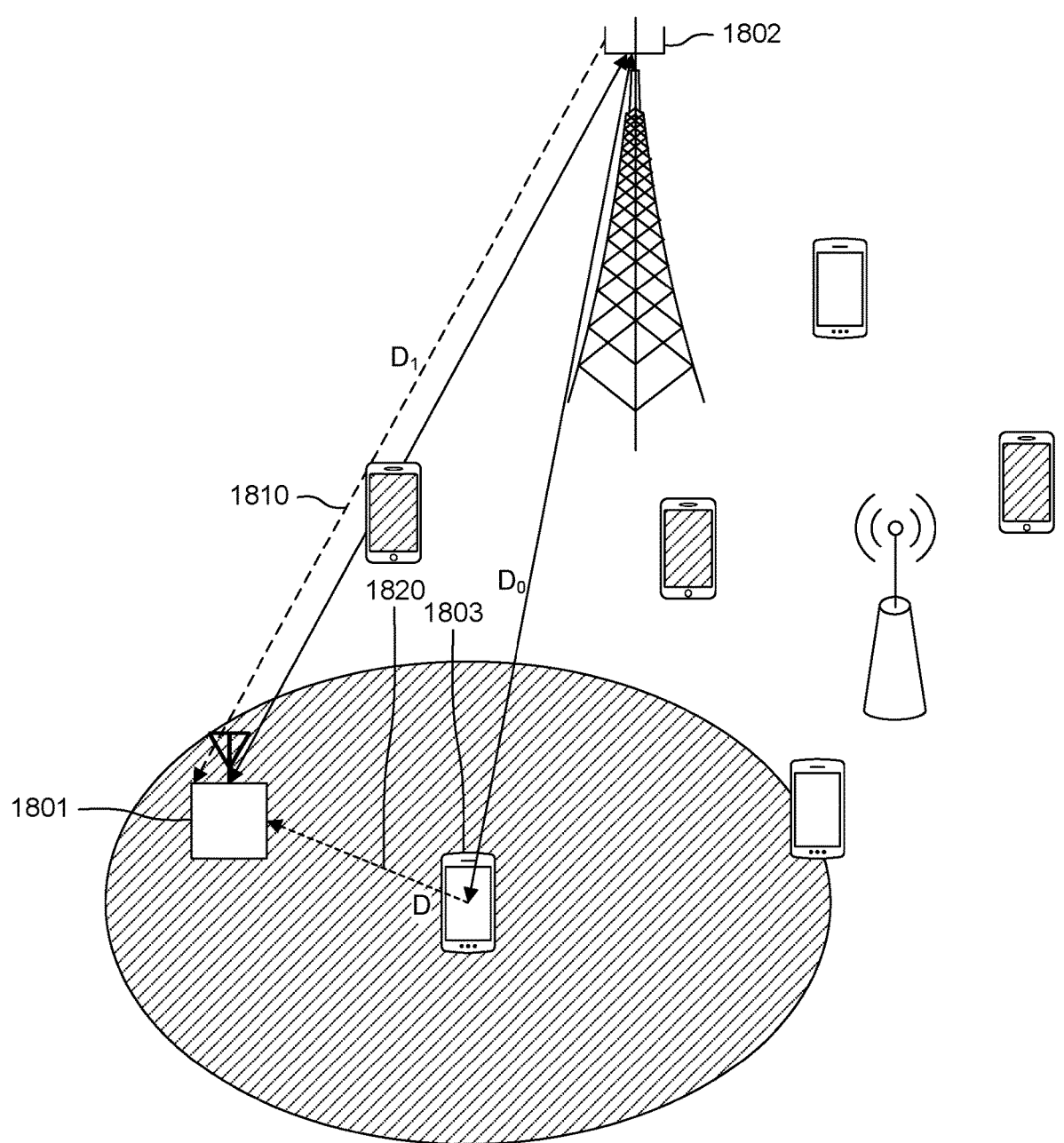
FIG. 18 is a diagram illustrating an example of two methods for TA determination in backscattering systems.

FIG. 18 is a diagram illustrating an example of two methods for TA determination in backscattering systems. For example, two different TA values may be signaled (e.g., transmitted) by the network to a backscattering WTRU based on whether a DL 1810 or an UL 1820 reference signal is used for synchronization of the WTRU. In embodiments described herein, the terms "TA command" and "TA value" may be used interchangeably. For example, the selection of a DL 1810 vs UL 1820 reference signal may be based on whether mono-static or bi-static backscattering operation may be performed by the WTRU 1801. The distance between the backscattering WTRU 1801 and the base station 1802 may be referred to herein as $D_1$. The distance between a (e.g., potential) interrogating WTRU 1803 in a bi-static configuration and the base station 1802 may be referred to herein as $D_0$. The distance between the (e.g., potential) interrogating WTRU 1803 and the backscattering WTRU 1801 may be referred to herein as D. For example, the (e.g., potential) interrogating WTRU 1803 may be UL synchronized. For example, the backscattering WTRU 1801 operating in a bi-static backscattering operation mode may receive a (e.g., differential) timing advance value determined as $T_{diff}=(D_1+D-D_0)/c$ where c may represent the speed of light. In another example, a full timing advance value of $T_{full}=2D_1/c$ may be used for a backscattering WTRU operating in a mono-static backscattering mode of operation.

Figure 19:
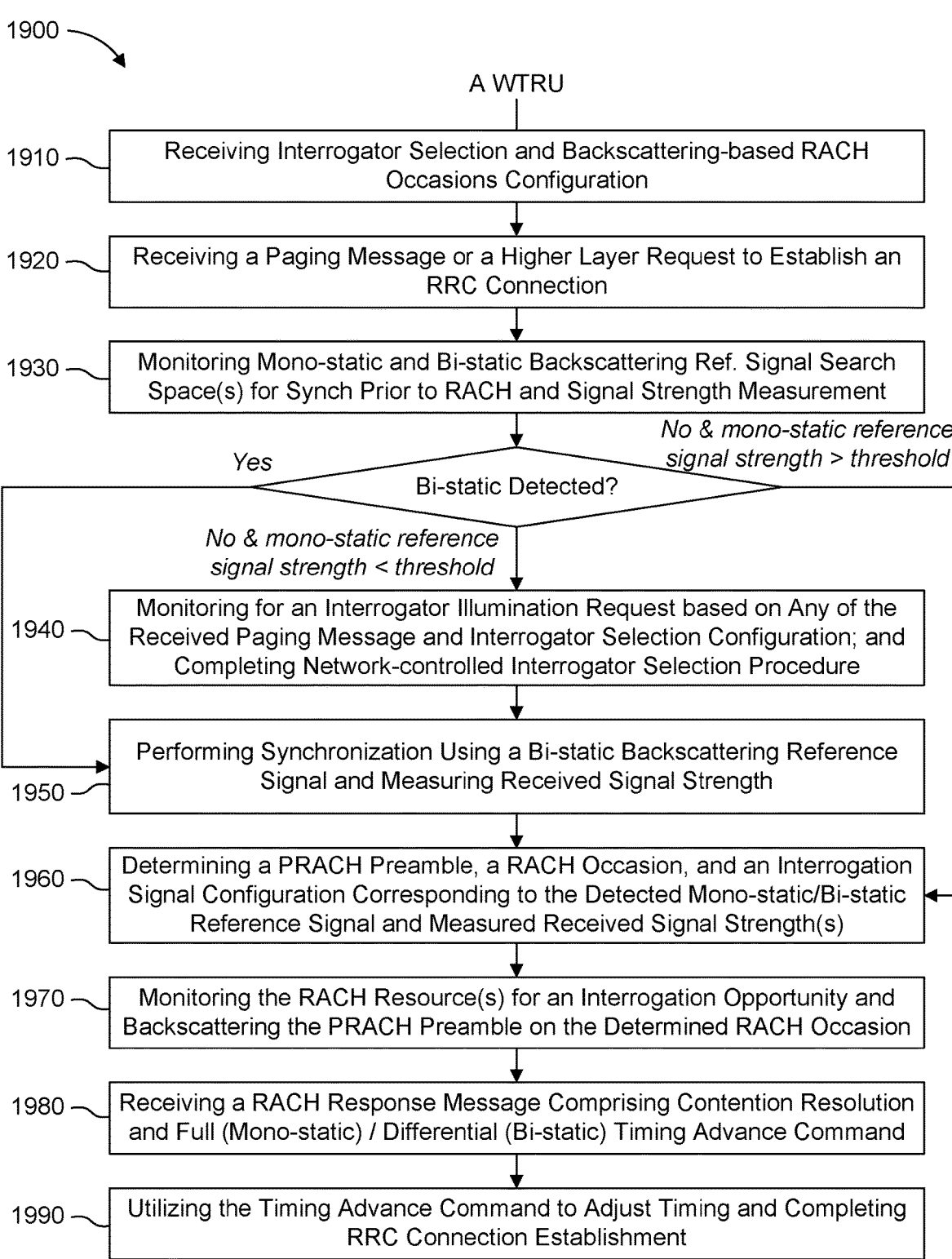
FIG. 19 is a diagram illustrating an example of a method for selecting a backscattering operation mode and a timing advance configuration during RRC connection establishment.

FIG. 19 is a diagram illustrating an example of a method 1900 for selecting a backscattering operation mode and a timing advance configuration during RRC connection establishment.

In an embodiment, the WTRU may be a (e.g., semi) passive WTRU.

For example, (e.g., in a step 1910) the WTRU may receive (e.g., configuration) information, e.g., through system information, the (e.g., configuration) information indicating any of the following parameters (e.g., configuration):

network's (NW) support of any of mono-static backscat-
tering RACH transmission, bi-static backscattering
RACH transmission and network-controlled interroga-
tor selection,
monitoring configuration of interrogator illumination
request messages, e.g., indicating any of a monitoring
periodicity, modulation and coding scheme, preamble
(e.g., sequence) indicative of the request, frequency
resource configuration,
default configuration for interrogator's illumination, e.g.,
indicating any of a set of available illumination pre-
ambles (e.g., sequences), time offset (e.g., with respect
to the received request), available time instances and
frequency resources for illumination, maximum trans-
mit power, and mapping between received signal
strength and the scheduling configuration,
interrogator-based synchronization configuration, e.g.,
indicating any of reference signal format(s) and search
space(s),
PRACH preamble and RACH occasion configuration,
e.g., mapping from interrogator's reference signal's
configuration.

For example, (e.g., in a step 1920) the WTRU may receive
any of a paging message and a higher layer request to
establish an RRC connection.

For example, (e.g., in a step 1930) the WTRU may
monitor the reference signal(s) search space(s) for synchro-
nization and signal strength measurement based on the
interrogator-based synchronization configuration. For
example, the WTRU may determine that a received mono-
static reference signal strength may be below a (e.g., any of
(pre)configured and signaled) threshold and may determine
absence of a bi-static reference signal (e.g., may determine
that a received bi-static reference signal strength may be
below a (e.g., any of (pre) configured and signaled) thresh-
old).

For example, (e.g., in a step 1940) the WTRU may
perform (e.g., initiate and complete) a network-controlled
interrogator selection by monitoring for any of an interro-
gator illumination request and by any of actively transmit-
ting and backscattering illumination signals e.g., for inter-
rogator selection. For example, the received mono-static
reference signal strength may be used to determine any
parameter of any of the active transmission and the backs-
cattering of the illumination signal (such as, e.g., the illu-
mination sequence determination, the transmission power
determination, etc . . . ).

For example, (e.g., in a step 1950) the WTRU may utilize
a bi-static reference (e.g., interrogation) signal for synchro-
nization and signal strength measurement.

For example, (e.g., in a step 1960) the WTRU may
determine any of a PRACH preamble, a RACH occasion,
and interrogation signal configuration corresponding to the
determined backscattering mode (bi-static backscattering)
based on any of the detected reference signal, the measured
received signal strength(s), and the received configuration.
For example, any of the (e.g., measured) received signal
strength(s) (such as any of the mono-static and bi-static
reference signals) may be used for the determination of any
of the PRACH preamble, the RACH occasion, and the
interrogation signal configuration.

For example, (e.g., in a step 1970) the WTRU may
monitor RACH resource(s) for an interrogation opportunity
and may utilize the determined configuration to backscatter
the selected PRACH preamble at the determined RACH
occasion.

For example, (e.g., in a step 1980) the WTRU may receive
a RACH response message from the serving base station
comprising contention resolution and a (e.g., differential)
timing advance command that may indicate a timing
advance to be used for uplink transmissions with respect to
the synchronization that may have been performed with the
interrogating WTRU based on the interrogation signal.

For example, (e.g., in a step 1990) the WTRU may utilize
the (e.g., differential) TA command to adjust timing of
subsequent UL backscattering transmissions and may com-
plete the RRC connection establishment.

In another example, the WTRU may determine that a
received mono-static reference signal strength may be above
a (e.g., any of (pre)configured and signaled) threshold. In a
following step (e.g., in the step 1960), the WTRU may
determine any of a PRACH preamble, a RACH occasion,
and interrogation signal configuration corresponding to the
determined backscattering mode (mono-static backscatter-
ing). For example, (e.g., in the step 1970) the WTRU may
monitor RACH resource(s) for an interrogation opportunity
and may utilize the determined configuration to backscatter
the selected PRACH preamble at the determined RACH
occasion. For example, (e.g., in the step 1980) the WTRU
may receive a RACH response message from the serving
base station comprising contention resolution and a (e.g.,
full) timing advance command that may indicate a timing
advance to be used for uplink transmissions with respect to
the synchronization that may have been performed with the
serving base station. For example, (e.g., in the step 1990) the
WTRU may utilize the full TA command to adjust timing of
subsequent UL backscattering transmissions and may com-
plete the RRC connection establishment.

In another example, the WTRU may determine that a
received bi-static reference signal strength may be above a
(e.g., any of (pre)configured and signaled) threshold and
may utilize it to perform synchronization with the interro-
gating WTRU e.g., in the step 1950. For example, (e.g., in
the step 1960) the WTRU may determine any of a PRACH
preamble, a RACH occasion, and interrogation signal con-
figuration corresponding to the determined backscattering
mode (bi-static backscattering). For example, (e.g., in the
step 1970) the WTRU may monitor RACH resource(s) for
an interrogation opportunity and may utilize the determined
configuration to backscatter the selected PRACH preamble
at the determined RACH occasion. For example, (e.g., in the
step 1980) the WTRU may receive a RACH response
message from the serving base station comprising conten-
tion resolution and a (e.g., differential) timing advance
command that may indicate a timing advance to be used for
uplink transmissions with respect to the synchronization that
may have been performed with the interrogating WTRU
based on the interrogation signal. For example, (e.g., in the
step 1980) the WTRU may utilize the (e.g., differential) TA
command to adjust timing of subsequent UL backscattering
transmissions and may complete the RRC connection estab-
lishment.

For example, the absence of the bi-static reference signal
may be determined by the WTRU by monitoring the channel
for a (e.g., any of (pre)configured and signaled) time win-
dow, where any of the mono-static and the bi-static reference
signal(s) may be transmitted any of periodically with any of
different offsets and different periodicities and at least once
at any time within the time window.

It is to be noted that, the steps of the method illustrated at
FIG. 19 may occur in a different order. For example, a
device-controlled interrogator selection method may be per-
formed as an alternative to the network-controlled interrogator selection procedure in the step 1940. For example, the step 1940 may be repeated in a case where the WTRU fails to detect a bi-static backscattering reference signal in the step 1950.

For example, the interrogator-based synchronization configuration and PRACH preamble and occasion configuration may be backscattering mode (e.g., mono-static or bi-static) specific. For example, the monitoring configuration for illumination request messages and the default configuration for interrogator's illumination may applicable (e.g., only) to bi-static backscattering. For example, the WTRU may use the bi-static reference signal for synchronization such that the WTRU may be partially synchronized with the network. The WTRU may then be (e.g., fully) synchronized by receiving from the network a differential timing advance command with respect to the interrogating WTRU's full timing advance.

Embodiments described herein may allow a backscattering WTRU to operate according to any of the three following examples:

1) in a case where the backscattering WTRU detects a mono-static reference signal and measures its received strength above a threshold, the backscattering WTRU may use mono-static backscattering to transmit (e.g., backscatter) a PRACH preamble and may receive a full timing advance command.

2) in a case where the backscattering WTRU detects a bi-static reference signal and measures its received strength above a threshold, the backscattering WTRU may use bi-static backscattering to transmit (e.g., backscatter) a PRACH preamble and may receive a differential timing advance command.

3) in a case where the WTRU detects any of a mono-static and a bi-static reference signal(s) and measures that the received signal strength(s) is below a threshold, the WTRU may not then use any of the mono-static and bi-static backscattering and may perform (e.g., initiate) an interrogator selection method before it may transmit (e.g., backscatter) a PRACH preamble and may receive a (e.g., differential) timing advance command.

In an embodiment, a WTRU may be a (e.g., semi) passive WTRU.

For example, the WTRU may receive (e.g., configuration) information indicating any of NW's support of any of mono-static and bi-static backscattering RACH transmission, interrogator-based synchronization configuration, and PRACH preamble and occasion configuration.

For example, the WTRU may monitor the reference signal(s) search space(s) and may detect an interrogator-based reference signal for synchronization.

For example, the WTRU may determine any of bi-static backscattering support corresponding PRACH preamble, RACH occasion, and interrogation signal configuration based on any of the detected reference signal and received configuration (e.g., information).

For example, the WTRU may receive any of a paging message and a higher layer request to establish an RRC connection.

For example, the WTRU may utilize the determined configuration to backscatter the selected PRACH preamble at the determined RACH occasion.

For example, the WTRU may receive a RACH response message from the serving base station comprising contention resolution and (e.g., indicating) a differential timing advance command.

For example, the WTRU may utilize the differential TA command to adjust timing of subsequent UL backscattering transmissions.

In another embodiment, a WTRU may be a (e.g., semi) passive WTRU.

For example, the WTRU may receive (e.g., configuration) information indicating any of NW's support of any of mono-static and bi-static backscattering RACH transmission, support of network -controlled interrogator selection, interrogator-based synchronization configuration, monitoring configuration of interrogator illumination requests, default configuration of interrogator illumination signals, and PRACH preamble and occasion configuration.

For example, the WTRU may monitor the reference signal(s) search space(s) and may detect a mono-static backscattering reference signal of a received signal strength below a (e.g., configured) threshold.

For example, the WTRU may determine failure of mono-static backscattering and absence of bi-static backscattering reference signals.

For example, the WTRU may perform a network-controlled interrogator selection including any of monitoring of interrogator illumination requests and transmission (e.g., backscattering) of illumination preamble(s) (e.g., sequence(s)).

For example, the WTRU may receive a bi-static backscattering reference signal for synchronization and may determine any of corresponding PRACH preamble, RACH occasion, and interrogation signal configuration based on any of the detected reference signal and received configuration (e.g., information).

For example, the WTRU may receive any of a paging message and a higher layer request to establish an RRC connection.

For example, the WTRU may utilize the determined configuration to backscatter the selected PRACH preamble at the determined RACH occasion.

For example, the WTRU may receive a RACH response message from the serving base station comprising contention resolution and (e.g., indicating) a differential timing advance command.

For example, the WTRU may utilize the differential TA command to adjust timing of subsequent UL backscattering transmissions.

In an embodiment, a WTRU may use interrogator-specific reference signal to differentiate between mono-static and bi-static interrogation availability. For example, the WTRU may select any of a corresponding PRACH preamble and RACH occasion(s). For example, the WTRU may receive a corresponding full or differential timing advance command depending on whether the WTRU may be synchronized with the serving base station or with the interrogating WTRU.

FIG. 11 is a diagram illustrating an example of a method for transmitting a backscattered signal. According to embodiments, in a step 1110, a WTRU may receive an interrogation signal from an interrogating network element. According to embodiments, in a step 1120, the WTRU may determine a PRACH occasion configuration based on any of a WTRU class (e.g., type), a WTRU backscattering capability, a WTRU battery level, a received signal strength of the interrogation signal, (e.g., configured) signal strength thresholds, and a first mapping between PRACH occasion configurations and signal strength categories. According to embodiments, in a step 1130, the WTRU may transmit at least a PRACH preamble as a (e.g., modulated, reflected) backscattered signal of the interrogation signal based on the determined PRACH occasion configuration.

For example, the WTRU may receive any of the (e.g., configured) signal strength thresholds, and the first mapping through system information.

For example, a WTRU class may indicate any of a passive (e.g., type of) WTRU and a semi-passive (e.g., type of) WTRU. For example, a WTRU class may include information indicating (e.g., different) capabilities) of the WTRU. An example of capability may include any of reflection and efficiency coefficient(s) of the (e.g., backscattering) WTRU. Another example of capability may include (e.g., configuration) information indicating a subscription plan of the WTRU. Any other example of capability information that may be included in a capability (e.g., WTRU class) may be applicable to embodiments described herein.

For example, the WTRU may detect (e.g., receive) a preamble (e.g., a signal) that may indicate a beginning of a grant free (GF) access opportunity.

For example, the WTRU may determine a signal strength category based on any of the WTRU class, the backscattering capability, the battery level, the received signal strength of the interrogation signal and the (e.g., configured) signal strength thresholds.

For example, the WTRU may determine any of a first and a second number of repetitions of a (e.g., backscattered) GF (e.g., signal) transmission based on the determined signal strength category and on a second mapping between signal strength categories and any of a first and a second number of repetitions. For example, the backscattered (e.g., transmitted) signal may include any of a preamble, and (e.g., additional) information (such as e.g., any of an identifier of the WTRU, and other (e.g., higher layer) information).

For example, the WTRU may repeat the backscattered (e.g., signal) transmission for at least the first number of repetitions.

For example, the WTRU may terminate the repeated backscattered transmission after the first number of repetitions on a condition that an absence of the interrogation signal is detected in the GF access opportunity. For example, the repeated backscattered transmission may be considered as successful.

For example, the WTRU may detect the interrogation signal and may perform (e.g., any of time and frequency) synchronization with the network based on an interrogation signal preamble configuration.

For example, the WTRU may receive an indication of a presence indication opportunity.

For example, the WTRU may determine a presence indication opportunity configuration based on the interrogation signal preamble.

For example, the WTRU may transmit a backscattered presence indication signal based on the determined presence indication opportunity configuration e.g., to enable backscattering based PRACH occasions.

For example, the interrogating network element may be any of a base station and another WTRU.

FIG. 20 is a diagram illustrating an example of a method 2000 for transmitting a PRACH preamble as a bi-static backscattered signal and receiving a (e.g., differential) timing advance command.

For example, in a step 2010, a WTRU may receive an interrogation signal from an interrogating WTRU. For example, the interrogation signal may comprise a preamble that may be associated with a bi-static backscattering operation. For example, in a step 2020, the WTRU may determine that a received signal strength of the interrogation signal may be above a first threshold. For example, in a step 2030, the WTRU may perform synchronization with the interrogating WTRU based on the interrogation signal. For example, in a step 2040, the WTRU may determine a (e.g., at least one) RACH occasion based on any of a received signal strength of the interrogation signal, configured signal strength thresholds, and a mapping between RACH occasions (e.g., configurations) and signal strength categories. For example, in a step 2050, the WTRU may backscatter at least one PRACH preamble on the determined RACH occasion based on the interrogation signal. For example, in a step 2060, the WTRU may receive a RAR message including timing advance information indicating a (e.g., differential) timing advance to be used for timing adjustment, prior to uplink transmissions, with respect to the synchronization with the interrogating WTRU.

For example, the WTRU may receive a first interrogation signal from a first interrogating network element prior to receiving the interrogation signal from the interrogating WTRU. For example, the first interrogation signal may be received with a first received signal strength below a second threshold. For example, the WTRU may monitor for a message indicating an interrogator illumination request for selecting a new interrogating network element.

For example, the first interrogating network element may be any of a serving base station and a first interrogating WTRU.

For example, the first interrogating network element may be a first interrogating WTRU, and the second threshold may be the same as the first threshold.

For example, the WTRU may select an illumination preamble based on any of an interrogator illumination request received signal strength, a WTRU class, a WTRU battery level and configuration information.

For example, the configuration information may indicate any of: (1) a support of any of: (i) bi-static backscattering RACH transmission, (ii) mono-static backscattering RACH transmission, (iii) device-controlled interrogator selection and (iv) network-controlled interrogator selection, (2) a monitoring configuration of interrogator illumination request messages, and (3) a default configuration for interrogator illumination.

For example, the WTRU may any of backscatter and transmit the selected illumination preamble to nearby interrogating network elements.

For example, any of the configuration information, the configured signal strength thresholds and the mapping between the RACH occasion configurations and the signal strength categories may be received through system information.

For example, the message may be a paging message.

For example, the paging message may comprise an update of the configuration information.

For example, the determination of the RACH occasion may be further based on any of a WTRU class, a WTRU backscattering capability, and a WTRU battery level.

For example, the WTRU class may indicate any of a passive WTRU and a semi-passive WTRU.

FIG. 21 is a diagram illustrating an example of a network-controlled method 2100 for selecting an interrogating WTRU. For example, the method 2100 may be implemented in a WTRU. In a step 2110, a first (e.g., mono-static) reference signal may be received. In a step 2120, it may be determined that a first signal strength of the received first (e.g., mono-static) reference signal may fail to satisfy a strength condition, and responsively: (i) in a step 2130, the WTRU may receive a transmission, (ii) in a step 2140, the WTRU may determine a sequence and an occasion based on the received transmission, (iii) in a step 2150, the WTRU may transmit using the determined sequence on the determined occasion, and (iv) in a step 2160, the WTRU may receive a second (e.g., bi-static) reference signal from an interrogating WTRU.

For example, transmitting using the determined sequence on the determined occasion may be any of backscattered based and non-backscattered based.

For example, the received first reference signal may fail to satisfy the strength condition on a condition that the received first reference signal is below a threshold.

For example, the WTRU may receive configuration information indicating any of: (1) a set of sequences, (2) a time offset with regards to a received interrogator selection request, (3) time and frequency resources for transmitting at least one sequence of the set of sequences, (4) a maximum transmit power, and (5) associations between received signal strength information and any of (i) subsets of the indicated set of sequences and (ii) subsets of the indicated time and frequency resources.

For example, the received transmission may comprise first information indicating an update of the configuration information.

For example, the received transmission may comprise a paging message.

For example, the received transmission may comprise second information indicating an interrogator selection request.

For example, determining the sequence and the occasion may be further according to the configuration information.

For example, the WTRU may determine a second signal strength of the received transmission, wherein the determination of the sequence and the occasion may be further according to any of the first signal strength and the determined second signal strength.

For example, the WTRU may determine a transmission power according to any of a WTRU battery level, the first signal strength, the determined second signal strength and the configuration information, wherein the determined sequence may be backscattered at the determined transmission power.

For example, the WTRU may synchronize with the interrogating WTRU based on the received second reference signal.

For example, the WTRU may select a random-access preamble and a random-access occasion from a set of random-access preambles and random-access occasions, based on any of the first signal strength and a third signal strength of the received second reference signal. For example, the random-access preambles and the random-access occasions may be respectively physical random-access channel (PRACH) preambles and random-access channel (RACH) occasions. Embodiments described herein may be compatible with any type of random-access preambles and occasions.

For example, the set of (e.g., PRACH) preambles and (e.g., RACH) occasions may be associated with a backscattering operation that may comprise backscattering a signal to a first network element based on an interrogation signal received from a second network element different from the first network element.

For example, the WTRU may backscatter the selected (e.g., PRACH) preamble on the selected (e.g., RACH) occasion based on the received second reference signal.

For example, the WTRU may receive a random-access response (RAR) including timing advance information indicating a differential timing advance to be used for timing adjustment with respect to the synchronization with the interrogating WTRU for subsequent uplink transmissions.

For example, the received configuration information may further indicate any of: (1) a support of any of: (i) backscattering RACH transmission and (ii) network-controlled interrogator selection, and (2) a monitoring configuration for monitoring the transmission.

For example, the received configuration information may be received through system information.

For example, the selection of the (e.g., PRACH) preamble and the (e.g., RACH) occasion may be further based on any of a WTRU class, a WTRU backscattering capability, and the WTRU battery level.

For example, the WTRU class may indicate any of a passive WTRU and a semi-passive WTRU.

FIG. 22 is a diagram illustrating an example of a device-controlled method 2200 for selecting an interrogating WTRU. For example, the method 2200 may be implemented in a WTRU. In a step 2210, a first (e.g., mono-static) reference signal may be received. In a step 2220, it may be determined that a first signal strength of the received first (e.g., mono-static) reference signal may fail to satisfy a strength condition, and responsively: (i) in a step 2230, the WTRU may receive a transmission indicating a set of scanning occasions for interrogator scanning, (ii) in a step 2240, the WTRU may determine one or more scanning sequences and a subset of the indicated set of scanning occasions based on the received transmission, (iii) in a step 2250, the WTRU may transmit using the determined one or more scanning sequences on the determined subset of the indicated set of scanning occasions, and (iv) in a step 2260, the WTRU may receive a second (e.g., bi-static) reference signal from an interrogating WTRU.

For example, the received first reference signal may satisfy the strength condition on a condition that the received first reference signal is below a threshold.

For example, the transmission may be received as part of an opportunity initialization preamble.

For example, the transmission may be received via system information.

For example, the WTRU may receive configuration information indicating any of: (1) a set of scanning sequences, (2) an allowed maximum transmit power and (5) associations between received signal strength information and any of: (i) subsets of the indicated set of scanning sequences and (ii) subsets of the indicated scanning occasions.

For example, the determination of the one or more scanning sequences and the subset of the indicated set of scanning occasions may be further according to the configuration information.

For example, the WTRU may determine a second signal strength of the received transmission, wherein the determination of the one or more scanning sequences and the subset of the indicated set of scanning occasions may be further according to any of the first signal strength and the determined second signal strength.

For example, the WTRU may determine an initial transmission power according to any of a WTRU battery level, the first signal strength, the determined second signal strength, a size of the determined subset of the indicated set of scanning occasions, and the configuration information (such as e.g., the maximum transmission power), wherein a first scanning sequence of the one or more scanning sequences may be transmitted at the determined initial transmission power.

For example, the determined one or more scanning sequences may be sequentially transmitted in the determined subset of the indicated set of scanning occasions with a transmission power monotonically increasing for (e.g., each) scanning occasion of the determined subset of the indicated set of scanning occasions, starting from the initial transmission power for the first scanning sequence.

For example, the one or more scanning sequences may be sequentially transmitted in the subset of the indicated set of scanning occasions up to a reception of an acknowledgment message.

For example, the WTRU may synchronize with the interrogating WTRU based on the received second reference signal.

For example, the WTRU may select a random-access preamble and a random-access occasion from a set of random-access preambles and random-access occasions, based on any of the first signal strength and a third signal strength of the received second reference signal. For example, the random-access preambles and the random-access occasions are respectively physical random-access channel (PRACH) preambles and random-access channel (RACH) occasions. Embodiments described herein may be compatible with any type of random-access preambles and occasions.

For example, the set of (e.g., PRACH) preambles and (e.g., RACH) occasions may be associated with a backscattering operation that may comprise backscattering a signal to a first network element based on an interrogation signal received from a second network element different from the first network element.

For example, the WTRU may backscatter the selected (e.g., PRACH) preamble on the selected (e.g., RACH) occasion.

For example, the WTRU may receive a random-access response (RAR) message including timing advance information indicating a differential timing advance to be used for timing adjustment with respect to the synchronization with the interrogating WTRU for subsequent uplink transmissions.

For example, the configuration information may further indicate a support of any of backscattering RACH transmission and device-controlled interrogator selection.

For example, the selection of the (e.g., PRACH) preamble and the (e.g., RACH) occasion may be further based on any of a WTRU class, a WTRU backscattering capability, and the WTRU battery level.

For example, the WTRU class may indicate any of a passive WTRU and a semi-passive WTRU.

Figure 23:
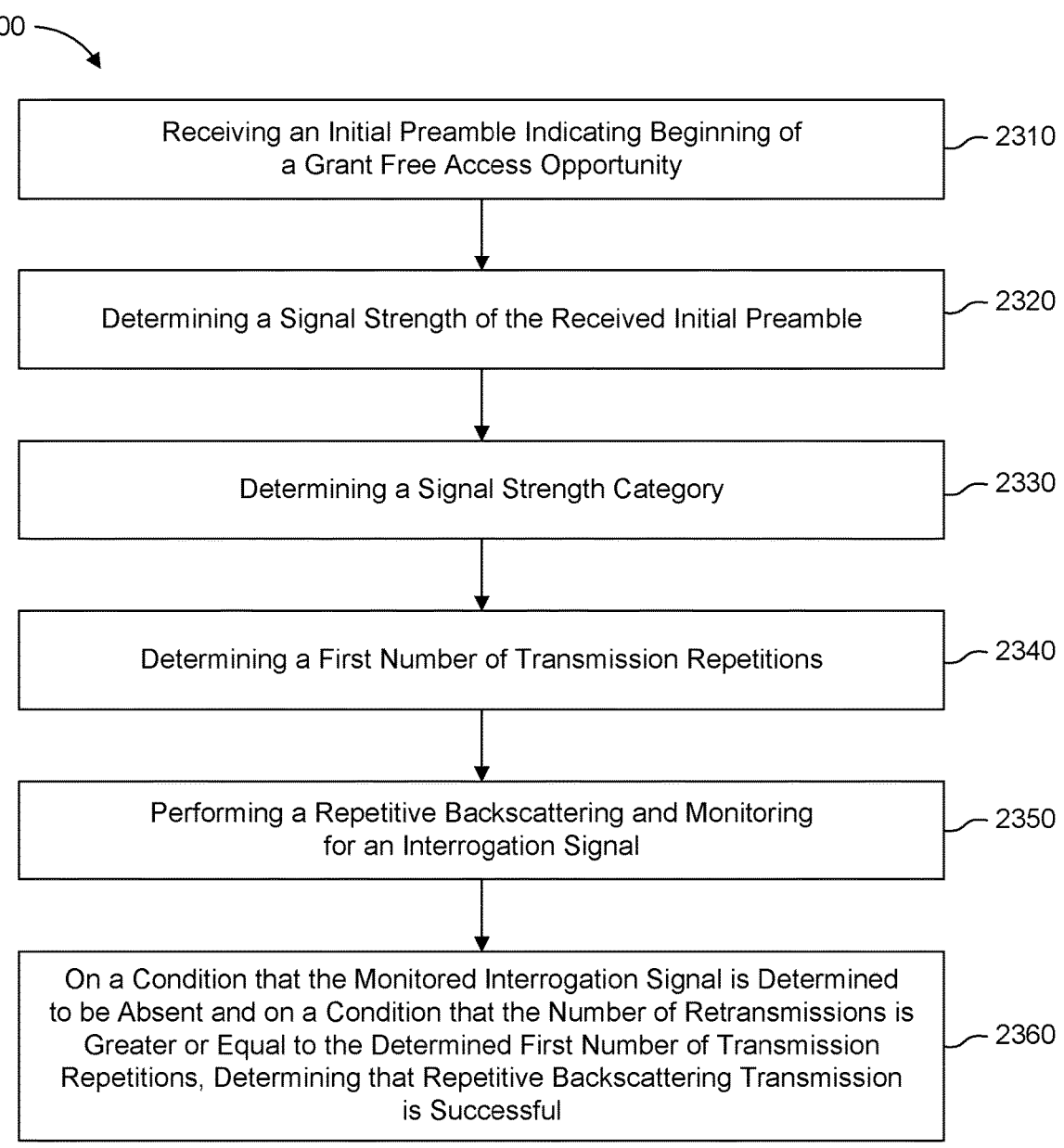
FIG. 23 is a diagram illustrating an example of a method for a grant free backscattering tranmission.

FIG. 23 is a diagram illustrating an example of a method 2300 for a grant free backscattering transmission. For example, the method 2300 may be implemented in a WTRU. For example, in a step 2310, an initial preamble may be received. The initial preamble may indicate beginning of a grant free (GF) access opportunity. For example, in a step 2320 a signal strength of the received initial preamble may be determined. For example, in a step 2330, a signal strength category may be determined based on the determined signal strength and signal strength thresholds. For example, in a step 2340, a first number of transmission repetitions may be determined based on the determined signal strength category. For example, in a step 2350, a repetitive backscattering transmission may be performed for a number of retransmissions and an interrogation signal may be monitored. For example, in a step 2360, on a condition that the monitored interrogation signal is determined to be absent and on a condition that the number of retransmissions is greater or equal to the determined first number of transmission repetitions, it may be determined that repetitive backscattering transmission may be successful.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Throughout embodiments described herein, (e.g., configuration) information may be described as received by a WTRU from the network, for example, through system information or via any kind of protocol message. Although not explicitly mentioned throughout embodiments described herein, the same (e.g., configuration) information may be pre-configured in the WTRU (e.g., via any kind of pre-configuration methods such as e.g., via factory settings), such that this (e.g., configuration) information may be used by the WTRU without being received from the network.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A method implemented in a first wireless transmit/receive unit (WTRU), the method comprising:

receiving a first reference signal from a base station;

determining that a first signal strength of the first reference signal fails to satisfy a signal strength condition;

monitoring for a second reference signal from a second WTRU based on the determination that the first signal strength of the first reference signal fails to satisfy the signal strength condition;

receiving the second reference signal from the second WTRU;

determining, based on the received second reference signal, a physical random-access channel (PRACH) preamble and a random-access channel (RACH) occasion; and transmitting the determined PRACH preamble on the determined RACH occasion.

2. The method of claim 1, wherein transmitting the determined PRACH preamble on the determined RACH occasion is any of a backscattered transmission and a non-backscattered transmission.

3. The method claim 1, wherein the first signal strength of the first reference signal fails to satisfy the signal strength condition on a condition that the first signal strength is below a threshold.

4. The method of claim 1, comprising performing synchronization with the second WTRU based on the received second reference signal.

5. The method of claim 1, wherein the determined PRACH preamble and the determined RACH occasion belong to respectively a set of PRACH preambles and a set of RACH occasions associated with a backscattering operation that comprises backscattering a signal to the base station based on a reference signal received from a network element different from the base station.

6. The method of claim 1, wherein the PRACH preamble and the RACH occasion are further determined according to any of a WTRU class, a WTRU backscattering capability, and a WTRU battery level.

7. The method of claim 6, wherein the WTRU class indicates any of a passive WTRU and a semi-passive WTRU.

8. A first wireless transmit/receive unit (WTRU) comprising circuitry, including any of a transmitter, a receiver, a processor, and a memory, the WTRU being configured to:

receive a first reference signal from a base station;

determine that a first signal strength of the first reference signal fails to satisfy a signal strength condition;

monitor for a second reference signal from a second WTRU based on the determination that the first signal strength of the first reference signal fails to satisfy the signal strength condition;

receive the second reference signal from the second WTRU;

determine, based on the received second reference signal, a physical random-access channel (PRACH) preamble and a random-access channel (RACH) occasion; and transmit the determined PRACH preamble on the determined RACH occasion.

9. The method of claim 1, comprising receiving configuration information indicating a plurality of RACH occasions and a plurality of reference signal preambles, wherein each reference signal preamble of the plurality of reference signal preambles is associated with one or more RACH occasions of the plurality of RACH occasions.

10. The method of claim 9, wherein the second reference signal comprises a second reference signal preamble of the plurality of reference signal preambles, and wherein the PRACH preamble is determined based on one or more RACH occasions associated with the second reference signal preamble.

11. The method of claim 9, wherein the configuration information indicates any of: (1) a support of backscattering RACH transmission and (2) a monitoring configuration for monitoring the second reference signal.

12. The method of claim 9, wherein the configuration information is received through system information.

13. The method of claim 2, wherein it is determined whether to transmit the backscattered transmission or the non-backscattered transmission based on any of the first signal strength and a second signal strength of the second reference signal.

14. The method of claim 4, comprising receiving a random-access response (RAR) including timing advance information indicating a differential timing advance to be used for timing adjustment with respect to the synchronization with the second WTRU for subsequent uplink transmissions.

15. The first WTRU of claim 8, wherein the first signal strength of the first reference signal fails to satisfy the signal strength condition on a condition that the first signal strength is below a threshold.

16. The first WTRU of claim 8, configured to receive configuration information indicating a plurality of RACH occasions and a plurality of reference signal preambles, wherein each reference signal preamble of the plurality of reference signal preambles is associated with one or more RACH occasions of the plurality of RACH occasions.

17. The first WTRU of claim 16, wherein the second reference signal comprises a second reference signal preamble of the plurality of reference signal preambles, and wherein the PRACH preamble is determined based on one or more RACH occasions associated with the second reference signal preamble.

18. The first WTRU of claim 8, configured to determine whether to transmit a backscattered transmission or a non-backscattered transmission on the determined RACH occasion based on any of the first signal strength and a second signal strength of the second reference signal.

19. The first WTRU of claim 8, configured to perform synchronization with the second WTRU based on the second reference signal.

20. The first WTRU of claim 19, configured to receive a random-access response (RAR) including timing advance information indicating a differential timing advance to be used for timing adjustment with respect to the synchronization with the second WTRU for subsequent uplink transmissions.

\* \* \* \* \*